US008458796B2

(12) United States Patent
Stites et al.

(10) Patent No.: US 8,458,796 B2
(45) Date of Patent: Jun. 4, 2013

(54) METHODS AND SYSTEMS FOR FULL PATTERN MATCHING IN HARDWARE

(75) Inventors: Ronald S. Stites, Georgetown, TX (US); Craig D. Botkin, Austin, TX (US); Brian K. Campbell, Cedar Park, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 13/043,287

(22) Filed: Mar. 8, 2011

(65) Prior Publication Data
US 2012/0233693 A1 Sep. 13, 2012

(51) Int. Cl.
*G06F 11/00* (2006.01)
*G06F 17/00* (2006.01)
*G06F 11/30* (2006.01)

(52) U.S. Cl.
USPC ............................. 726/23; 706/46; 713/188

(58) Field of Classification Search
USPC ............... 726/13–25; 713/164, 188; 709/231; 707/706, 776, 999; 706/46; 711/100, 103, 711/108
See application file for complete search history.

(56) References Cited

U.S. PATENT DOCUMENTS

| | | |
|---|---|---|
| 7,853,578 B1 | 12/2010 | Anker et al. |
| 7,900,255 B1 | 3/2011 | Mayr et al. |
| 2003/0229710 A1 | 12/2003 | Lie et al. |
| 2007/0204344 A1 | 8/2007 | Xue |
| 2007/0233628 A1 | 10/2007 | Sherwood et al. |

OTHER PUBLICATIONS

International Search Report mailed Sep. 26, 2012 for serial No. PCT/US2012/027254 filed Mar. 1, 2012.
Aldwairi, M. et al., "Configurable String Matching Hardware for Speeding up Intrusion Detection," In ACM SIGARCH Computer Architecture News, 33(1):99-107, 2005.
Antichi, G. et al, "Counting Bloom Filters for Pattern Matching and Anti-Evasion at the Wire Speed," IEEE Netw. , Jan.-Feb. 2009 , pp. 30-35.
Bonomi, F. et al., "Beyond Bloom Filters: From Approximate Membership Checks to Approximate State Machines," SIGCOMM '06: Proceedings of the 2006 conference on Applications, technologies, architectures, and protocols for computer communications (2006), pp. 315-326.
Dharmapurikar, S. et al., "Deep Packet Inspection Using Parallel Bloom Filters," 11th Symposium on High Performance Interconnects, Aug. 2003.
Fide, S. et al., "A Survey of String Matching Approaches in Hardware," TR SPDS 06-01, University of California—Irvine, Mar. 2006.

(Continued)

*Primary Examiner* — Nathan Flynn
*Assistant Examiner* — Abdullah Almamun

(57) ABSTRACT

Methods and systems are provided for hardware-based pattern matching. In an embodiment, an intrusion-prevention system (IPS) identifies a full match between a subject data word comprising subject-data blocks and a signature data pattern comprising signature-data blocks. The IPS receives the subject data word via a network interface, and thereafter makes a partial-match determination that two or more but less than all of the subject-data blocks respectively match the same number of the signature-data blocks stored in partial-match hardware with respect to both value and position. Thereafter, the IPS makes a full-match determination that all of the subject-data blocks respectively match all of the signature-data blocks stored in the IPS's full-match hardware with respect to both value and position. The IPS then stores an indicator that the full-match determination has been made, and may carry out one or more additional intrusion-prevention responses as well.

60 Claims, 29 Drawing Sheets

OTHER PUBLICATIONS

Grothoff, C., "A Quick Introduction to Bloom Filters," The GNUnet Project, 2005.

Lin, et al. "Using String Matching for Deep Packet Inspection," IEEE Computer Society, pp. 23-28, Apr. 2008.

Song, H. et al., "Fast Hash Table Lookup Using Extended Bloom Filter: An Aid to Network Processing," ACM SIGCOMM; Philadelphia, PA; Aug. 21-26, 2005.

Sourdis, "Efficient and High-Speed FPGA-Based String Matching for Packet Inspection," Thesis, Technical University of Crete, Electronic and Computer Engineering Department, Chania, Jul. 2004.

Sourdis, I. et al., "A Reconfigurable Perfect-Hashing Scheme for Packet Inspection," Proceedings of 15th Int. Conf. on Field Programmable Logic and Applications, 2005.

Sourdis, I. et al., "Fast, Large-Scale String Match for a 10Gbps FPGA-based Network Intrusion Detection System," In Proceedings of International Conference on Field Programmable Logic and Applications (FPL), 2003.

Weaver, N. et al., "The Shunt: An FPGA-Based Accelerator for Network Intrusion Prevention," ACM Symposium on Field Programmable Gate Arrays, Feb. 2007.

Yu, "High Speed Deep Packet Inspection with Hardware Support", Dissertation, Electrical Engineering and Computer Sciences University at Berkeley, Technical Report No. UCB/EECS-2006-156, retrieved from, Nov. 22, 2002.

15. Tzur-David, "A Network Intrusion Prevention System (NIPS) for High-Speed Networks," Thesis, School of Engineering and Computer Science, The Hebrew University of Jerusalem, Sep. 2005.

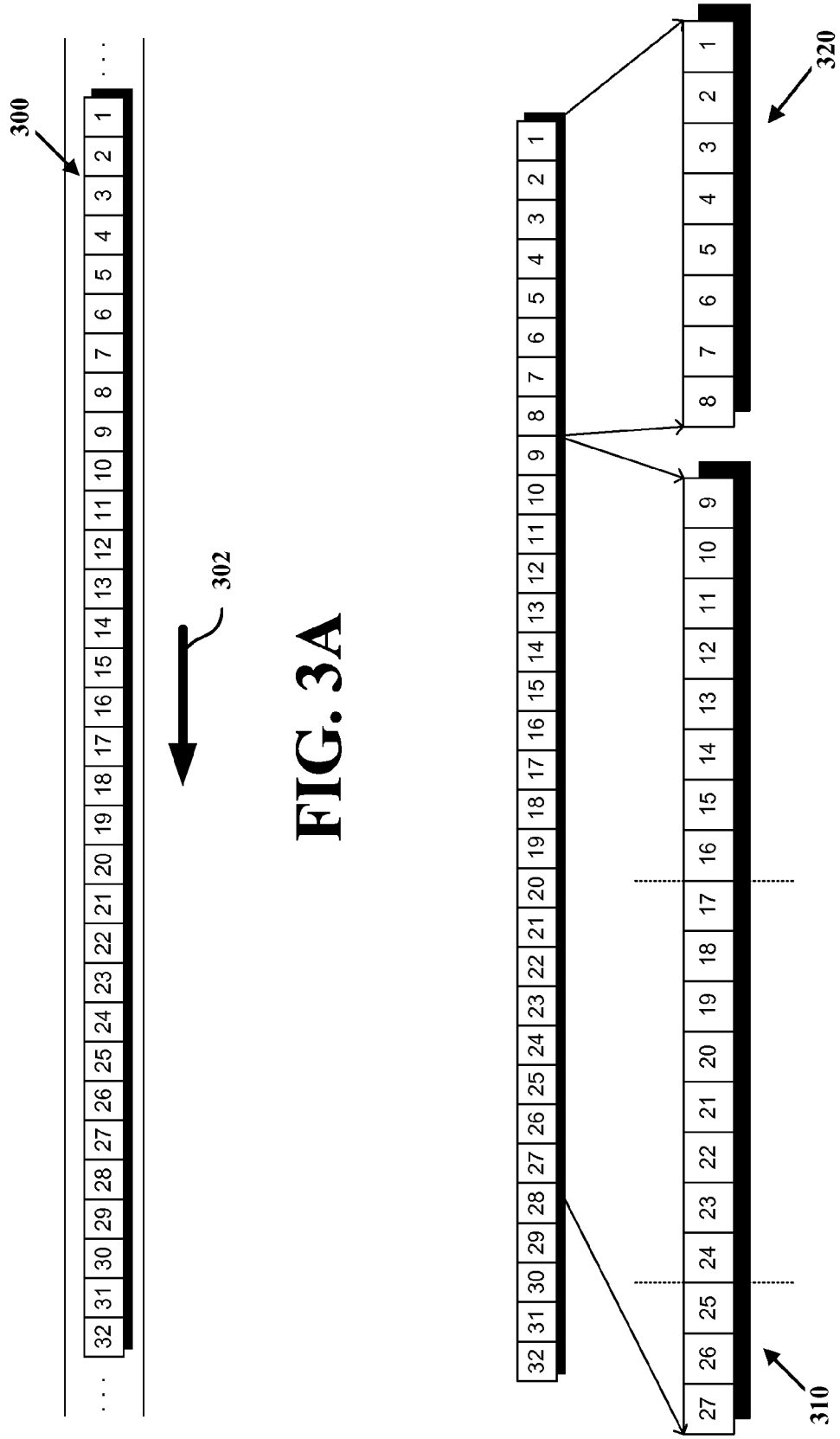

832A/B   836

| Memory Address | Binary Representation |
|---|---|
| 19 | 10011 |
| 18 | 10010 |
| 17 | 10001 |
| 16 | 10000 |
| 15 | 01111 |
| 14 | 01110 |
| 13 | 01101 |
| 12 | 01100 |
| 11 | 01011 |
| 10 | 01010 |
| 9 | 01001 |
| 8 | 01000 |
| 7 | 00111 |
| 6 | 00110 |
| 5 | 00101 |
| 4 | 00100 |
| 3 | 00011 |
| 2 | 00010 |
| 1 | 00001 |
| 0 | 00000 |

FIG. 8C

| 1132 | 1140 | 1142 |
|---|---|---|
| 19 | 10011 | |
| 18 | 10010 | |
| 17 | 10001 | |
| 16 | 10000 | 100-- |
| 15 | 01111 | |
| 14 | 01110 | |
| 13 | 01101 | |
| 12 | 01100 | 011-- |
| 11 | 01011 | |
| 10 | 01010 | |
| 9 | 01001 | |
| 8 | 01000 | 010-- |
| 7 | 00111 | |
| 6 | 00110 | |
| 5 | 00101 | |
| 4 | 00100 | 001-- |
| 3 | 00011 | |
| 2 | 00010 | |
| 1 | 00001 | |
| 0 | 00000 | 000-- |
| Memory Address | Binary Representation | Burst Address |

FIG. 11B

|  | 1532 | 1540 | 1542 |
|---|---|---|---|
| | 15 | 01111 | |
| | 14 | 01110 | |
| | 13 | 01101 | |
| | 12 | 01100 | |
| | 11 | 01011 | |
| | 10 | 01010 | |
| | 9 | 01001 | |
| | 8 | 01000 | 01--- |
| | 7 | 00111 | |
| | 6 | 00110 | |
| | 5 | 00101 | |
| | 4 | 00100 | |
| | 3 | 00011 | |
| | 2 | 00010 | |
| | 1 | 00001 | |
| | 0 | 00000 | 00--- |
| | Memory Address | Binary Representation | Burst Address |

|  | 1532 | 1540 | 1542 |
|---|---|---|---|
| | 31 | 11111 | |
| | 30 | 11110 | |
| | 29 | 11101 | |
| | 28 | 11100 | |
| | 27 | 11011 | |
| | 26 | 11010 | |
| | 25 | 11001 | |
| | 24 | 11000 | 11--- |
| | 23 | 10111 | |
| | 22 | 10110 | |
| | 21 | 10101 | |
| | 20 | 10100 | |
| | 19 | 10011 | |
| | 18 | 10010 | |
| | 17 | 10001 | |
| | 16 | 10000 | 10--- |
| | Memory Address | Binary Representation | Burst Address |

FIG. 15B

METHODS AND SYSTEMS FOR FULL PATTERN MATCHING IN HARDWARE

BACKGROUND

1. Technical Field

The present disclosure relates to data-pattern matching, and, in particular, to methods and systems for determining that a given subject data pattern fully matches a given signature data pattern.

2. Description of Related Art a. Intrusion Prevention Systems (IPSs) Generally

Packet-data communication, such as that conducted over the Internet, is extremely popular, and is becoming more so every day. People, companies, educational institutions, etc. routinely use Internet-connected computers and networks to conduct their affairs. Myriad types of data are transmitted over the Internet, such as correspondence, medical information, financial information, business plans, etc. Unfortunately, not all uses of the Internet are benign; on the contrary, a significant percentage of the data that is transmitted over the Internet every day is malicious. Examples of this type of data are viruses, spyware, malware, worms, etc.

Not unexpectedly, an industry has developed to combat these attempts to disrupt and harm not only these Internet-based communications, but also the networks and computers used to conduct them. This industry, and the effort to fight these threats generally, is often and herein referred to as "intrusion prevention," as very commonly such efforts are focused at points of access to private (e.g., corporate) networks. One important aspect of intrusion prevention involves identifying known threats (e.g., files that are or contain viruses, worms, spyware, malware, etc.) by particular data patterns contained therein. These patterns are often and herein referred to as "signatures" of these security threats, and are also often and at times herein referred to as "triggers" and by other names.

As such, data (e.g., IP) packets flowing through, towards, or from a network segment, such as a particular router, switch, or network generally, are often screened—perhaps by an intermediate device, functional component, or other entity—for the presence of these signature data patterns. When particular packets, or sequences of packets, are identified as containing at least one of these signatures, those packets (or, again, sequences of packets) may be "quarantined," such that those packets cannot cause harm to any more networks and/or computers. These packets, removed from the normal flow of data traffic, can then be further examined without holding up that traffic generally.

In particular, systems that carry out intrusion prevention (i.e., intrusion-prevention systems (IPSs)), use pattern-matching techniques to attempt to detect malicious data, and to prevent that data from entering a given network segment. Typically, IPSs check both packet headers and packet payloads in order to detect content-based security threats. Standard detection methods consist of using pattern-matching or string-matching algorithms to search for malicious packets containing predefined signatures that characterize a threat. Typically, IPSs are deployed in-line with the network segment to be protected, such that all data that flows into and out of the protected network segment must pass through the IPS.

It can thus be appreciated that it would be advantageous for an IPS to be able to quickly and accurately identify signature data patterns across one or more packets, and to do so in a way that uses relatively few computing resources such as processing time and memory. For example, it would be advantageous for an IPS to be able to identify signature data patterns at "line" or "wire" speeds, which, in modern networks are typically at least 10 gigabits per second (Gbps). Further, it would be advantageous for an IPS to be able to efficiently identify a large number of signatures, identify signatures that overlap, and, because the location of a signature in a given packet is not always predictable, identify signatures having different lengths and starting at arbitrary locations in a data stream.

b. Pattern-Matching Techniques

Generally, pattern matching may be carried out using either approximate-pattern-matching techniques or exact-pattern-matching techniques. Approximate-pattern-matching techniques may be relatively less resource-intensive, but may result in "false positives" (i.e., the identification of given data patterns as malicious when in fact they are not). Accordingly, IPSs that employ only approximate-pattern-matching techniques may inefficiently quarantine network traffic that is actually benign.

On the other hand, exact-pattern-matching techniques—which require, for a given data pattern to be correctly identified as malicious (or at least as containing an exact signature of a threat), that the given data pattern match a signature data pattern exactly—are typically more resource-intensive than their approximate-pattern-matching counterparts, but generally do not result in as many, if any, false positives. It can thus be appreciated that it would be advantageous for an IPS to employ exact-pattern-matching techniques, but that such techniques may negatively impact effective network speeds.

i. Software-Based Solutions

Pattern matching can be carried out in software-based solutions as well as in hardware-based solutions. Software-based solutions, perhaps implemented using general-purpose processors, regularly employ pattern-matching algorithms that are well known in the art, including Knuth-Morris-Pratt, Boyer-Moore, and Aho-Corasick. It has proven difficult, however, for software-based solutions to keep up with rapidly increasing line speeds; software-based solutions typically do not support network traffic at a rate greater than a few hundred megabits per second (Mbps). As such, since software-based solutions can only support modest throughput, hardware-based solutions are often chosen.

ii. Hardware-Based Solutions

Hardware-based solutions may employ a variety of hardware types, including a variety of memory types, depending on the specific pattern-matching technique a given solution employs. For example, reconfigurable devices, such as Block random access memory (Block RAM) contained in field programmable gate arrays (FPGAs), are commonly utilized. Use of FPGA Block RAM is advantageous because, among other things, it inherently possesses parallelism that may be exploited to achieve high wire speeds, it is typically physically located relatively close to the processor and therefore associated with minimal access delays, and it is easily reconfigurable and therefore easily updated as new signature patterns become known. However, the relatively high cost of Block RAM usually limits the extent of its use in IPSs. Block RAM is therefore typically only employed in less resource-intensive approximate-pattern-matching techniques.

Other types of more conventional memory are static random access memory (SRAM) and dynamic random access memory (DRAM). In typical SRAM, each bit is stored using a combination of four transistors, two cross-coupled inverters, and two additional access transistors. In typical DRAM, each bit is stored using one transistor and one capacitor. Because capacitors inherently leak charge, DRAM must be regularly power-refreshed. Accordingly, SRAM is generally faster and less power-intensive than DRAM. On the other hand, DRAM is generally less expensive and less spaceconsuming than SRAM, because it is less structurally complex. In each of Block RAM, SRAM, and DRAM, data is stored, retrieved, or modified using a memory address at which the data is stored.

One example of an approximate-pattern-matching technique implemented in hardware is a Bloom filter, which may be utilized to determine whether a given data pattern definitely does not match a signature data pattern, and therefore need not be further examined for an exact match. Generally, a Bloom Filter is a data structure that reflects a set of signatures compactly by computing the result of at least one, and possibly multiple, hash equations on each signature in the set of signature data patterns, and flagging these hash results (i.e., memory addresses) by setting a simple binary indicator. In this way, a given memory device may be configured to reflect to some degree the signatures that are contained in the set of signature data patterns.

Once configured in this way, the Bloom filter may be queried to determine whether a given subject might be—or definitely is not—contained in the set of signature data patterns. Given the nature of such a filter, the answer to this query might be a false positive, but will never be false negative. Thus, approximate-pattern-matching techniques, including those that utilize a Bloom filter, may quickly indicate that a given subject is not malicious, and therefore does not need to be further examined to determine whether it exactly matches a signature data pattern. Further analysis is then typically performed on those subjects that cannot be classified as definitely benign, in order to evaluate whether such subjects exactly match a signature data pattern.

BRIEF DESCRIPTION OF THE DRAWINGS

FIGS. 3A-3C depict examples of network traffic and subject data words found therein.

FIGS. 8A-8F depict examples of pre-processing hardware and configuration thereof, in accordance with at least one embodiment.

FIGS. 11A-11C depict an example of a partial-match memory device, in accordance with at least one embodiment.

FIGS. 15A and 15B depict an example of a full-match memory device, in accordance with at least one embodiment.

DETAILED DESCRIPTION OF THE DRAWINGS

1. Overview

Figure 1:
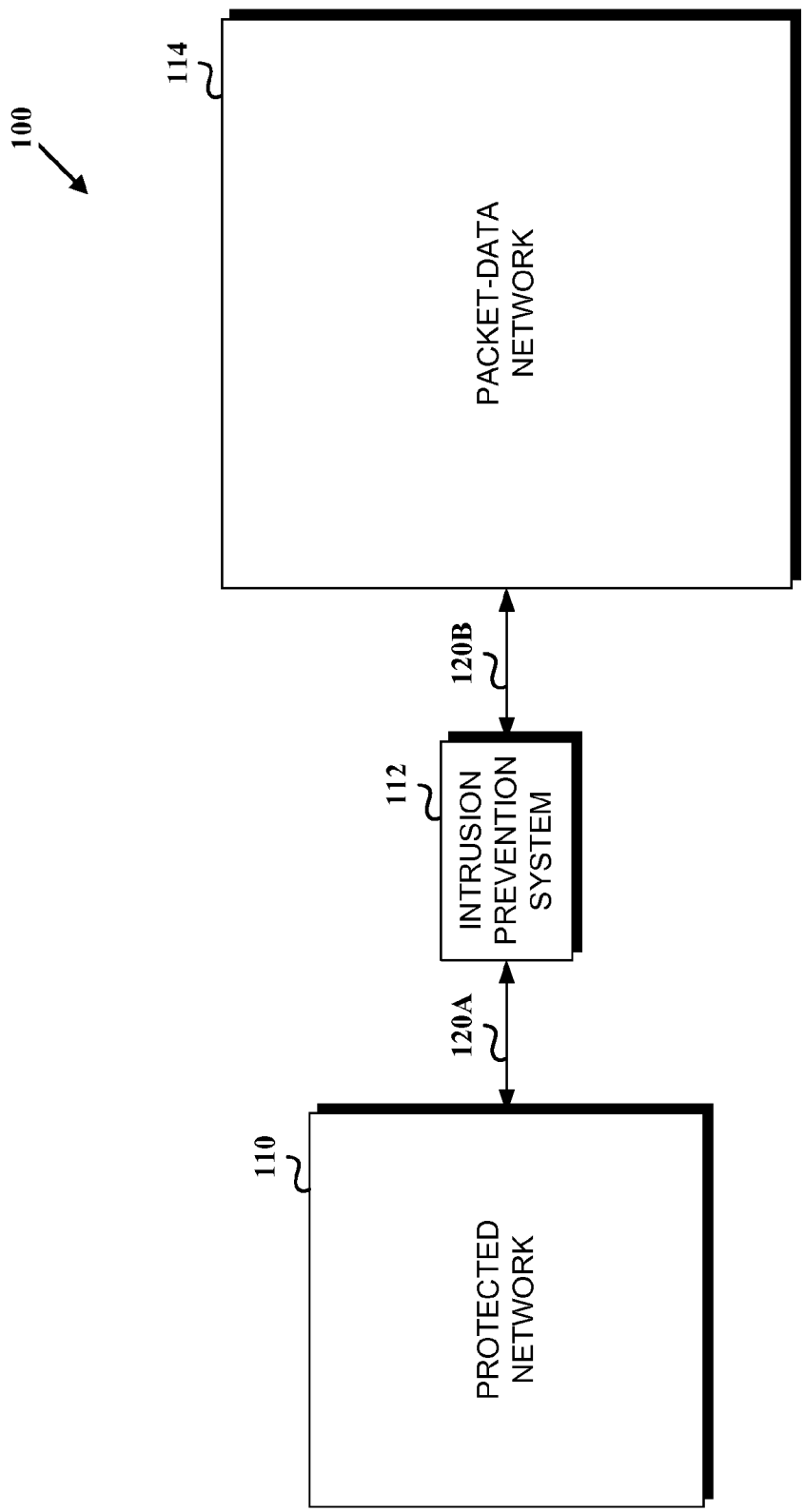
FIG. 1 is a simplified block diagram of an example of a communication network, in which at least one embodiment can be employed.

Methods and systems are provided for using hardware to determine that a subject data word exactly matches a signature data pattern. In one aspect, an embodiment may take the form of a method carried out in an intrusion-prevention system (IPS) for examining a subject data word and identifying a full match between the subject data word and the signature data pattern. The subject data word comprises a plurality of subject-data blocks, and the signature data pattern comprises a plurality of signature-data blocks. Each of the subject-data blocks and each of the signature-data blocks has a respective value and a respective position. The IPS comprises partial-match hardware having at least part of the signature data pattern stored therein, and further comprises full-match hardware having the (full) signature data pattern stored therein.

In accordance with the method, the IPS receives the subject data word via at least one network interface. The subject data word may comprise a subset of the subject-data blocks, or all of the subject-data blocks, received by the IPS in accordance with a clock cycle. Alternatively, the subject data word may comprise subject-data blocks received in accordance with the clock cycle as well as subject-data blocks received in accordance with at least one previous clock cycle.

Further in accordance with the method, the IPS makes a partial-match determination that a partial-match number of the subject-data blocks respectively match the same number of signature-data blocks stored in the partial-match hardware with respect to both value and position. The partial-match number of subject data blocks is greater than or equal to two and less than a total number of subject-data blocks.

Making the partial-match determination may comprise determining a partial-match-subject-hash result, which may correspond to a partial-match address in the partial-match hardware. Furthermore, the signature-data blocks stored in the partial-match hardware may be stored at the partial-match address.

Making the partial-match determination may comprise an identification of the partial-match address based at least in part on the subject data word. The partial-match determination may comprise a determination that a set overflow indicator is stored in the partial-match hardware in association with the partial-match address.

Further, the subject-data blocks matched in the partial-match determination may have respective positions that are adjacent. For example, the subject-data blocks matched in the partial-match determination may be two subject-data blocks having adjacent positions at the start of, in the middle of, or at the end of the subject data word.

Further in accordance with the method, after making the partial-match determination, the IPS makes a full-match determination that all of the subject-data blocks respectively match all of the signature-data blocks stored in the full-match hardware with respect to both value and position. Making the full-match determination may comprise determining a full-match-subject-hash result, which may correspond to a full-match address in the full-match hardware. Furthermore, the signature-data blocks stored in the full-match hardware may be stored at the full-match address.

Making the full-match determination may comprise an identification of the full-match address based at least in part on the subject data word. The full-match determination may comprise a determination that a full-match-overflow address is stored in the full-match hardware in association with the full-match address.

The IPS may comprise pre-processing hardware, and the method may comprise, prior to making the partial-match determination, the IPS making a pre-processing determination that a pre-processing number of pre-processing-subject-hash results respectively match the same pre-processing number of pre-processing-signature-hash results flagged in the pre-processing hardware. The pre-processing-subject-hash result and the pre-processing-signature-hash result may respectively correspond to a pre-processing address in the pre-processing hardware. Further, a trigger indicator may be set at each respective pre-processing address, and the pre-processing determination may comprise a determination that the trigger indicator is set at each respective pre-processing address.

Further in accordance with the method, the IPS stores a full-match indicator, indicating that the full-match determination has been made. After making the full-match determination, the IPS may carry out at least one responsive action, perhaps selected from: quarantining the subject data word, quarantining a collection of data comprising the subject data word, blacklisting a source of the subject data word, sending an alert to the source of the subject data word, sending an alert to the intended recipient of the subject data word, and generating a data-examination report; and certainly many other examples are possible.

At least one embodiment may take the form of an IPS comprising at least one network interface, at least one processor, partial-match hardware, full-match hardware, and data storage. The partial-match hardware has at least part of the signature data pattern stored therein, and the full-match hardware has the (full) signature data pattern stored therein. The data storage may comprise instructions executable by the at least one processor for causing the IPS to carry out a set of functions, the set perhaps comprising some or all of those described above.

The set of functions may alternatively comprise: receiving the subject data word via the at least one network interface; making a partial-match determination comprising: an identification of a partial-match address based at least in part on the subject data word, and a determination that at least one of the following is stored in the partial-match hardware in association with the partial-match address: (i) a set overflow indicator and (ii) a partial-match number of the signature-data blocks that respectively match the same partial-match number of the subject-data blocks with respect to both value and position, wherein the partial-match number is (i) greater than or equal to two and (ii) less than a total number of the subject-data blocks; subsequent to making the partial-match determination, making a full-match determination comprising: an identification of a full-match address based at least in part on at least part of the subject data word, and a determination that the signature data pattern is stored in the full-match hardware in association with the full-match address; and storing a full-match indicator, the full-match indicator indicating that the full-match determination has been made.

Note as well that any of the variations described herein with respect to any given embodiment is contemplated as being applicable to any other embodiment to the extent such variations would be compatible and not inconsistent with such embodiments.

These as well as other aspects and advantages will become apparent to those of ordinary skill in the art by reading the following detailed description, with reference where appropriate to the accompanying drawings.

2. Introduction

Described herein are aspects of hardware-based pattern-matching techniques for use in data-network-security contexts, including those involving IPSs, as such techniques may be used to classify network traffic as malicious or benign. The pattern-matching techniques described herein provide fast and flexible methods of analyzing data using hardware, and can be carried out using low-cost hardware architectures.

The pattern-matching techniques described herein include methods for determining that patterns of data blocks contained in network traffic match patterns of data blocks contained in signature data patterns. At least one embodiment comprises (i) making a partial-match determination that at least some of the subject-data blocks contained in a subject data word respectively match—with respect to both value and position—some of the signature-data blocks contained in a signature data pattern and (ii) after making the partial-match determination, making a full-match determination that all of the subject-data blocks contained in the subject data word respectively match—again with respect to both value and position—all of the signature-data blocks contained in the signature data pattern.

The reader will appreciate that subject data words for which the partial-match determination cannot be made, i.e., subject data words having at least some examined subject-data blocks that do not match respective signature-data blocks, will be subject data words for which the full-match determination necessarily cannot be made. Accordingly, the methods and systems described herein facilitate, among other benefits, reducing the total number of subject data words that are examined for an exact match with respect to given signatures.

At least one embodiment involves making one or more additional determinations prior to the partial-match determination and/or the full-match determination, resulting in a further reduction of the total number of subject data words that are examined for an exact match. Such additional determinations may include the use of hash functions, and in particular may include a pre-processing determination that at least one pre-processing-subject-hash result respectively matches at least one pre-processing-signature-hash result. Such a determination, if carried out prior to attempting to make the partial-match determination, may reduce the total number of subject data words that are examined for a partial match, and thus reduce the total number of subject data words that are examined for an exact (i.e., full) match.

Accordingly, with respect to a given subject data word and a given signature data pattern, at least one embodiment includes one or more of the following aspects: (i) determining that a pre-processing number of pre-processing-subject-hash results respectively match the same pre-processing number of pre-processing-signature-hash results, (ii) determining that a partial-match number of the subject-data blocks respectively match the same partial-match number of signature-data blocks, wherein the partial-match number is (i) greater than or equal to two and (ii) less than a total number of the subject data blocks; and (iii) determining that all of the subject-data blocks respectively match all of the signature-data blocks.

As further described below, such embodiments may be implemented in hardware that is particularly configured to carry out the determinations relevant to the particular embodiment. By utilizing such hardware configurations, faster line speeds may generally be achieved than would be possible with software-based configurations.

3. Example Architecture a. Example Network

FIG. 1 depicts a simplified block diagram of a communication network 100, in which at least one embodiment may be implemented. Communication network 100 comprises a packet-data network 114 in communication with a protected network 110. IPS 112 is situated between packet-data network 114 and protected network 110, such that communications between the two networks pass through IPS 112 by way of communication links 120A and 120B.

Packet-data network 114 may include one or more wide area networks, one or more local area networks, one or more public networks such as the Internet, one or more private networks, one or more wired networks, one or more wireless networks, and/or one or more networks of any other type. Protected network 110 may generally be any network for which it is desired that incoming traffic be examined. For example, protected network 110 may be or include one or more private packet-data networks, one or more wide area networks, one or more local area networks, one or more public networks, one or more wired networks, one or more wireless networks, and/or one or more networks of any other type.

b. Example Intrusion Prevention System (IPS)

Figure 2:
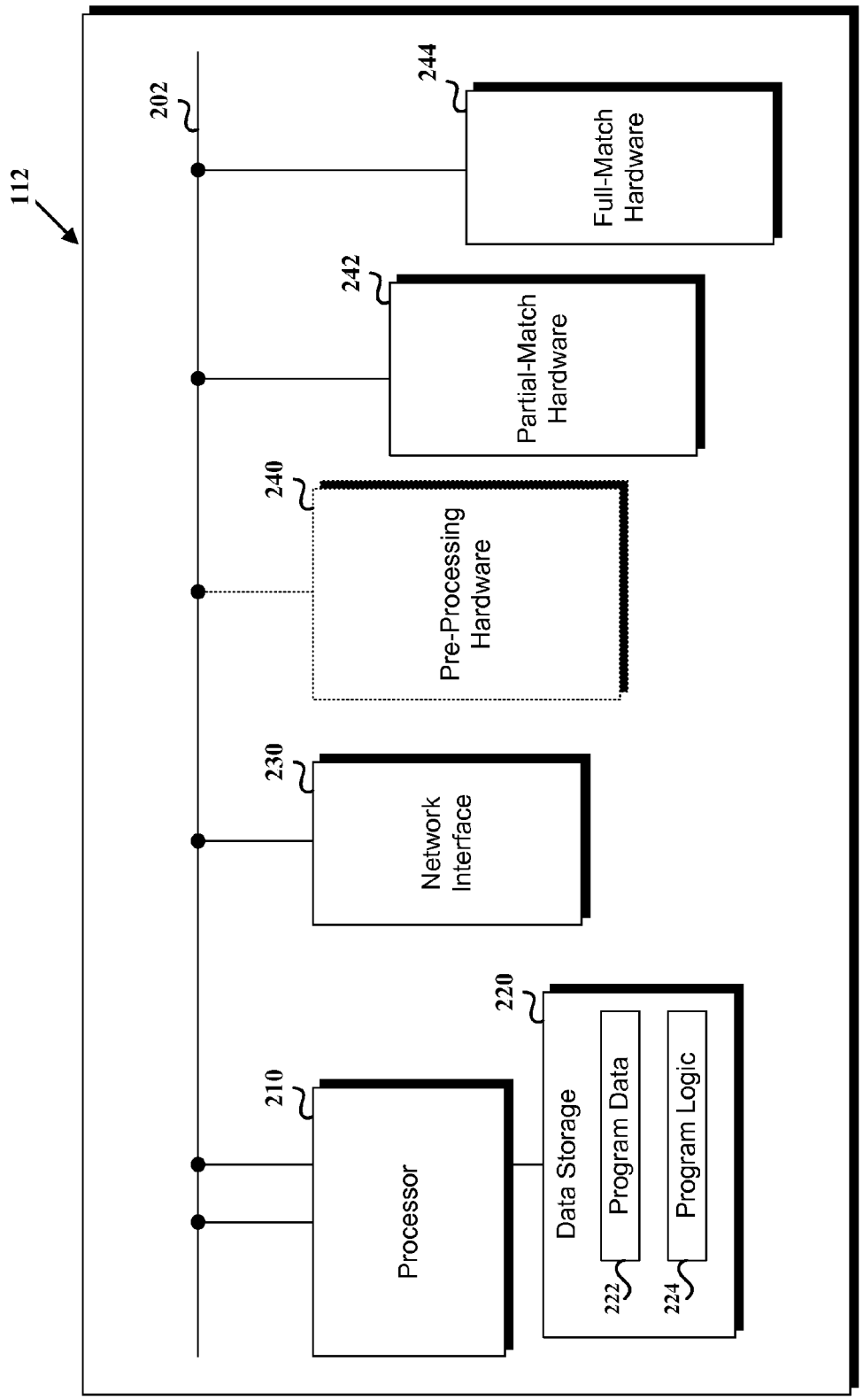
FIG. 2 is a simplified block diagram of an example of an intrusion-prevention system (IPS), in accordance with at least one embodiment.

As described, communications incoming to protected network 110 pass through IPS 112, which is generally configured to examine network traffic for the presence of malicious data. The methods and systems described herein may be implemented by, using, as, or involving IPS 112. Accordingly, FIG. 2 is a simplified block diagram of IPS 112, depicting functional components that can operate to carry out the IPS functions described herein. As shown in FIG. 2, IPS 112 includes, without limitation, a processor 210, data storage 220, a network interface 230, optional pre-processing hardware 240, partial-match hardware 242, and full-match hardware 244, all linked together via a system bus, network, or other connection mechanism 202.

The processor 210 may comprise one or more general-purpose microprocessors and/or dedicated signal processors. Data storage 220, in turn, may comprise memory and/or other storage components, such as optical, magnetic, organic or other memory disc storage, which can be volatile and/or non-volatile, internal and/or external, and integrated in whole or in part with the processor 210. Data storage 220 may contain or be arranged to contain (i) program data 222 and (ii) program logic 224. Although these components are described herein as separate data-storage elements, the elements could just as well be physically integrated together or distributed in various other ways. For example, program data 222 may be maintained in data storage 220 separate from program logic 224, for easy updating and reference by program logic 224.

Program data 222 may contain information about the networks with which IPS 112 is in communication, for example protected network 110 and/or packet-data network 114. Program data 222 may also contain information relating to a pattern-matching technique carried out by IPS 112, such as information about signature data patterns, or information about pattern matches that have been made. Program logic 224 may comprise machine-language instructions that may be executed or interpreted by processor 210 to carry out functions according to the methods and systems described herein, including those described with respect to FIGS. 6A and 6B. It should be understood, however, that program logic 224 and its associated functions are described herein be way of example only. As such, those skilled in the art will appreciate that other program logic and/or functions may be used instead, some program logic and/or functions may be added, and some program logic and/or functions may be omitted altogether.

Network interface 230 typically functions to communicatively couple IPS 112 to other networks, such as public-data network 114 and protected network 110. As such, network interface 230 may include a wired (e.g., Ethernet) and/or wireless (e.g., Wi-Fi) packet-data interface, for communicating with other devices, entities, and/or networks. Network interface 230 may also include multiple interfaces, such as one through which IPS 112 sends communication, and one through which IPS 112 receives communication.

Each of optional pre-processing hardware 240, partial-match hardware 242, and full-match hardware 244 may exist as separate hardware elements, though some or all could just as well be physically integrated together or distributed in various other ways. Each of optional pre-processing hardware 240, partial-match hardware 242, and full-match hardware 244 may comprise a data-storage element, such as a memory device including random access memory (RAM). The particular memory device used in each of optional pre-processing hardware 240, partial-match hardware 242, and full-match hardware 244 may depend on particular implementations, as well as on other considerations such as cost.

In one embodiment, an operating speed that is characteristic of the memory device used in optional pre-processing hardware 240 may be greater than an operating speed that is characteristic of the memory device used in partial-match hardware 242, and the operating speed that is characteristic of the memory device used in partial-match hardware 242 may in turn be greater than an operating speed that is characteristic of the memory device used in full-match hardware 244.

More particularly, each of optional pre-processing hardware 240, partial-match hardware 242, and full-match hardware 244 may comprise one, or a combination, of Block RAM, SRAM, and DRAM. In various embodiments, Block RAM may be used in pre-processing hardware 240, SRAM in partial-match hardware 242, and DRAM in full-match hardware 244, though other arrangements are certainly contemplated.

Other elements may be contained within each of optional pre-processing hardware 240, partial-match hardware 242, and full-match hardware 244 including, but not limited to, data storage other than the memory devices described above, processors, and network interfaces. As one example, each of optional pre-processing hardware 240, partial-match hardware 242, and full-match hardware 244 may also include hash hardware that implements a given hash equation.

4. An Example Method a. Preliminary Considerations

Figure 3C:
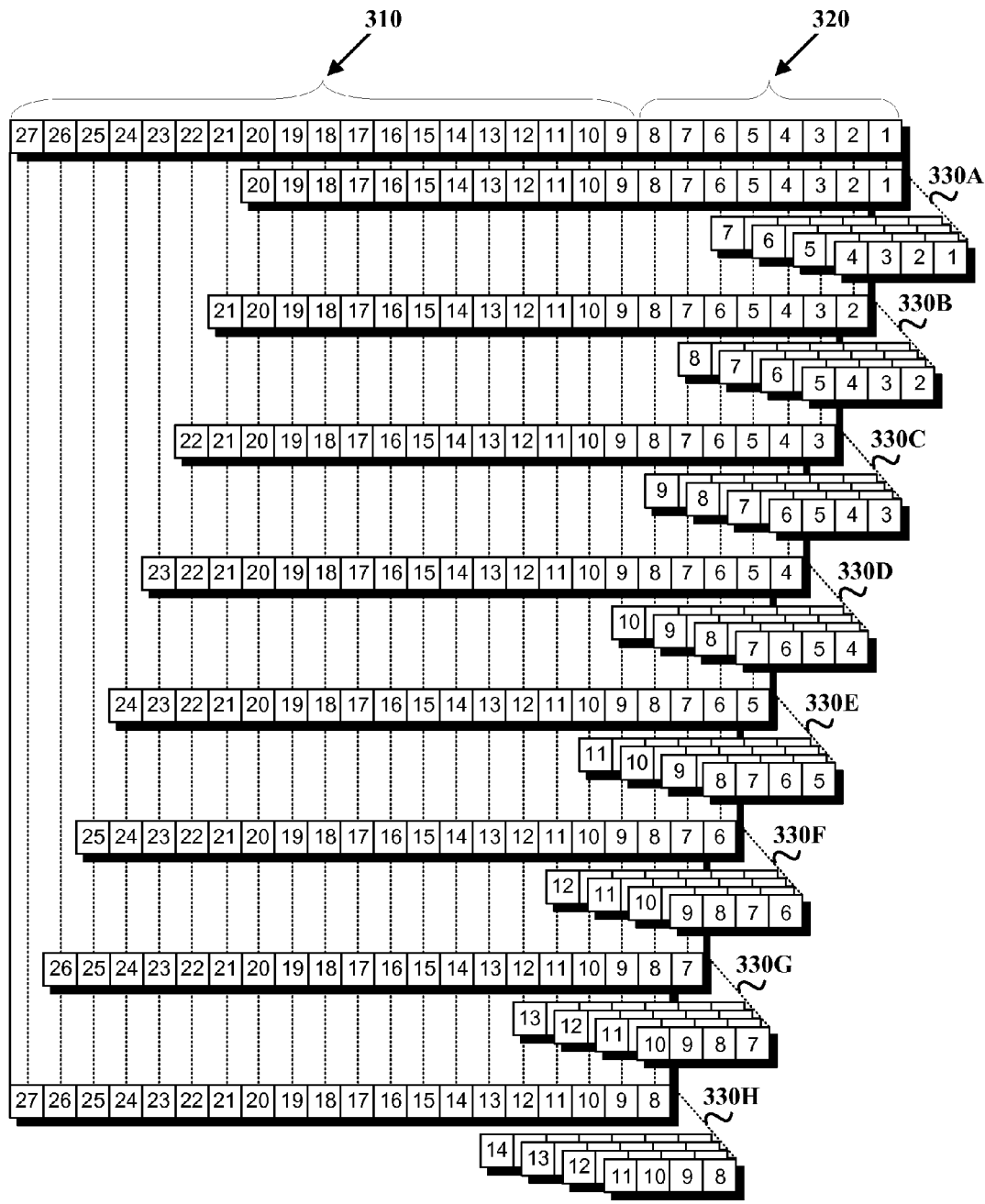

FIGS. 3A-3C depict an example of network traffic 300 and data found therein. In FIG. 3A, network traffic 300 comprises individual data blocks 1-32. Each of the individual data blocks 1-32 may be any suitable pre-determined arrangement, collection, or other grouping of data. For example, and without limitation, each of the data blocks 1-32 may be a bit, byte, fixed number of bits, or fixed number of bytes, etc.

According to the example shown in FIG. 3A, direction arrow 302 indicates that network traffic 300 is flowing from right to left and therefore data block 1 would be the last of these data blocks to be received by IPS 112, and data block 32 would be the first. Note that FIG. 3A depicts network traffic 300 at an example point in time, and that additional data blocks may have been received by IPS 112 previously, and that additional data blocks may be received by IPS 112 in the future.

As discussed above, IPS 112 may be configured to receive and examine network traffic 300 for the presence of signature data patterns. In particular, IPS 112 may examine data words comprising a particular number of data blocks taken from network traffic 300 to determine whether the data words exactly match any of the given signature data patterns having the same particular number of data blocks.

IPS 112 may be further configured to receive and examine network traffic 300 in accordance with a given clock cycle. In such a configuration, a single data block, or group of data blocks, may be received during each clock cycle of IPS 112. Those of skill in the art will appreciate that the greater the number of data blocks received and examined in accordance with a given clock cycle, the greater the examination speed, or line speed, IPS 112 will be capable of achieving. Further, in such a configuration, data blocks received in accordance with a given clock cycle may be examined either independently of, or in combination with, data blocks received during previous clock cycles.

For example, in accordance with a given clock cycle, IPS 112 may be configured to receive eight new data blocks, but may—in accordance with that given clock cycle—examine the last twenty-seven data blocks received. Accordingly, in FIG. 3B, data blocks 1-8 are shown as clock-cycle-group data blocks 320, whereas data blocks 9-27 are shown as previously-received data blocks 310. FIG. 3B thus generally shows a group of data blocks to be examined by IPS 112 comprising clock-cycle-group data blocks 320 and previously-received data blocks 310. Data blocks 1-8 may be understood to have been received by the IPS in accordance with a current clock cycle of the IPS, and data blocks 9-27 may be understood to have been received by the IPS in accordance with previous clock cycles. More particularly, data blocks 9-16 may have been received in accordance with the clock cycle immediately preceding the current clock cycle, data blocks 17-24 may have been received in accordance with the clock cycle immediately preceding the clock cycle in which data blocks 9-16 were received, and so on.

Note that, although IPS 112 may receive clock-cycle groups of data blocks in accordance with given clock cycles, the data blocks examined in accordance with those given clock cycles need not include only complete groups of clock-cycle-group data blocks. For example, with reference to FIG. 3B, data blocks 25-27 may be examined in combination with data blocks 1-24, despite the fact that not all data blocks received in accordance with the clock cycle of the clock-cycle-group comprising data blocks 25-32 would be examined at that time.

Further note that, although IPS 112 may receive clock-cycle groups of data blocks in accordance with given clock cycles, data blocks may be examined in combinations (i.e., "words") that span across data-block-clock-cycle groups. As one example, IPS 112 may examine the combination of data blocks 3-7. As another example, IPS 112 may examine the combination of data blocks 3-17. In general, given combinations of data blocks examined may be chosen according to the signature data patterns for which network traffic 300 is being examined. For example, given a set of signature data patterns comprising signature data patterns having respective lengths, i.e., total numbers of data blocks, varying from four to twenty data, blocks, the combinations of data blocks examined from network traffic 300 may correspondingly have respective lengths varying from four to twenty data blocks.

As one particular example, FIG. 3C shows eight data-word groups 330A-330H to be examined by IPS 112 in accordance with a given clock cycle. Each data-word group 330A-330H comprises seventeen unique data words. As one example of a data word, data-word group 330A includes the data word [4:1] comprising data blocks 4-1. As another example, data-word group 330A also includes the data word [20:1] comprising data blocks 20-1. As yet another example, data-word group 330A also includes the data word [15:1] (not shown) comprising data blocks 15-1. More generally, data-word group 330A includes each of the seventeen data words [20-4:1] that each end at data block 1, and that respectively begin with each of the data blocks 20-4.

And each of the additional data-word groups 330B-330H contains a corresponding group of seventeen data words. As one example, data-word group 330E includes the data word [8:5]. As another example, data-word group 330E also includes the data word [24:5]. As yet another example, data-word group 330E also includes the data word [19:5] (not shown). More generally, data-word group 330E includes each of the seventeen data words [24-8:5] that each end at data block 5, and that respectively begin with each of the data blocks 24-8. Therefore, the lengths of the data words in each of the data-word groups 330A-330H, which are to be examined in accordance with the given clock cycle, is the set in integer increments from four to twenty data blocks, inclusive.

Furthermore, with respect to the example shown in FIG. 3C, the total number of data-word groups corresponds to the number of data blocks received in accordance with each clock cycle. Note that the data words contained in a given data-word group each end with the same data block, with the data words of each data-word group ending with different, successive, data blocks. For example, whereas each data word contained in data-word group 330A ends with data block 1, each data word contained in data-word group 330B ends with data block 2, and each data word contained in data-word group 330G ends with data block 7. Accordingly, in at least one embodiment, the total number of data-word groups examined in accordance with each clock cycle may depend directly on the number of data blocks received in accordance with that clock cycle.

With respect to the example shown in FIG. 3C, the total number of data words in each data-word group varies according to the lengths of the shortest and the longest data words to be examined. For example, each of the data-word groups 330A-330H comprises seventeen data words in accordance with the seventeen unique data word lengths in each of the data-word groups 330A-330H. Further to this example, the total number of data words examined across all data-word groups in accordance with each given clock cycle will generally be equal to a product of (a) a total number of data blocks received in accordance with the each given clock cycle and (b) a number of different lengths of data words to be examined in accordance with each given clock cycle. Accordingly, in the example shown in FIG. 3C, a total of 8×17=136 different data words will be examined in accordance with each clock cycle of the example IPS.

With respect to the example shown in FIG. 3C, the total number of individual data blocks examined in accordance with a given clock cycle will vary according to both the number of data blocks received during the given clock cycle, as well as the length of the longest data word examined. In the example shown in FIG. 3C, given that eight data blocks are received each clock cycle, and the length of the longest data word examined is twenty data blocks, a total number of twenty-seven individual data blocks—grouped as the 136 distinct data words described above—from network traffic 300 are examined in accordance with a given clock cycle.

It should be understood that FIG. 3C generally, and the eight data-word groups 330A-330H particularly, are shown by way of example only, and that other total numbers of data-word groups may be examined. Additionally, the seventeen unique data words contained within each data-word group are shown by way of example only, and other combinations of data words may be examined as well.

As one example alternative, eight data blocks may be received during a given clock cycle and data words having lengths ranging from four to twelve data blocks may be examined. In this alternative, there would be eight data-word groups to be examined and there would be nine data words per group. Accordingly, in this alternative, a total of seventy-two data words, and a total number of nineteen individual data blocks from network traffic 300, would be examined in accordance with each given clock cycle.

Note that, in general, the "data blocks" in network traffic 300 referenced in the above discussion should be understood to be analogous to the "subject-data blocks" referenced in the below discussion. For clarity, the term "subject-data block" is used hereafter when referring to a data block that is part of a combination of data blocks making up a subject data word that is to be examined by IPS 112. Similarly, the "data words" referenced in the above discussion should be understood to be analogous to the "subject data words" as referenced in the below discussion. That is, subject data words are a data words from subject data.

Figure 4:
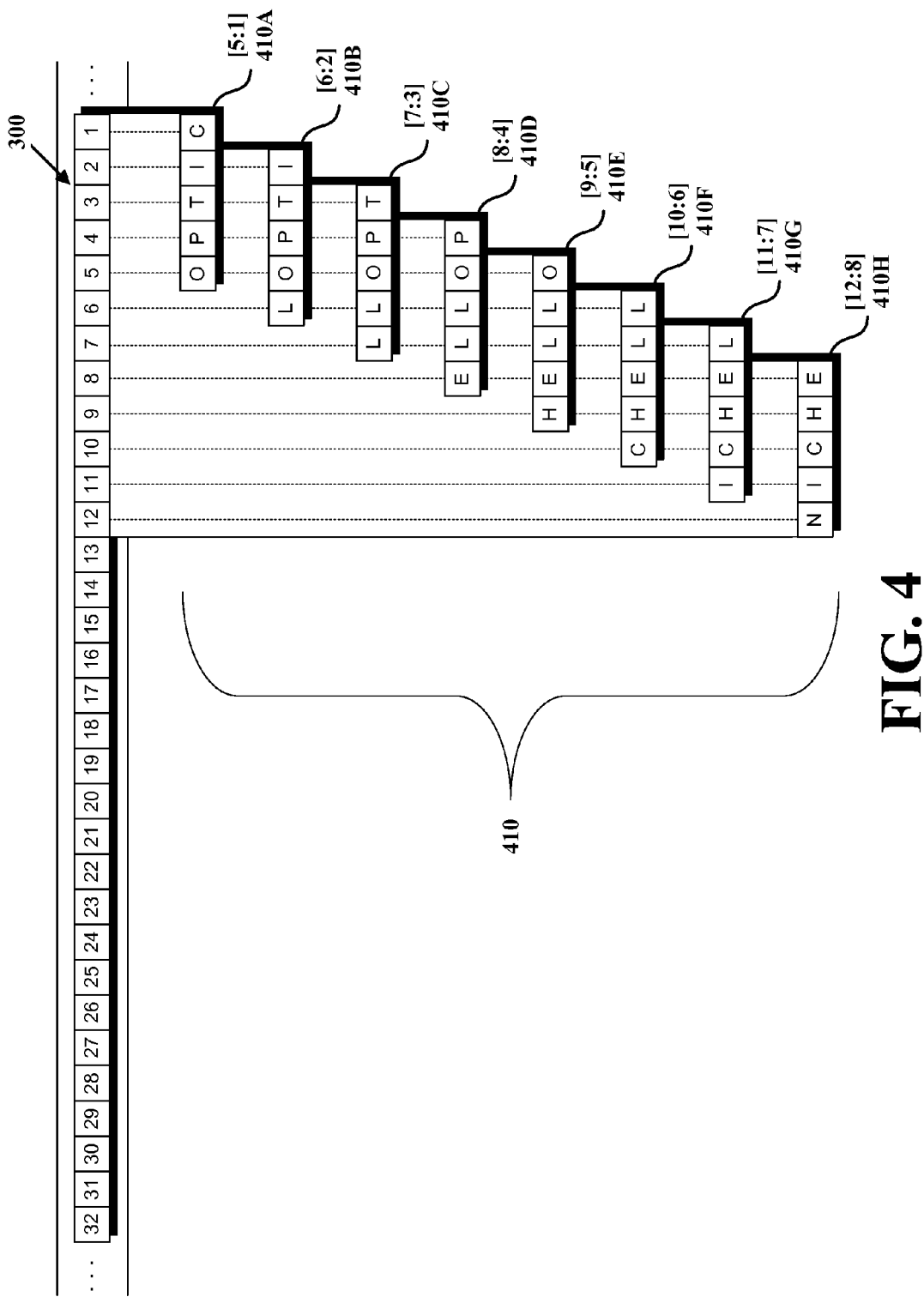
FIG. 4 depicts an example set of subject data words found in an example of network traffic.

FIG. 4 depicts an example subset (i.e., subject data words 410) of all of the subject data words taken from network traffic 300. Note that each of the subject data words 410A-410H are five data blocks long. For example, subject data word 410A [5:1] is made up of subject-data blocks 5-1. As another example, subject data word 410B [6:2] is made up of subject-data blocks 6-2. As yet another example, subject data word 410H [12:8] is made up of subject-data blocks 12-8. Further note that each of the subject data words 410A-410H corresponds to the data word having a length of five data blocks contained in each respective data-word group 330A-330H.

FIG. 4 also shows that each of data blocks 12-1 has a value. It should be understood that all data blocks in network traffic 300 may have a similar value, although such values are not shown with respect to data blocks 32-13. In particular, each of the data blocks 12-1 is associated with a value as follows: 12-N, 11-I, 10-C, 9-H, 8-E, 7-L, 6-L, 5-O, 4-P, 3-T, 2-I, and 1-C. Accordingly, as examples, subject data word 410A [5:1] is "OPTIC," subject data word 410E [9:5] is "HELLO," and subject data word 410H [12:8] is "NICHE."

It is of course not necessary that a given subject data word be comprised of a meaningful collection of subject-data blocks that, for example, spell out a legible word, or represent a particular computer-readable piece of information. To the contrary, because the subject data words are chosen at random, it is likely the case that many subject data words will be groups of subject-data blocks that are, taken alone, meaningless. For example, subject data word 410C [7:3] is the ostensibly meaningless "LLOPT." And subject-data blocks may take on any value that network traffic 300 may comprise including, for example, any of the 256 ASCII characters, though of course even this universe of possible block values is but an example.

With reference again to the example shown in FIG. 3C, it should be understood that subject data words 410 could be any one of seventeen sets of subject data words, each set made up of the eight data words of a particular length. For example, one other set of subject data words may be made up of the eight data words having a length of ten data blocks, and would therefore include the eight subject data words [17:8],[16:7], [15:6],[14:5],[13:4],[12:3],[11:2], and [10:1].

For understanding of the presently disclosed methods and systems, it may be beneficial in certain respects to view the 136 total data words shown in FIG. 3C as eight sets of subject data words, each set being made up of seventeen subject data words of different lengths. On the other hand, it may be beneficial in certain respects to view the 136 total data words as seventeen sets of subject data words, each set being made up of eight words of the same length. Both are accurate, and any such conceptual grouping of the data words is described only for purposes of explanation and organization. Subject data words 410 are of course an example of one of the seventeen sets of subject data words presented in connection with the example disclosure, each such set being made up of eight words of the same length, where that length is of course five data blocks per word for subject data words 410.

Figure 5:
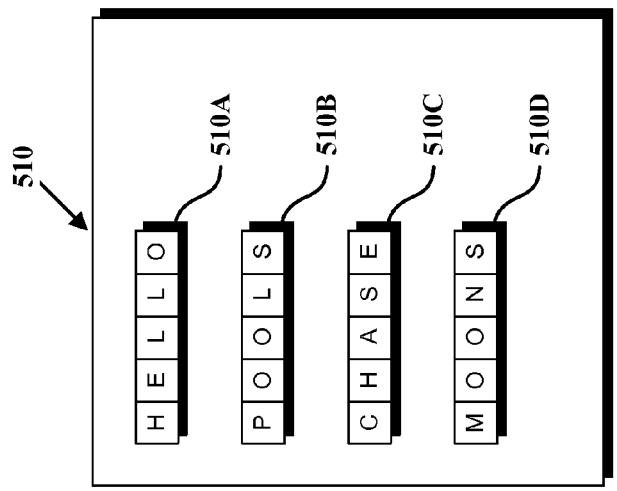
FIG. 5 depicts the example set of subject data words from FIG. 4, as well as an example set of signature data patterns.
Figure 5:
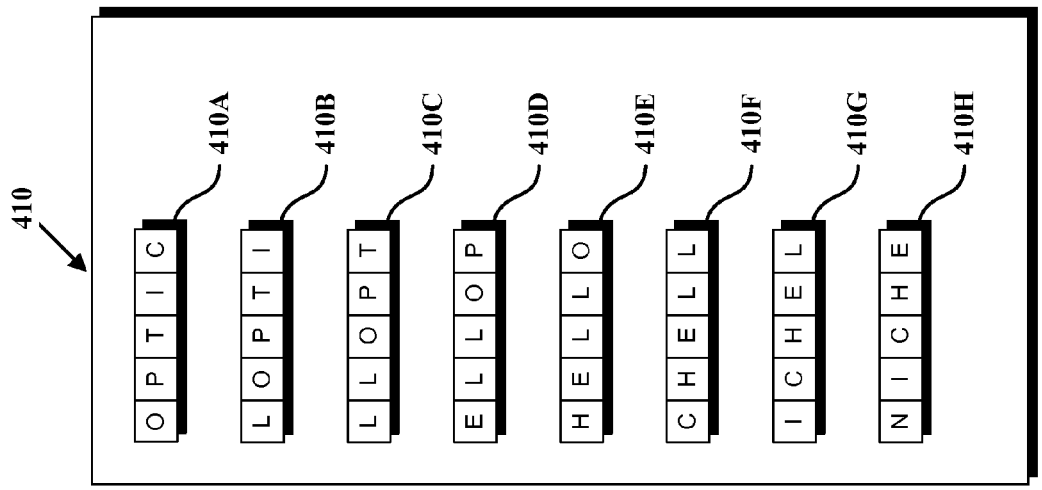

FIG. 5 depicts subject data words 410 along with an example set of signature data patterns 510. As can be seen, the set of signature data patterns 510 comprises four unique signature data patterns 510A-510D. It should be understood that the set of signature data patterns 510 is shown by way of example only and that, in general, subject data would be examined for the presence of any of a much larger number of signature data patterns, including signature data patterns of varying lengths. In particular, with respect to the example shown in FIG. 3C, it may be understood that subject data may be examined in accordance with each clock cycle for the presence of any one of a set of signature data patterns having lengths of four to twenty signature-data blocks, inclusive.

Note that each subject-data block in each of the subject data words 410, and each signature-data block in each of the signature data patterns 510, has a respective value and a respective position. As an example, with respect to subject data word 410A "OPTIC," the subject-data block "O" has the first position and a value of O, the subject-data block "P" has the second position and a value of P, and so on. As another example, with respect to signature data pattern 510A "HELLO," the signature-data block "H" has the first position and a value of H, the signature-data block "E" has the second position and a value of E, and so on. As the reader will appreciate, therefore, each of the subject-data blocks in the subject data word 410A "OPTIC" does not respectively match each of the signature-data blocks in the signature data pattern 510 "HELLO" with respect to both value and position. On the other hand, each of the subject-data blocks in subject data word 410E "HELLO" does respectively match each of the signature-data blocks in the signature data pattern 510 "HELLO" with respect to both value and position.

Figure 6A:
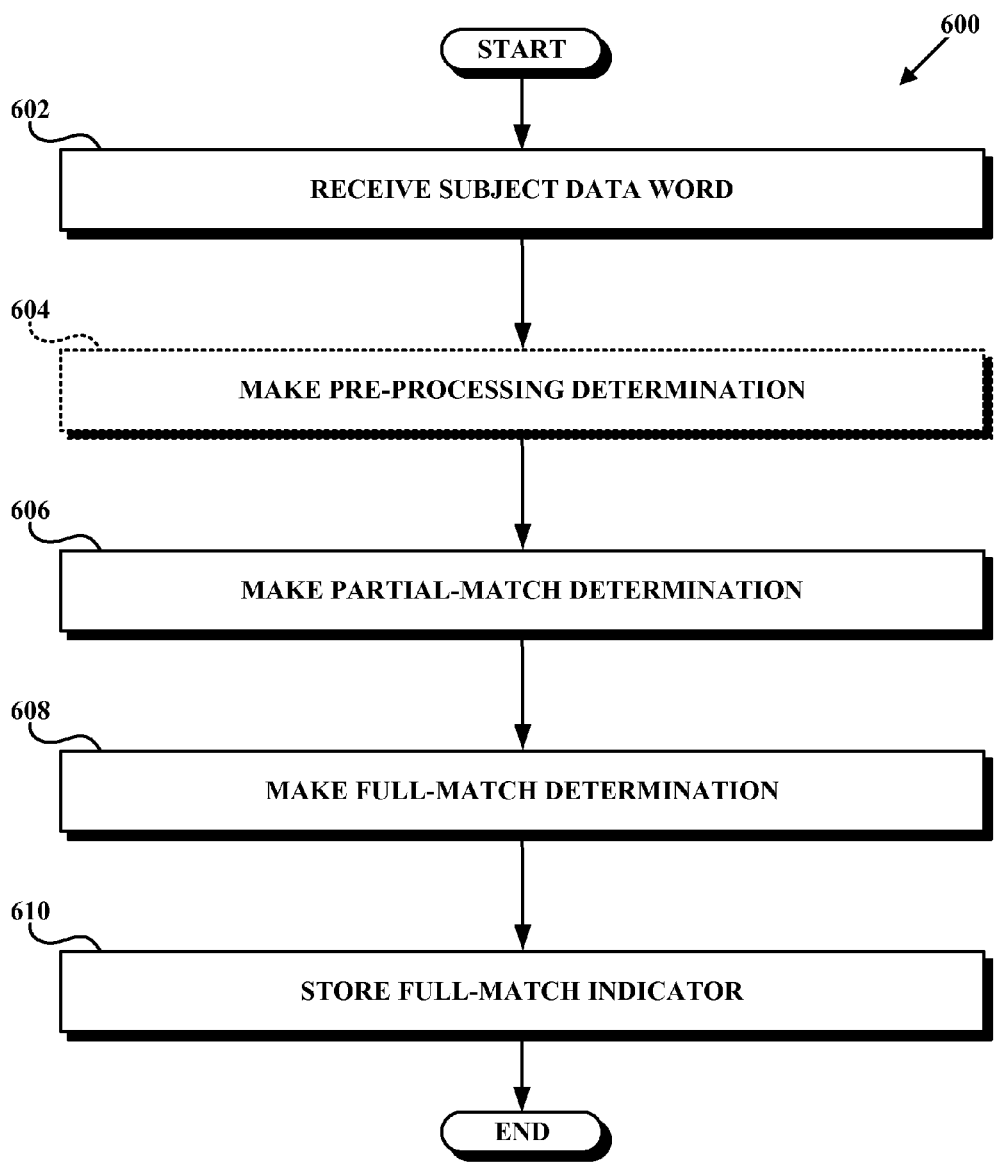
FIGS. 6A and 6B each depict a flowchart of an example of a method, each in accordance with at least one embodiment.
Figure 6B:
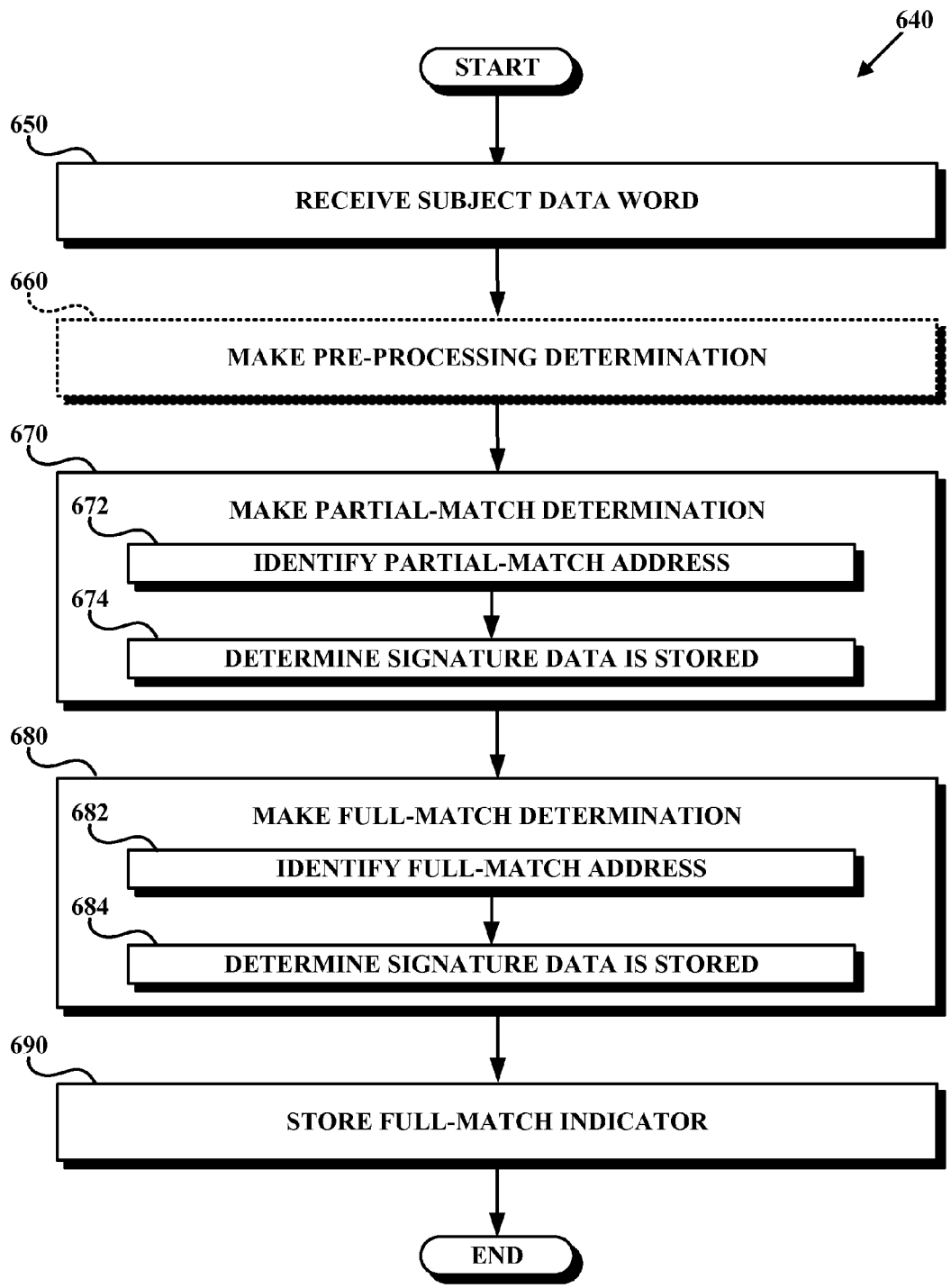

As described further below with reference to FIGS. 6A-6B, in the example described herein, each of the 136 data words shown in FIG. 3C, including subject data words 410, are examined to determine whether they exactly match any signature data patterns, such as signature data patterns 510A-510D. It should be understood that, as part of the example described herein, additional subject data words may be examined, and that additional signature data patterns may be checked for. FIGS. 6A and 6B depict flowcharts of methods 600 and 640, respectively, with each such figure illustrating a method for determining that a subject data word exactly matches a signature data pattern.

Figure 7:
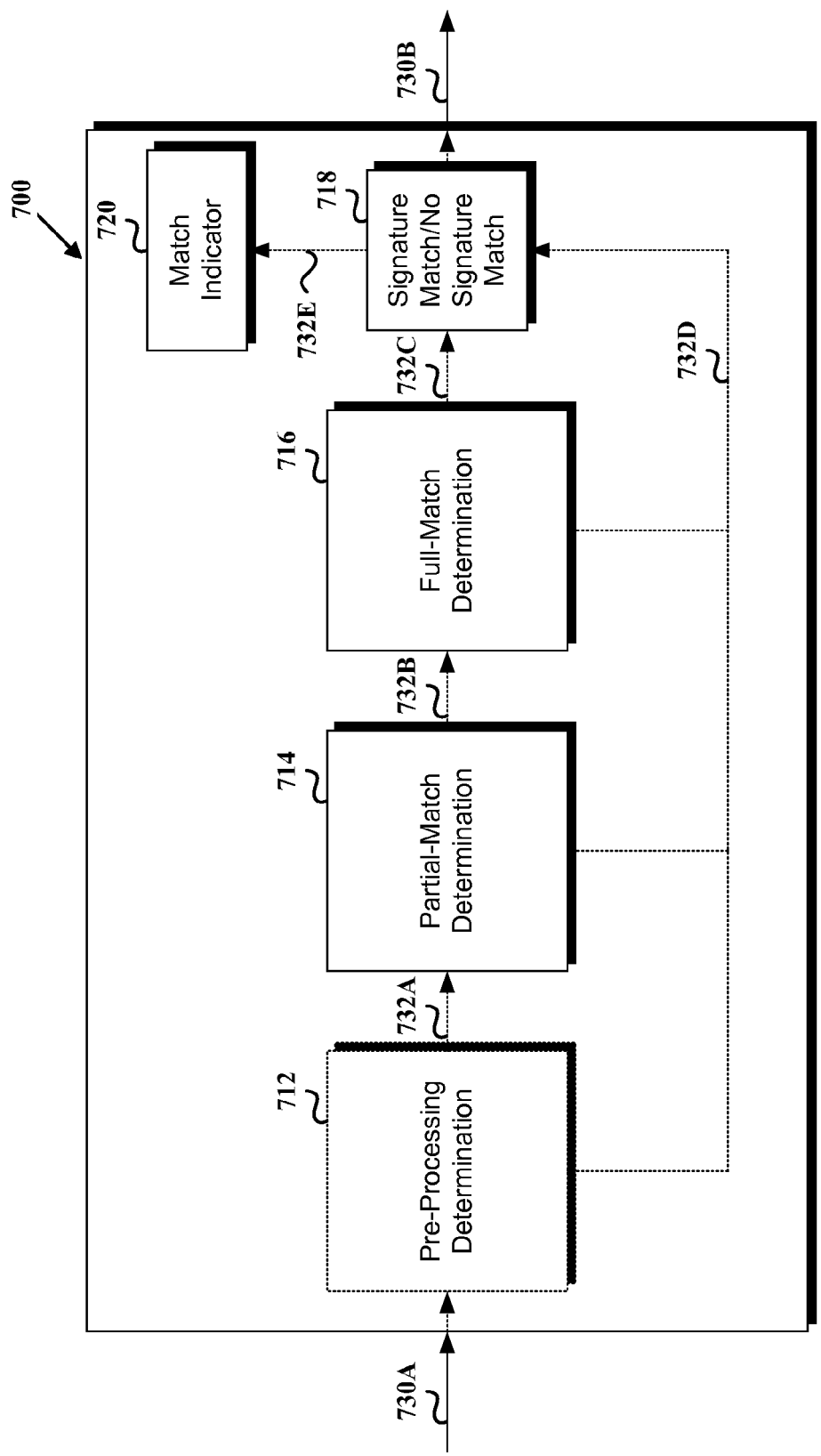
FIG. 7 depicts an example of an IPS-subject-word-flow map, in accordance with at least one embodiment.

Further, FIG. 7 depicts IPS-subject-word-flow map 700, which generally depicts an examination process, and corresponding determinations, that may be carried out and made by IPS 112 with respect to a given subject data word. For example, a given subject word, upon being received by IPS 112 as shown by arrow 730A, may initially be examined for the purpose of making pre-processing determination 712 regarding whether it can be established for certain that the subject data word does not match a signature data pattern. Note that, as discussed below, pre-processing determination 712 is optional. If pre-processing determination 712 is that the subject data word might match a signature data pattern, the subject data word may then be further examined for the purpose of making partial-match determination 714, as shown by arrow 732A.

Alternatively, if pre-processing determination 712 is that the subject data word definitely does not match any signature data pattern, the subject word may then skip being examined for the purpose of making partial-match determination 714 or full-match determination 716, as shown by arrow 732D. Instead, IPS 112 will recognize that there is not a signature match 718 with respect to the subject data word, and the subject data word will proceed, as indicated by arrow 730B.

Returning to arrow 732A, if pre-processing determination 712 is that the subject data word might match a signature data pattern, the subject data word may then be examined for the purpose of making partial-match determination 714 regarding whether at least two of the subject-data blocks in the subject data word respectively match at least two of the signature-data blocks in the signature data pattern with respect to both value and position. If partial-match determination 714 is that at least two subject-data blocks do match at least two signature-data blocks with respect to both value and position, the subject data word may then be examined for the purpose of making full-match determination 716, as shown by arrow 732B.

Alternatively, if partial-match determination 714 is that there are not at least two subject-data blocks that respectively match at least two signature-data blocks with respect to both value and position, the IPS need not examine the subject data word for the purpose of making the full-match determination 116, as shown by arrow 732D. Instead, IPS 112 recognizes that there is not a signature match 718 with respect to the subject data word, and the subject data word will proceed, as indicated by arrow 730B.

Returning to arrow 732B, if partial-match determination 714 is that at least two subject-data blocks do match at least two signature-data blocks with respect to both value and position, the subject data word may thereafter be examined for the purpose of making full-match determination 716 regarding whether the subject data word fully matches the signature data pattern. If full-match determination 716 is that the subject data word fully matches the signature data pattern, IPS 112 will recognize that there is a signature match 718 with respect to the subject data word, and the subject data word will proceed, perhaps to be quarantined, as indicated by arrow 730B. Also, if full-match determination 716 is that the subject data word fully matches the signature data pattern, IPS 112 may store a full-match indicator 720, as shown by arrow 732E.

Alternatively, if full-match determination 716 is that the subject data word does not fully match the signature data pattern, IPS 112 recognizes that there is not a signature match 718 with respect to the subject data word, and the subject data word will proceed, as indicated by arrow 730B.

Note that, in addition to an evaluation of the subject data word itself, the "class" of the subject data word, for example the port on which the subject data word was received and/or the communication protocol in accordance with which the subject data word was formatted, among other examples, may be evaluated by IPS 112 as well. That is, IPS 112 may evaluate at least one of the port and the protocol associated with the subject data word, along with the data blocks of the subject data word itself. Such evaluation of class may help reduce the occurrence of false positives in determination stages prior to full-match determination 716.

For example, if pre-processing determination 712 is that the subject data word may contain a particular signature data pattern, however, the particular signature data pattern is benign if found in a subject data word associated with the particular port and/or protocol of the subject data word, then the subject data word may simply be allowed to proceed without further evaluation. Those of skill in the art will appreciate that such additional consideration of the class of a subject data word may be implemented during either of pre-processing determination 712, partial-match determination 714, full-match determination 716, or other such match determination.

b. Receive Subject Data Word

Returning to FIGS. 6A-6B, at step 602 in FIG. 6A, and at corresponding step 650 in FIG. 6B, IPS 112 receives a subject data word. As discussed above, IPS 112 may receive the subject data word from any network to which IPS 112 is communicatively coupled. For example, IPS 112 may receive the subject data word from one or more wide area networks, one or more local area networks, one or more public networks such as the Internet, one or more private networks, one or more wired networks, one or more wireless networks, and/or one or more networks of any other type.

c. Make Pre-Processing Determination (Optional)

At step 604 in FIG. 6A, and at corresponding step 660 in FIG. 6B, IPS 112 makes optional pre-processing determination 712. Note that pre-processing determination 712 is optional, and may be generally carried out for the purpose of reducing the total number of subject data words that are examined for the purpose of making partial-match determination 714 and thus full-match determination 716. In other words, steps 604 and 660 may be omitted.

If IPS 112 is configured to make pre-processing determination 712, IPS 112 may comprise pre-processing hardware 240, as shown in FIG. 2. As discussed above, pre-processing hardware 240 may comprise a memory device such as Block RAM. Further, pre-processing hardware 240 may comprise multiple memory devices such as memory device 830A and memory device 830B as shown respectively in FIGS. 8A-8B. Note that such memory devices 830A-830B may be physically separate and distinct memory devices, or they may be physically integrated and configured to operate as separate memory devices.

Pre-processing memory device 830A(830B) generally comprises pre-processing memory addresses 832A(832B) that correspond to pre-processing-data-storage cells 834A(834B). For simplicity, the individual pre-processing memory addresses 832A(832B) of pre-processing memory devices 830A(830B) may be referred to simply as pre-processing addresses. The pre-processing-data-storage cells 834A(834B) may have a trigger indicator stored therein, that may or may not be flagged. In particular, pre-processing-data-storage cells 834A(834B) may store a single bit that may either be set (equal to 1) indicating a flagged trigger indicator, or may be cleared (equal to 0) indicating a trigger indicator that is not flagged. Further, as shown in FIG. 8C, each of the pre-processing memory addresses 832A(832B) may be represented in binary codes 836.

In general, pre-processing memory device 830A(830B) may be any suitable memory device configured to carry out the functions described herein. Without limitation, in an embodiment pre-processing memory device 830A(830B) may be Block RAM configured such that it contains 16,383 ($2^{14}$) memory addresses and corresponding data-storage cells. Further, as in the example shown in FIGS. 8A-8B, each data-storage cell may be configured to store a single bit. Accordingly, it is clear that pre-processing memory device 830A(830B) as shown in FIGS. 8A-8B is by way of example, and for the purposes of explanation only, and that no aspect of the example shown in FIGS. 8A-8B should be taken to be limiting.

The following sections generally describe how pre-processing hardware 240 is set-up for the purpose of representing signature data patterns, as well as how pre-processing hardware 240 operates to examine subject data words after being set-up.

d. Pre-Processing Hardware Set-Up

Figure 8A:
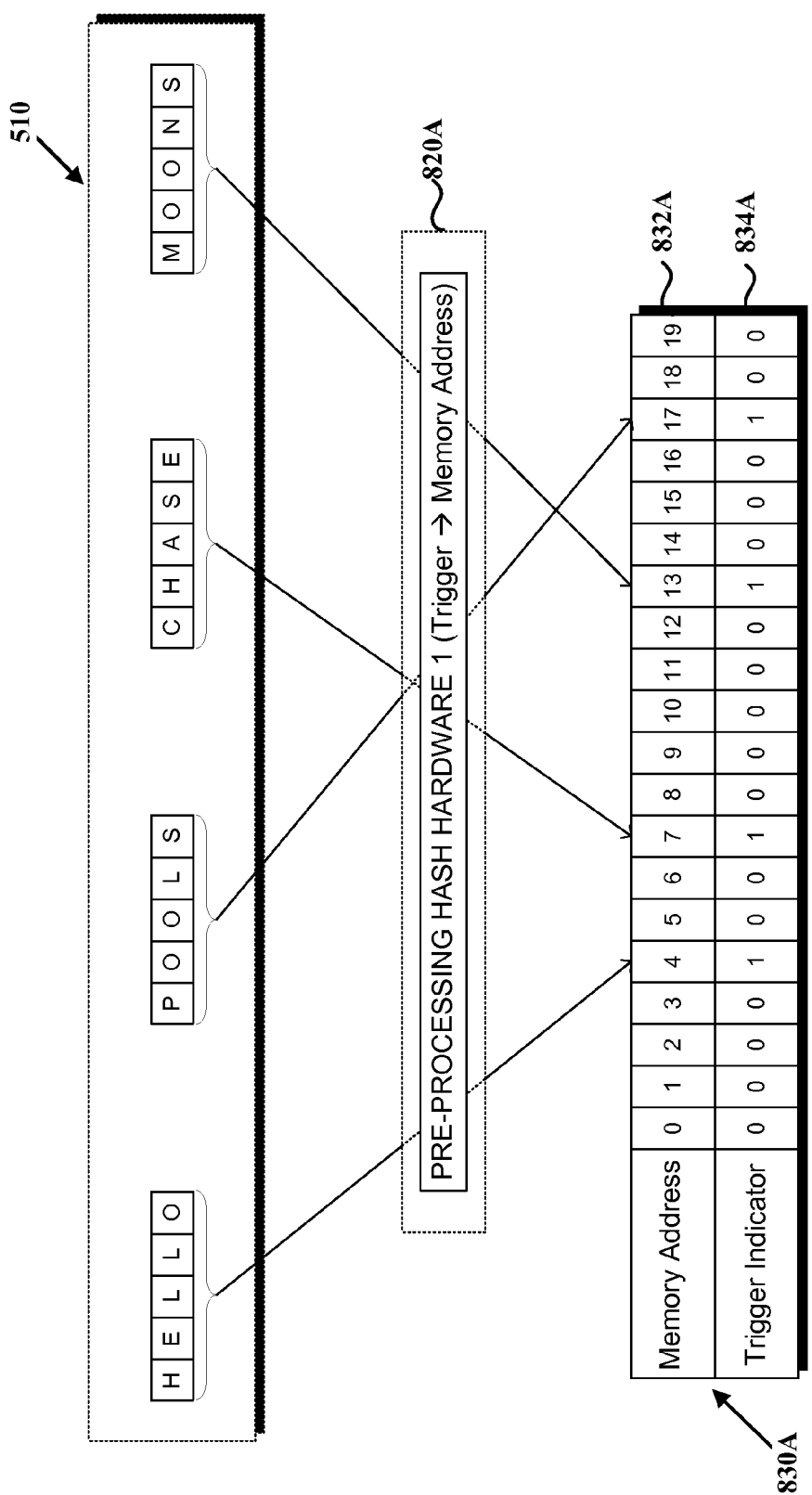
Figure 8B:
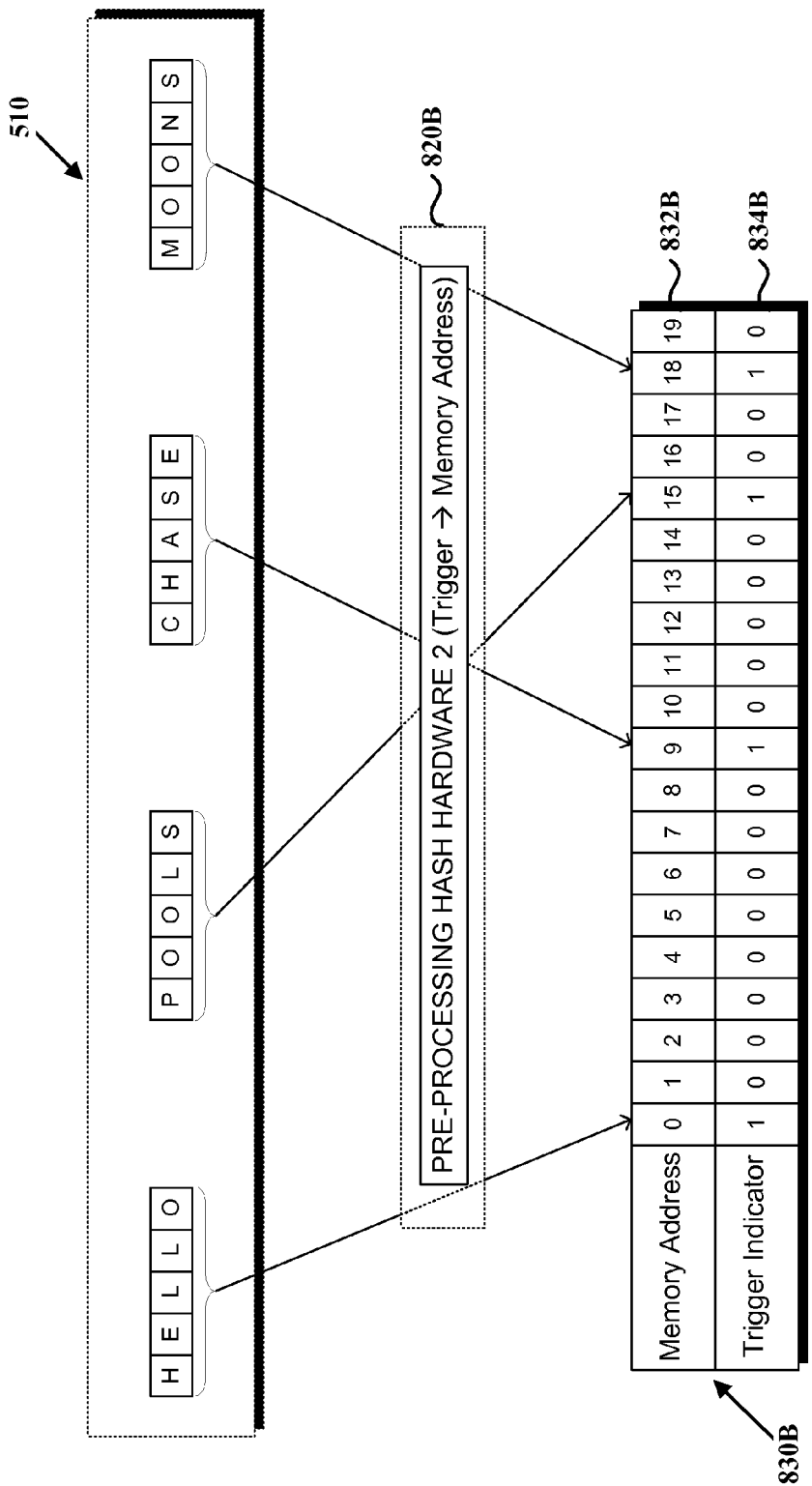

FIG. 8A(8B) generally depicts how pre-processing hardware 240, and more particularly pre-processing memory device 830A(830B), is set-up for the purpose of carrying out pre-processing determination 712 in an embodiment. In general, the pre-processing hardware 240 is configured so as to comprise hash tables representing signature data patterns for which network traffic 300 is to be examined.

In the specific embodiment described herein signature data patterns are grouped such that signature data patterns of the same group are the only signature data patterns represented in a given pre-processing memory device. In particular, as discussed further below, a given pre-processing memory device may be configured to represent only signature data patterns of a given length. Alternatively, as discussed further below, a given pre-processing memory device may be configured to represent only signature data patterns of a group of particular varying lengths. Nonetheless, such embodiments are described by way of example only and it should be understood that other pre-processing memory device configurations are possible as well.

As part of the configuration of example pre-processing memory device 830A(830B), signature data patterns 510 are passed through pre-processing hash hardware 820A(820B). Pre-processing hardware 820A(820B) may comprise any suitable hardware including processors, memory, data storage, or combination thereof configured so as to implement a particular pre-processing hash equation.

Each of the signature data patterns 510 are input into the pre-processing hash equation implemented in pre-processing hash hardware 820A(820B). The result of each pre-processing hash equation, or the pre-processing-signature-hash result, indicates a pre-processing memory address 832A (832B) in pre-processing memory device 830A(830B). Thus, pre-processing hardware 820A(820B) maps each of the signature data patterns 510 to particular pre-processing memory addresses 832A(832B). In other words, pre-processing hash hardware 820A(820B) outputs a pre-processing-signature-hash result for each of the signature data patterns 510 that is used to map each of the signature data patterns 510 to particular pre-processing memory addresses 832A(832B). The pre-processing-signature hash result may be a particular pre-processing address itself, or the pre-processing-subject hash result might be modified, interpreted, or otherwise used to identify a particular pre-processing address.

In general, the combination of pre-processing hash hardware 820A and pre-processing memory device 830A, together with the combination of pre-processing hash hardware 820B and pre-processing memory device 830B, may be thought of as elements of an example pre-processing hash machine that is configured to represent a group of signature data patterns 510 each having a length of five signature data blocks. As will be discussed further below, in an embodiment, such a pre-processing hash machine also operates on one of subject data words 410, which have the same length of five subject-data blocks. A similar pre-processing hash machine is set-up for each subject data word to be examined in accordance with a given clock cycle, and such a pre-processing hash machine is configured to represent a group of signature data patterns having the same length as the subject data word it operates on.

In the example shown in FIG. 8A, "HELLO" is mapped to pre-processing address 4 (00100 in binary), "POOLS" is mapped to pre-processing address 17 (10001), "CHASE" is mapped to pre-processing address 7 (00111), and "MOONS" is mapped to pre-processing address 13 (01101). Correspondingly, the trigger indicator is set equal to "1" at each of the pre-processing-data-storage cells 834A that one of the signature data patterns 510 mapped to. In particular, the trigger indicators are set at pre-processing addresses 4, 7, 13, and 17. Note that the trigger indicator remains cleared at each of the pre-processing addresses that none of the signature data patterns 510 are mapped to. In this way, the pre-processing-signature-hash results output by pre-processing hash hardware 820A are flagged in memory device 830A.

In the example shown in FIG. 8B, "HELLO" is mapped to pre-processing address 0 (00000), "POOLS" is mapped to pre-processing address 15 (01111), "CHASE" is mapped to pre-processing address 9 (01001), and "MOONS" is mapped to pre-processing address 18 (10010). Correspondingly, the trigger indicators are set at pre-processing addresses 0, 9, 15, and 18, while the trigger indicators remain cleared at all other pre-processing addresses. In this way, the pre-processing-signature-hash results output by pre-processing hash hardware 820B are flagged in memory device 830B.

The reader will note that signature data patterns 510 are mapped to pre-processing addresses by pre-processing hash hardware 820A that are different from those pre-processing addresses mapped to by pre-processing hash hardware 820B. This is generally due to different pre-processing hash equations being implemented in each of pre-processing hash hardware 820A and pre-processing hash hardware 820B. As a result, pre-processing memory device 830A is configured to represent signature data patterns 510 in a way that is unique with respect to the representation of pre-processing memory device 830B. Such unique representations may be beneficial when examining subject data words for reasons that will become apparent with respect to the use of pre-processing hardware 240, described below.

The reader will also note that, in the example shown in FIGS. 8A-8B, the total number of pre-processing memory addresses 832A(832B) in pre-processing memory device 830A(830B) is relatively larger than the total number of signature data patterns 510. More particularly, pre-processing memory devices 830A-830B each have twenty pre-processing addresses whereas there are only four signature data patterns 510, for a ratio of signature data patterns to pre-processing addresses of approximately one to five, or twenty percent. Those of skill in the art will appreciate that, as is generally the case with processes that utilize hash equations, it may be beneficial that such a ratio of signature data patterns to pre-processing addresses remains relatively low. Generally, the lower such a ratio, the fewer the false positives that will result, as discussed further below.

Similarly, those of skill in the art will appreciate that it may be beneficial for the set of signature data patterns to be mapped in such a way so that their distribution across available pre-processing addresses is even. Generally, the more even the distribution of signature data patterns in the memory device, the fewer the false positives that will result when examining subject data words.

As mentioned above, in an embodiment, there may be a pre-processing hash machine that corresponds to each subject data word to be examined in accordance with a given clock cycle. Also, as shown with respect to FIGS. 8A-8B, a given pre-processing hash machine may comprise multiple memory devices, such as preprocessing memory devices 832A(832B).

Figure 8D:
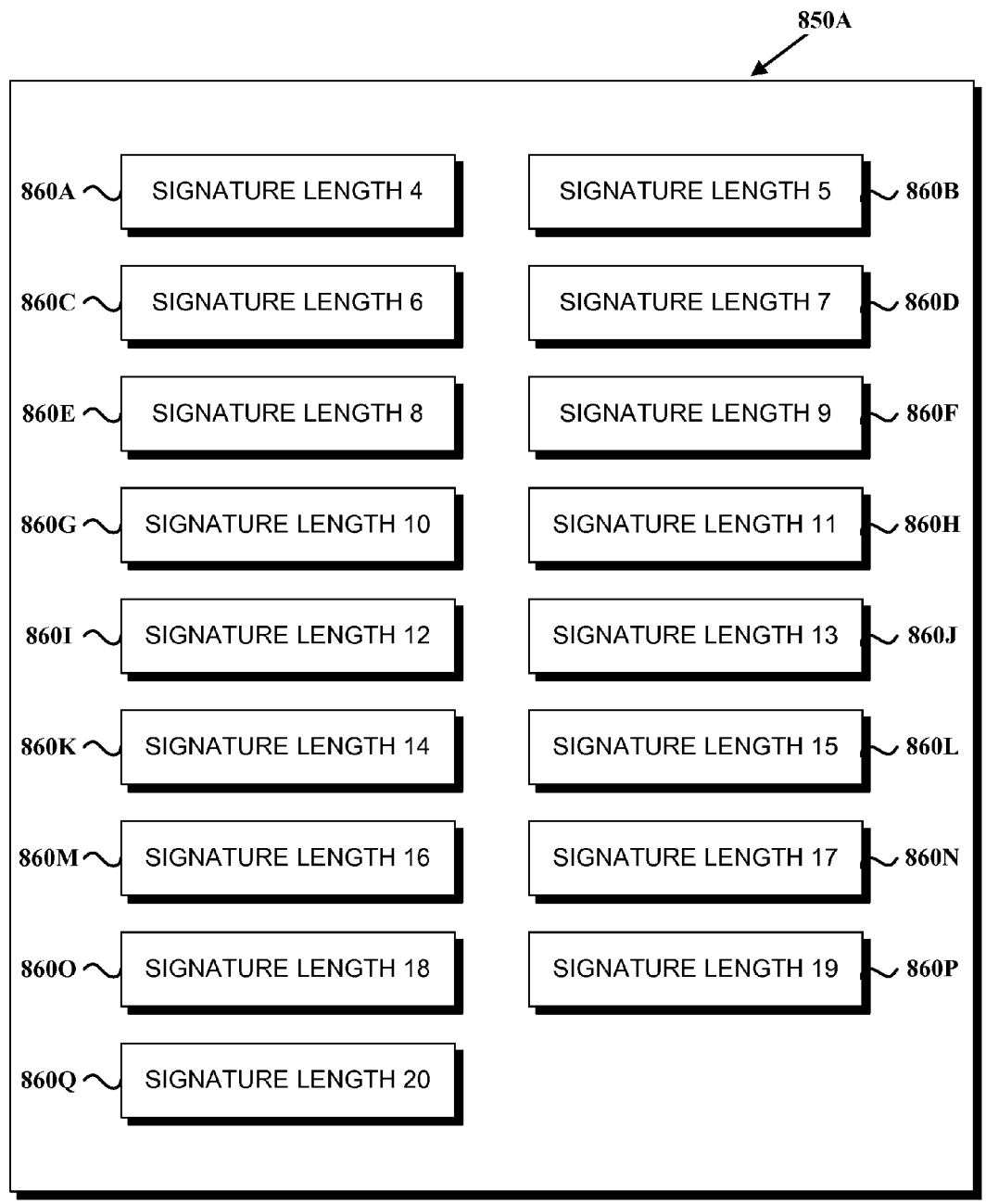

There may further be multiple groups of pre-processing hash machines, wherein each of the pre-processing hash machines within a given group of pre-processing hash machines is configured to operate on subject data words of the same length. For example, FIG. 8D shows pre-processing-hash-machine groups 850A such as pre-processing-hash-machine groups 860A-860Q. In an embodiment, pre-processing hardware 240 may comprise pre-processing-hash-machine groups 850A, with each pre-processing-hash-machine group 860A-860Q comprising multiple pre-processing hash machines. Each of pre-processing-hash-machine groups 860A-860Q may be configured to represent signature data patterns of a particular length. For example, pre-processing-hash-machine group 860A is configured to represent signature data patterns having a length of four signature-data blocks, pre-processing-hash-machine group 860I is configured to represent signature data patterns having a length of twelve signature-data blocks, and pre-processing-hash-machine group 860Q is configured to represent signature data patterns having a length of twenty signature-data blocks.

Figure 8E:
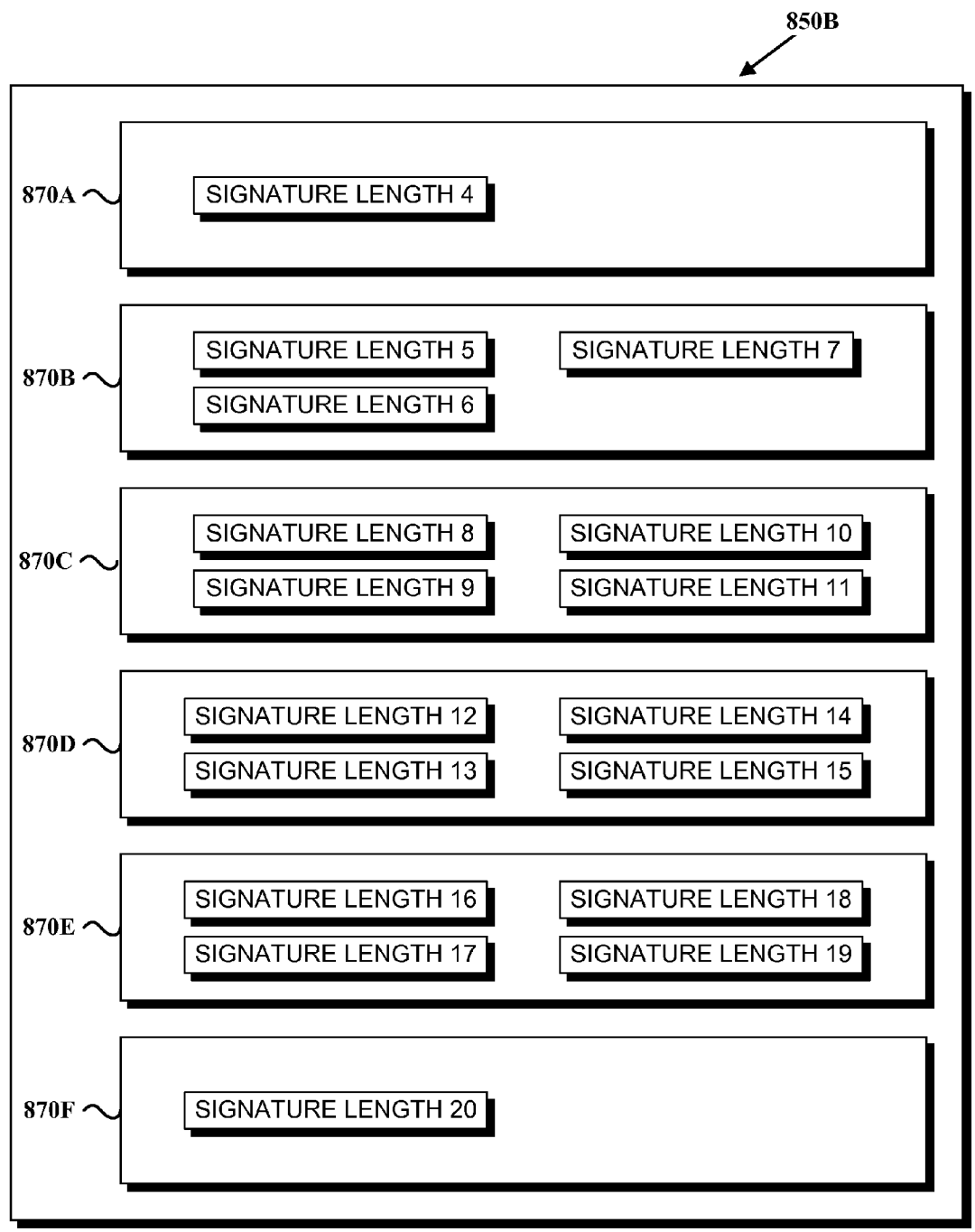

In another embodiment, there may be pre-processing-hash-machine groups comprising pre-processing hash machines, each pre-processing hash machine configured to represent signature data patterns of varying lengths. For example, FIG. 8E shows pre-processing-hash-machine groups 850B such as pre-processing-hash-machine groups 870A-870F. In an embodiment, pre-processing hardware 240 may comprise pre-processing-hash-machine groups 850B. Some of pre-processing-hash-machine groups 870A-870F, such as pre-processing-hash-machine groups 870A and 870F, are configured to represent signature data patterns of only a single, particular, length. However, some of pre-processing-hash-machine groups 870A-870F, such as pre-processing-hash-machine groups 870B-870E, are configured to each represent signature data patterns of varying lengths. For example, pre-processing-hash-machine group 870B is configured to represent signature data patterns having a length of five, six, and seven signature-data blocks, and hash machine 870E is configured to represent signature data patterns having a length of sixteen, seventeen, eighteen, and nineteen signature-data blocks.

When a given pre-processing hash machine is configured to represent signature data patterns of varying lengths, as shown in FIG. 8E with respect to pre-processing-hash-machine groups 870B-870E, only a given number of signature-data blocks, that is less than all of the signature-data blocks, of each signature data pattern might be used as an input to the corresponding pre-processing hash equation implemented in pre-processing hash hardware. For example, pre-processing hash machines in pre-processing-hash-machine group 870B may be configured to represent only the first five signature-data blocks of each of the signature data patterns, regardless of whether their length is five, six, or seven signature-data blocks. It should be understood that, in general, pre-processing hash machines can be configured to represent any suitable number of signature-data blocks from such signature data patterns. Further the signature-data blocks may be taken from any part of the signature data patterns including the beginning as well as the middle or end.

As one particular example, assume for the moment that the pre-processing hash machines of pre-processing-hash-machine group 870B are configured to represent each of three signature data patterns including a signature data pattern having a length of five signature-data blocks such as "HELPI," a signature data pattern having a length of six signature-data blocks such as "HELPIN," and a signature data pattern having a length of seven signature-data blocks such as "HELPING." Each of such signature data patterns may be input to pre-processing hash hardware according to its respective first five signature-data blocks. In other words each of the signature data patterns "HELPI," "HELPIN," and "HELPING," may be represented as if they were each the signature data pattern "HELPI." As a result, each of the signature data patterns "HELPI," "HELPIN," and "HELPING" would map to the same pre-processing address in a given pre-processing memory device. Further, in such an embodiment subject data words of corresponding lengths may be examined in an analogous fashion.

Setting up pre-processing hardware 240 using groups of signature data patterns having varying lengths according to the example shown in FIG. 8E may result in relatively more undesirable false-positive results when examining subject data words. On the other hand, setting up pre-processing hardware 240 according to the example shown in FIG. 8E may enable a larger set of signature data patterns to be represented in a given amount of available memory than would otherwise be possible according to the example shown in FIG. 8D. For example, whereas a single configured pre-processing memory device is required in FIG. 8E to represent all of the signature data patterns having a length of five, six, and seven signature-data blocks, three configured memory devices are required in FIG. 8D to respectively represent each of the signature data patterns having a length of five, six, and seven signature-data blocks.

Figure 8F:
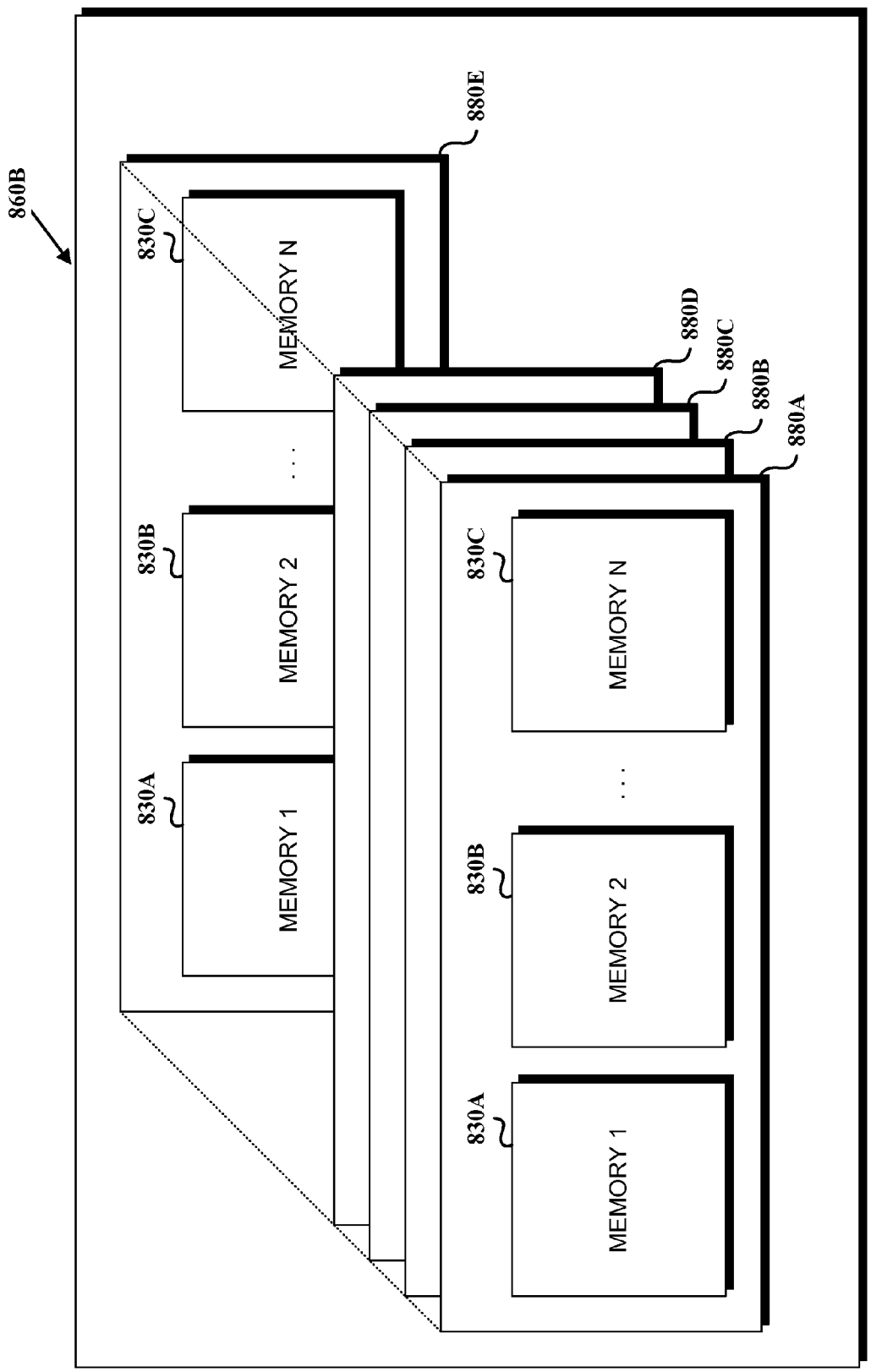

As discussed above, and as shown in FIG. 8F, a given pre-processing-hash-machine group, such as pre-processing-hash-machine group 860B, may comprise multiple pre-processing hash machines 880A-880E, with each pre-processing hash machine 880A-880E comprising at least one pre-processing memory device, such as pre-processing memory device 830A. As shown, each pre-processing hash machine 880A-880E may also comprise a second pre-processing memory device 830B, as well as any number of additional pre-processing memory devices up to a representative pre-processing memory device 830C. The more pre-processing memory devices that are used in a given pre-processing hash machine the greater number of unique representations of signature data patterns 510 that may be stored in pre-processing hardware 240 and the less false positives that will result when examining subject data words.

Pre-processing-hash-machine group 860B may also generally comprise any number of pre-processing hash machines, such as pre-processing hash machines 880A-880E. The total number of pre-processing hash machines in a given pre-processing-hash-machine group may correspond to the total number of subject data patterns to be examined by the particular pre-processing-hash-machine group in accordance with a given clock cycle. In an embodiment, pre-processing-hash-machine group 860B may comprise eight pre-processing hash machines, each pre-processing hash machine corresponding to one of the eight subject data patterns 410.

Thus, in summary, in an embodiment pre-processing hardware 240 may comprise a number of pre-processing-hash-machine groups. Each of the pre-processing-hash-machine groups may be configured to represent a different set of signature data patterns having the same length, as do hash machine groups 860A-860Q; or each of the pre-processing-hash-machine groups may be configured to represent a set of signature data patterns having varying lengths, such as hash machine groups 870A-870F. Each pre-processing-hash-machine group generally comprises individual pre-processing hash machines, such as pre-processing hash machines 880A-880E. The total number of pre-processing hash machines within pre-processing hardware 240 may correspond to the total number of subject data words to be examined in accordance with a given clock cycle.

Each pre-processing hash machine comprises at least one pre-processing memory device, such as pre-processing memory device 830A. Pre-processing memory device 830A comprises pre-processing memory addresses 832A and pre-processing-data-storage cells 834A that store trigger indicators. Each pre-processing memory device may be associated with pre-processing hash hardware, such as pre-processing hash hardware 820A, that outputs pre-processing-signature-hash results based on signature data patterns. The pre-processing-signature-hash results are used to map signature data patterns to pre-processing addresses in the pre-processing memory device. Pre-processing-signature-hash results are flagged at pre-processing addresses to which signature data patterns are mapped by setting the trigger indicator at the corresponding pre-processing address. The trigger indicators remain cleared at all other pre-processing addresses.

The foregoing section generally describes how pre-processing hardware 240 is set-up for the purpose of representing signature data patterns. The section that follows describes how pre-processing hardware 240 operates to examine subject data words, after being set-up.

e. Pre-Processing Hardware in Use

Figure 9A:
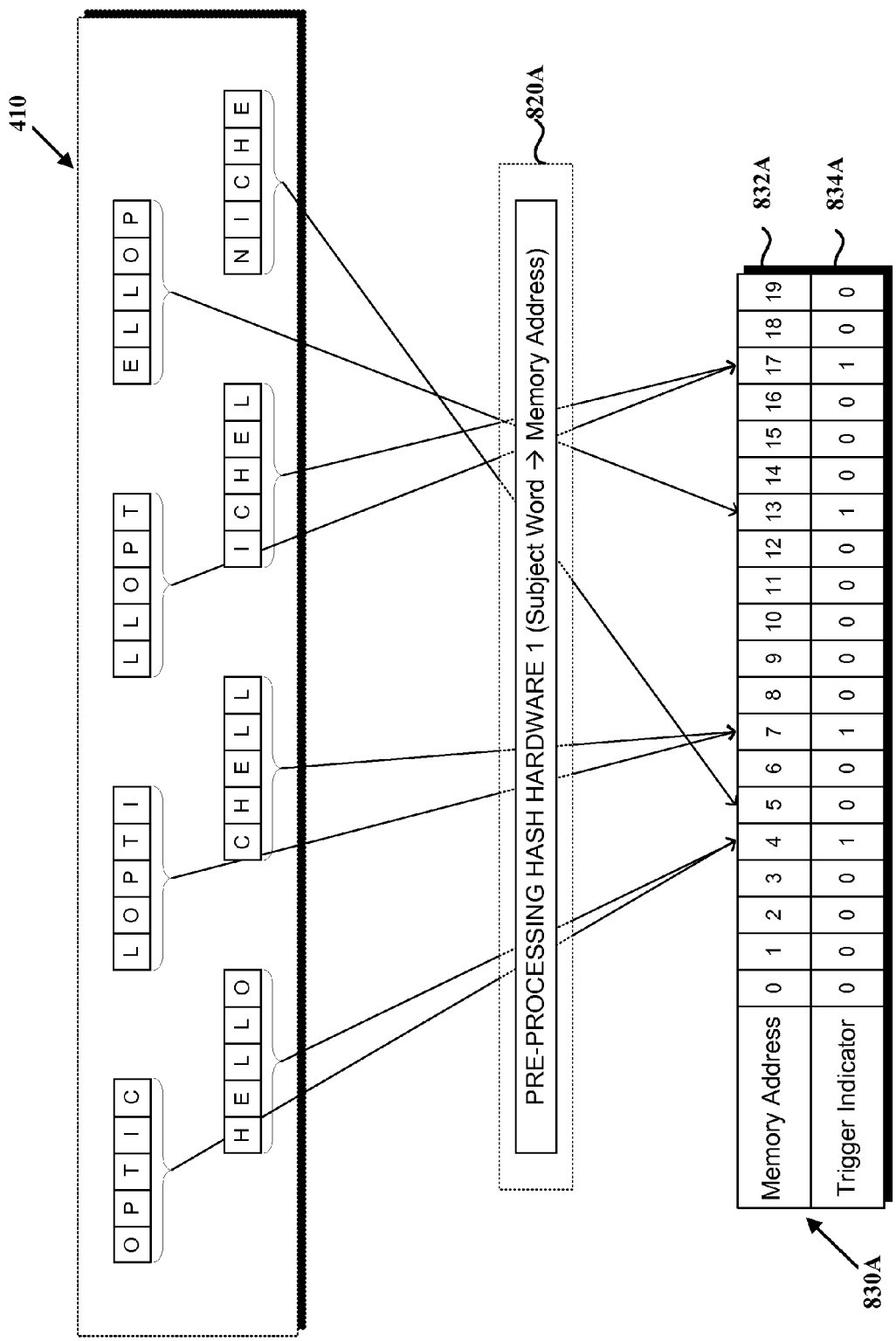
FIGS. 9A and 9B depict examples of pre-processing hardware and its use, in accordance with at least one embodiment.
Figure 9B:
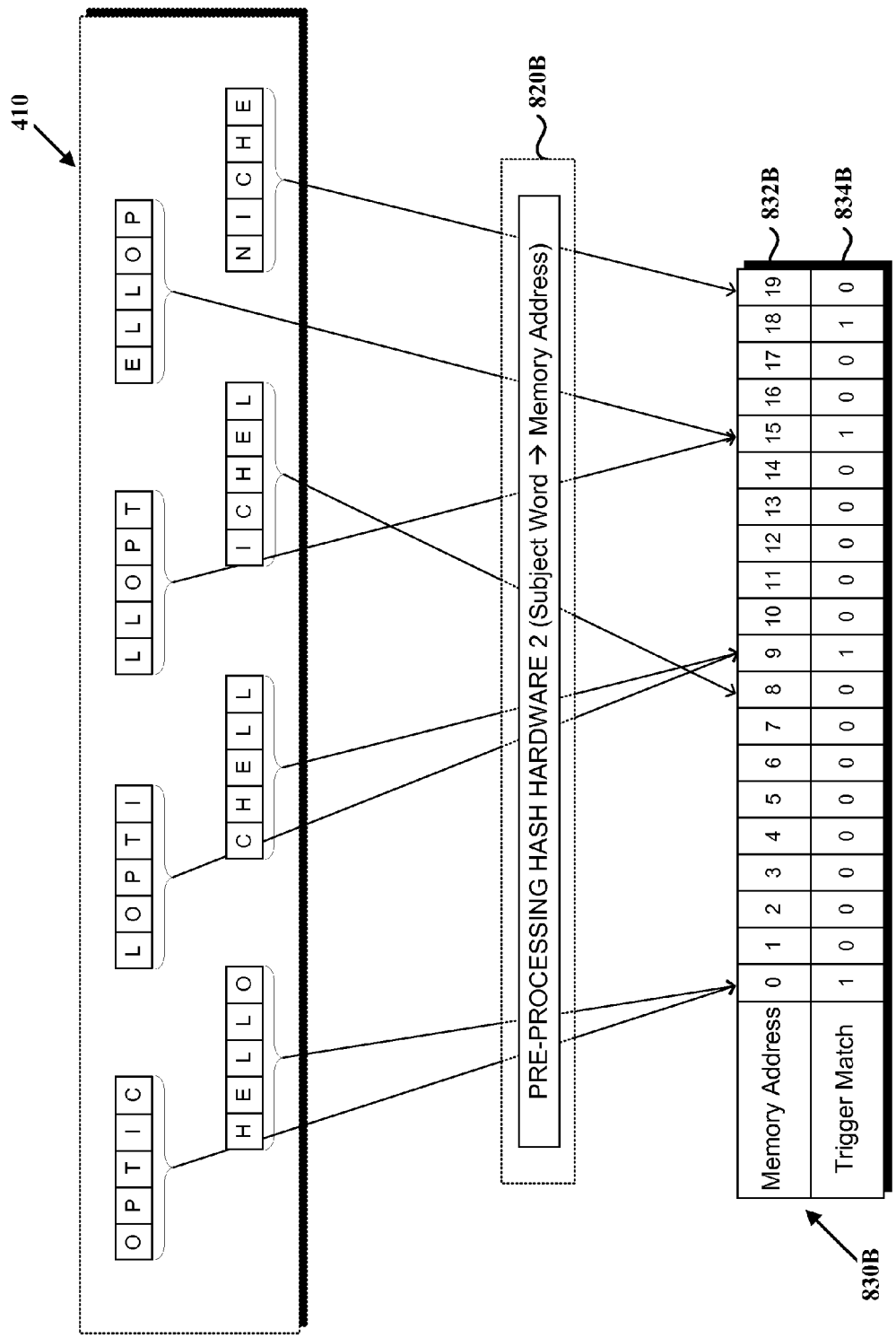

Turning now to FIGS. 9A-9B, subject data words 410 are mapped to pre-processing memory device 830A(830B) in much the same way as signature data patterns 510 are mapped during the set-up of pre-processing hardware 240 as described above. In particular, subject data words 410 are passed through pre-processing hash hardware 820A(820B) and each of the signature data patterns 410 are input into the pre-processing hash equation implemented in pre-processing hardware 820A(820B). Pre-processing hash hardware 820A (820B) outputs a pre-processing-subject-hash result that indicates a pre-processing memory address 832A(832B) in pre-processing memory device 830A(830B).

Thus, pre-processing hardware 820A(820B) maps each of the subject data patterns 410 to particular pre-processing memory addresses 832A(832B). In other words, pre-processing hash hardware 820A(820B) outputs a pre-processing-subject-hash result for each of the subject data words 410 that is used to map each of the subject data words 410 to particular pre-processing memory addresses 832A(832B). The pre-processing-subject-hash result may be a particular pre-processing address itself, or the preprocessing-subject-hash result might be modified, interpreted, or otherwise used to identify a particular pre-processing address.

As discussed above, the combination of pre-processing hardware 820A and pre-processing memory device 830A, along with the combination of pre-processing hardware 820B and pre-processing memory device 830B, may be thought of as elements of an example pre-processing hash machine that has been configured for the purpose of examining each of a group of subject data words, such as subject data words 410 having lengths of five subject-data blocks. Note that in the embodiment described herein, the pre-processing-hash hardware used during set-up and operation of pre-processing hardware 240 is the same. However, other embodiments are possible as well, including embodiments in which the pre-processing-hash hardware used during set-up is different from that used during operation.

In the example depicted in FIG. 9A, subject data words "OPTIC" and "HELLO" are mapped to pre-processing address 4 (00100), "NICHE" is mapped to pre-processing address 5 (00101), "LOPTI" and "CHELL" are mapped to pre-processing address 7 (00111), "ELLOP" is mapped to pre-processing address 13 (01101), and "LLOPT" and "ICHEL" are mapped to pre-processing address 17 (10001). As can be seen, only certain of the pre-processing addresses to which subject data words 410 are mapped in pre-processing memory device 830A have a flagged pre-processing-signature-hash result, or set trigger indicator. In particular, pre-processing address 5, which "NICHE" mapped to, has a cleared trigger indicator.

In the example depicted in FIG. 9B, subject data words "OPTIC" and "HELLO" are mapped to pre-processing address 0 (00000), "ICHEL" is mapped to pre-processing address 8 (01000), "LOPTI" and "CHELL" are mapped to pre-processing address 9 (01001), "LLOPT" and "ELLOP" are mapped to pre-processing address 15 (01111), and "NICHE" is mapped to pre-processing address 19 (10011). As can be seen, only certain of the pre-processing addresses to which subject data words 410 are mapped in pre-processing memory device 830B have a flagged pre-processing-signature-hash result, or set trigger indicator. In particular, pre-processing address 8 and pre-processing address 19, which "ICHEL" and "NICHE" mapped to respectively, have a cleared trigger indicator.

Therefore, in both of the examples shown in FIGS. 9A-9B only certain of the pre-processing addresses to which subject data words 410 are mapped have a flagged pre-processing-signature-hash result. For those subject data words that are mapped to pre-processing addresses having a cleared trigger indicator, it is possible to determine that those subject data words do not fully match any signature data patterns. After all, if a given subject data word exactly matches a given signature data pattern, the given subject data word and the given signature data pattern will be mapped to the same pre-processing address during operation and set-up of pre-processing hardware 240 respectively. In other words, the associated pre-processing-subject-hash result and the associated pre-processing-signature-hash result, respectively, would be the same.

Figure 10:
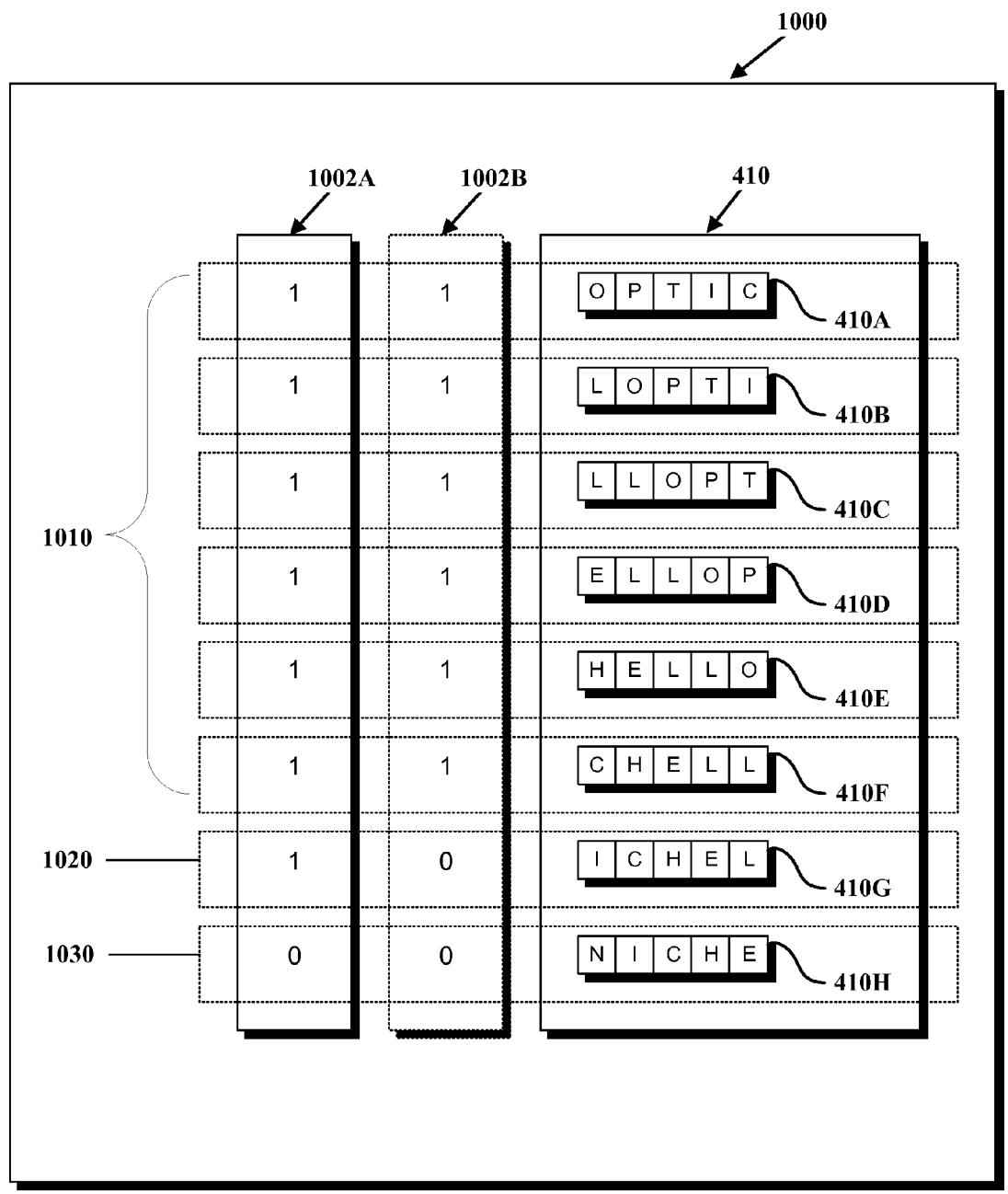
FIG. 10 depicts an example of a pre-processing match chart, in accordance with at least one embodiment.

With reference to the pre-processing match chart depicted in FIG. 10, it can be seen that each of the subject data words "OPTIC," "LOPTI," "LLOPT," "ELLOP," "HELLO," and "CHELL" mapped to a pre-processing address in both memory device 830A and memory device 830B that had a set trigger indicator. In particular, column 1002A shows the trigger indicators associated with each subject data word 410 with respect to memory device 830A, and column 1002B shows the trigger indicators associated with each subject data word 410 with respect to memory device 830B. Those subject data words that are associated with set trigger indicators in both memory devices 830A-830B make up a group of subject data words, as indicated by callout 1010, for which it cannot be said for sure that those subject data words do not match a signature data pattern. In other words, subject data words 1010 cannot be ruled out by pre-processing determination 712.

On the other hand, the subject data word "ICHEL" mapped to a pre-processing address in memory device 830A that had a set trigger indicator but mapped to a pre-processing address in memory device 830B that had a cleared trigger indicator, as indicated by callout 1020. Despite the set trigger indicator with respect to memory device 830A, because there is a cleared trigger indicator with respect to memory device 830B, it can be said for sure that the subject data word "ICHEL" does not match a signature data pattern. Additionally, the subject data word "NICHE" mapped to a pre-processing address in both memory device 830A and memory device 830B that had a cleared trigger indicator, as indicated by callout 1030. As such, it can be said for sure that the subject data word "NICHE" also does not match a signature data pattern.

Note that, despite the fact that the only subject data word that exactly matches any of the signature data patterns 510 is "HELLO," five additional subject data words other than "HELLO" have not been ruled out as definitely not matching one of the signature data patterns 510. In particular, subject data words "OPTIC," "LOPTI," "LLOPT," "ELLOP," and "CHELL" have given rise to a false-positive indication that those subject data words may match one of the signature data patterns. As a result, the six subject data words "HELLO," "OPTIC," "LOPTI," "LLOPT," "ELLOP," and "CHELL" must be further examined by IPS 112 to determine if they exactly match one of the signature data patterns 510. On the other hand, because it is clear that the two subject data words "ICHEL" and "NICHE" do not exactly match one of the signature data patterns 510, those subject data words need not be further examined by IPS 112.

Further note that, although the above described embodiment involves the use of two pre-processing memory devices 830A-830B with respect to each of the subject data words and signature data patterns, any number of pre-processing memory devices may be used as discussed above with respect to FIG. 8F. As one example, a total of four pre-processing memory devices may be used in each pre-processing hash machine, along with a corresponding total of four pre-processing hash equations implemented in pre-processing hash hardware. As the number of pre-processing memory devices used increases, the number of false-positive indications arising during pre-processing determination 712 will decrease. As can now be readily appreciated, this is because it will be less likely that each of the increasing number of pre-processing-subject-hash results associated with subject data words that do not match a signature data pattern will be flagged.

Further note that, each of the 136 subject data words to be examined may be examined by pre-processing hardware 240 in parallel at the same time. As discussed above, with respect to FIGS. 8D-8F each signature data pattern length, or group of signature data pattern lengths, is associated with a particular pre-processing-hash-machine group such as pre-processing-hash-machine groups 860A-860Q or pre-processing-hash-machine groups 870A-870F. Further, each pre-processing-hash-machine group comprises a pre-processing hash machine, such as one of pre-processing hash machines 880A-880E, used to examine one of the many subject data words that are examined in accordance with a given clock cycle. As a result, the pre-processing-subject-hash result may be generated by the relevant pre-processing hash hardware for each subject data word at substantially the same time. Accordingly, IPS 112 may make a pre-processing determination that a requisite pre-processing number of pre-processing-subject-hash results are flagged as being pre-processing-signature hash results at substantially the same time, for each subject data word.

f. Make Partial-Match Determination

At step 606 in FIG. 6A, and at corresponding step 670 in FIG. 6B, IPS 112 makes partial-match determination 714. In the case that IPS 112 is configured to make optional pre-processing determination 712, partial-match determination 714 may be made subsequent to pre-processing determination 712. However, in the case that IPS 112 is not configured to make pre-processing determination 712, the partial-match determination may be the first determination made by IPS 112.

Note that in the case that IPS 112 is configured to make pre-processing determination 712, partial-match determination 714 may be carried out only with respect to those subject data words for which there remains a question as to whether or not the subject data word exactly matches a signature data pattern. In accordance with the example described herein, partial-match determination 714 may therefore only be carried out with respect to the subject data words "HELLO," "OPTIC," "LOPTI," "LLOPT," "ELLOP," and "CHELL." Partial-match determination 714 need not be carried out with respect to the subject data words "ICHEL" and "NICHE" because it is clear from pre-processing determination 712 that those subject data words do not match one of the signature data patterns 510.

In an embodiment, IPS 112 may comprise partial-match hardware 242, as shown in FIG. 2. As discussed above, partial-match hardware 242 may comprise a memory device such as SRAM. Note that partial-match hardware 242 may comprise more than 1 SRAM memory device, such as, for example, four SRAM memory devices. As discussed further below, the total number of partial-match memory devices included in partial-match hardware 242 may correspond to the total number of subject data words that may be examined by partial-match hardware 242 in parallel, at the same time.

Figure 11A:
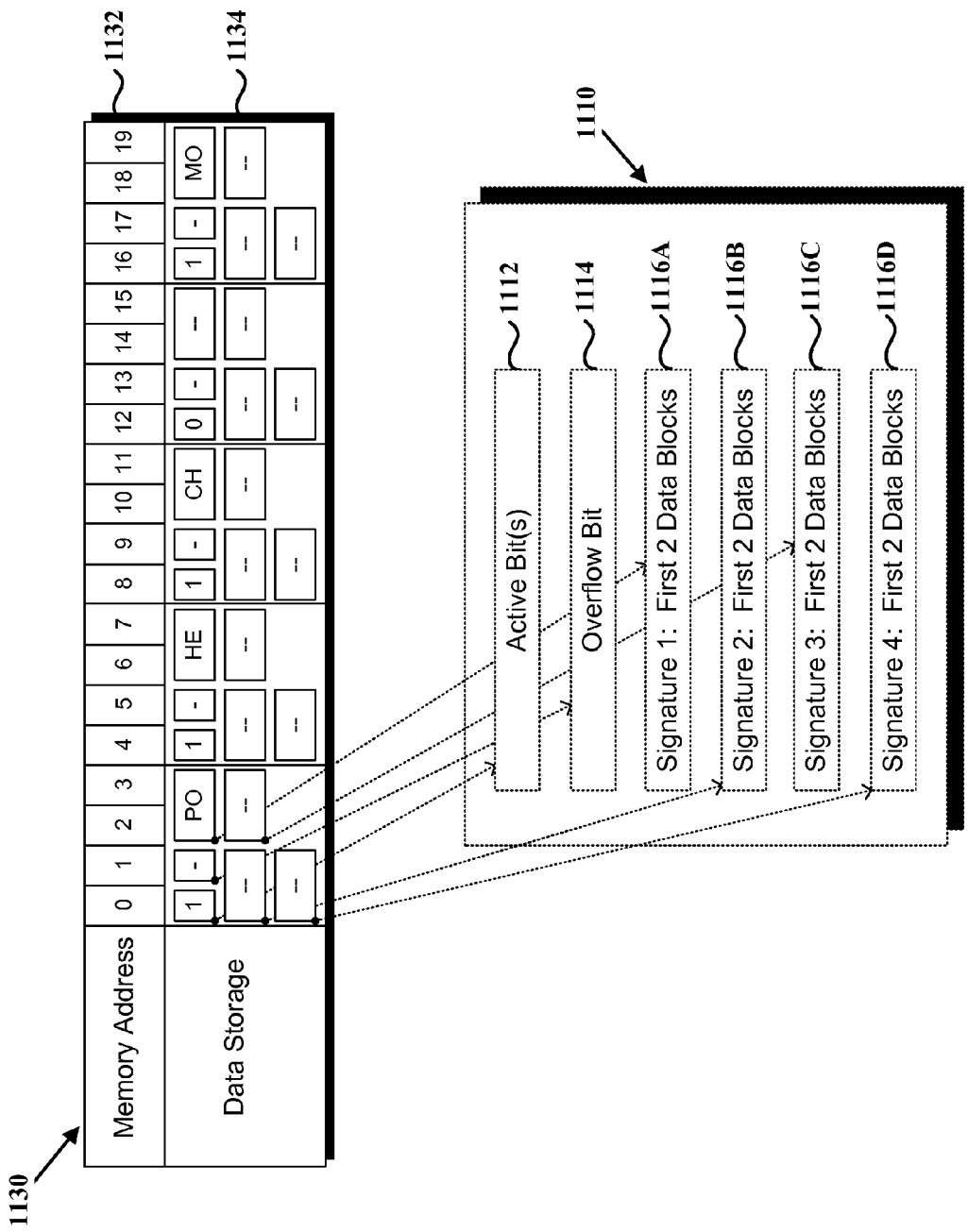

FIG. 11A depicts an example partial-match memory device 1130. Partial-match memory device 1130 generally comprises partial-match memory addresses 1132 that correspond to partial-match-data-storage cells 1134. For simplicity, the individual partial-match memory addresses 1132 of partial-match memory device 11'30 may be referred to simply as partial-match addresses. The partial-match-data-storage cells 1134 may or may not have data relating to signature data patterns 510 stored therein. Further, as with pre-processing memory addresses 832A(832B) found in pre-processing memory device 830A(830B), each of the partial-match memory addresses 1132 may be represented in binary codes 1140, as shown in FIG. 11B.

Partial-match-data-storage cells 1134 may be accessed according to groups, or bursts, of partial-match-data-storage cells 1134 associated with multiple partial-match memory addresses 1132 comprising a memory block in partial-match memory device 1130. As one example, partial-match data burst 1110 comprises the data stored in each of the partial-match-data-storage cells 0-3. In operation, partial-match data burst 1110 may be accessed by reference to just one of the partial-match addresses 0-3, such as partial-match address 0 (00000). Accordingly, the data of partial-match-data-storage cells having one of the partial-match addresses 0-3 may be stored, retrieved, or rewritten in association with a single partial-match address, such as partial-match address 0 (00000). As can be seen in FIG. 11B, in an embodiment partial-match addresses 4-7 make up a partial-match data burst that may be accessed with partial-match address 4 (00100), partial-match addresses 8-11 make up a partial-match data burst that may be accessed with partial-match address 8 (01000), partial-match addresses 12-15 make up a partial-match data burst that may be accessed with partial-match address 12 (01100), and partial-match addresses 16-19 make up a partial-match data burst that may be accessed with partial-match address 16 (10000).

Further, as shown with respect to the partial-match burst addresses 1142 also shown in FIG. 11B, partial-match memory device 1130 may be configured such that each partial-match data burst is accessible by an abridged version of the full binary representation of a given partial-match address. Specifically, because in the example shown, partial-match memory addresses are accessed in bursts comprising groups of four partial-match memory addresses, the last two bits may be dropped from the five bit binary representation of a given partial-match memory address associated with a particular burst.

As is clear with respect to the binary representation 1140 of partial-match memory addresses 1132, the first three bits of each partial-match memory address in the partial-match data burst of partial-match memory addresses 0-3 are "000," the first three bits of each partial-match memory address in the partial-match data burst of partial-match memory addresses 4-7 are "001," and so on respectively for each subsequent partial-match data burst. Accordingly, in an embodiment, the partial-match data burst comprising partial-match memory addresses 0-3 may be accessed by partial-match burst address 000, the partial-match data burst comprising partial-match memory addresses 4-7 may be accessed by partial-match burst address 001, the partial-match data burst comprising partial-match memory addresses 8-11 may be accessed by partial-match burst address 010, the partial-match data burst comprising partial-match memory addresses 12-15 may be accessed by partial-match burst address 011, and the partial-match data burst comprising partial-match memory addresses 16-19 may be accessed by partial-match burst address 100.

Therefore, in the following discussion, a reference to a given partial-match address may be understood to refer to a particular partial-match memory address or may be understood to refer to a partial-match burst address comprising multiple partial-match memory addresses. With respect to the particular example discussed herein, a reference to a partial-match address generally refers to a particular partial-match burst address associated with a given group of four partial-match memory addresses as shown in FIG. 11A.

Returning to FIG. 11A, as shown with respect to partial-match data burst 1110, a given partial-match data burst may comprise a variety of data relating to signature data patterns 510. For example, in an embodiment partial-match data burst 1110 may comprise individual sets of two signature-data blocks 1116A-1116D from up to four different signature data patterns. In other embodiments, more than two signature-data blocks of each signature data pattern may be stored. In still other embodiments, signature-data blocks from more or less than four different signature data patterns may be stored.

Figure 11C:
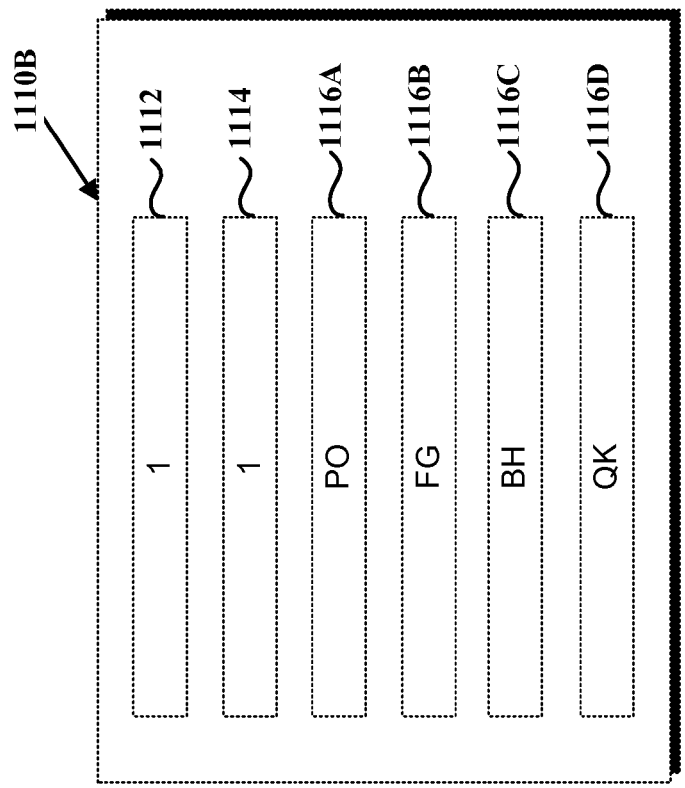
Figure 11C:
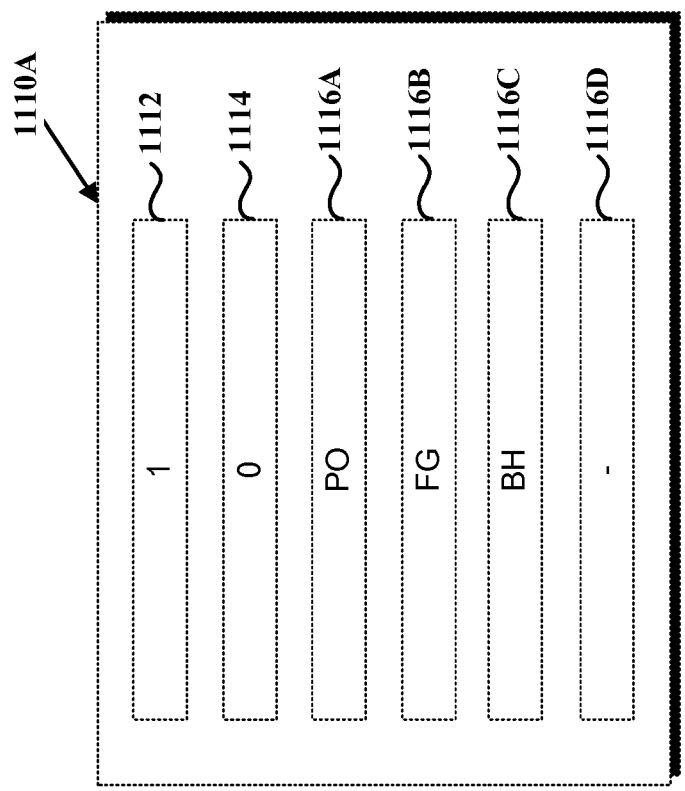

Further, partial-match data burst 1110 may also comprise an overflow bit 1114, that may be set if more than four signature data patterns map to data burst 1110 during the set-up of partial-match hardware 242, as discussed further below. For example, with reference to FIG. 11C, and example data burst 1110A, two signature-data blocks 1116A-1116C of three different signature data patterns are stored. Accordingly, a cleared overflow indicator 1114 is stored in data burst 1110A. However, with reference to example data burst 1110B, two signature-data blocks 1116A-1116D of four different signature data patterns are stored. A set overflow indicator 1114 is also stored in data burst 1110B, indicating that at least one additional signature data pattern, other than those signature data patterns having signature-data blocks already stored, mapped to data burst 1110B during set-up.

Data burst 1110 may also comprise active bit(s) 1112 that indicates if any signature-data blocks of any signature data patterns are stored in data burst 1110. Because both of example data bursts 1110A-1110B have signature-data blocks from at least one signature data pattern stored, active bit(s) 1112 is set in both example data bursts 1110A-B. Note that multiple active bits may be stored in data burst 1110. That is, a separate active bit may be stored with respect to each signature data pattern stored in data burst 1110. In this way, each separate active bit may indicate if a signature data pattern is stored at a corresponding memory address.

In general, partial-match memory device 1130 may be any suitable memory device configured to carry out the functions described herein. Without limitation, in an embodiment, partial-match memory device 1130 may be SRAM containing 1,048,576 ($2^{20}$) memory addresses and corresponding data-storage cells. Further, each data-storage cell may be configured to store numerous bits of data, such as 18 bits of data in an embodiment. Accordingly, as in the example shown in FIGS. 11A-11C, each data burst may represent 72 bits of data. It is clear, therefore, that partial-match memory device 1130 as shown in FIG. 11A is shown by way of example, and for the purposes of explanation, only and that no aspect of the example shown in FIGS. 11A-11C should be taken to be limiting.

The following sections generally describe how partial-match hardware 242 is set-up for the purpose of representing signature data patterns, as well as how partial-match hardware 242 operates to examine subject data words after being set-up.

g. Partial-Match Hardware Set Up

Figure 12:
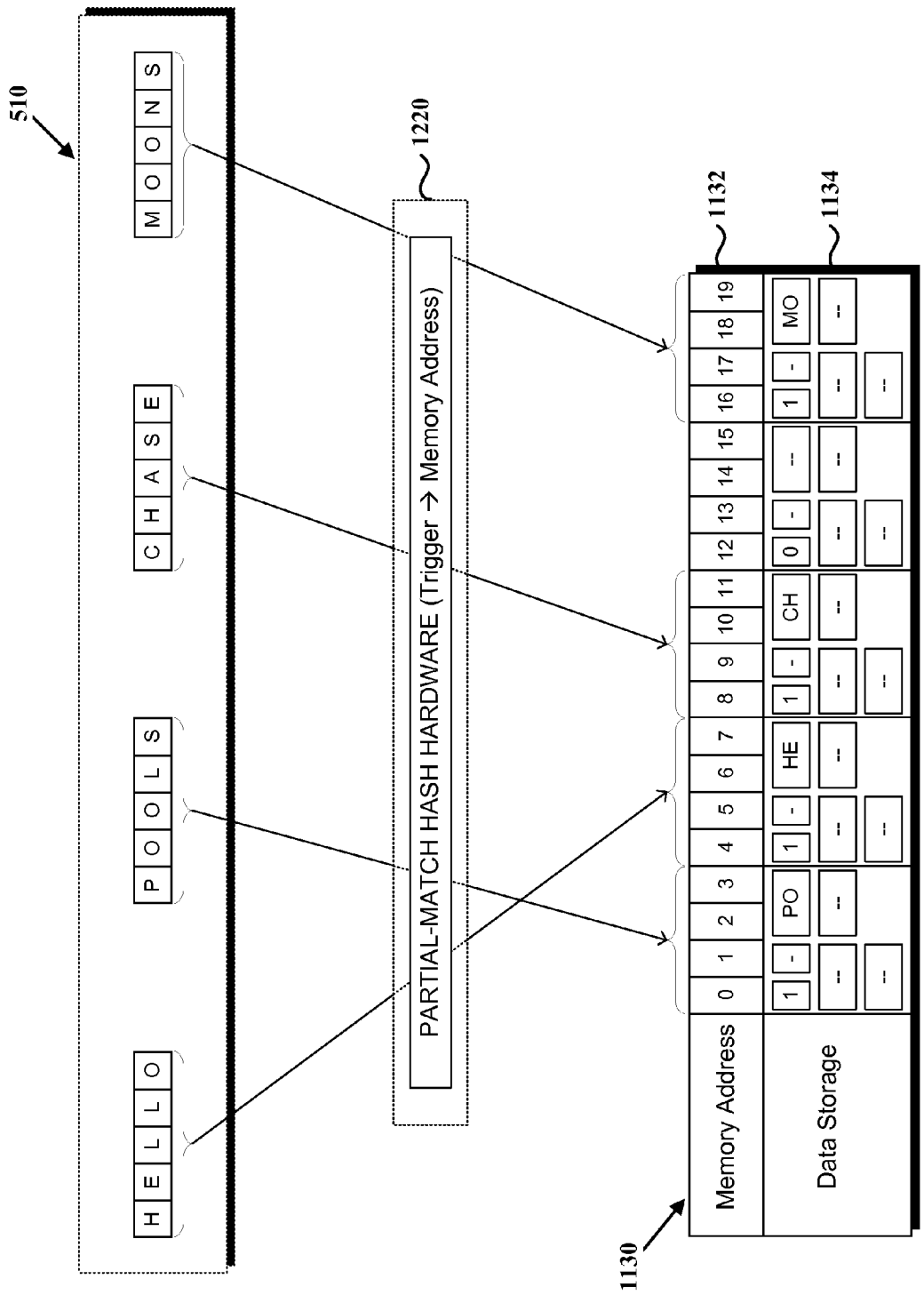
FIG. 12 depicts an example of partial-match hardware and configuration thereof, in accordance with at least one embodiment.

FIG. 12 generally depicts how partial-match hardware 242, and more particularly partial-match memory device 1130, is set-up for the purpose of carrying out partial-match determination 714 in an embodiment. In general, similar to pre-processing hardware 240, partial-match hardware 242 is configured so as to comprise hash tables representing signature data patterns for which the network traffic 300 is to be examined. However, while pre-processing determination 712 generally involves determining that a pre-processing-subject-hash result and a pre-processing-signature-hash result are the same, partial-match determination 714 further generally involves a determination that at least two of the subject-data blocks of a given subject data word respectively match at least two of the signature-data blocks of a given signature data pattern. Accordingly, in addition to flagging the partial-match address to which a given signature data pattern hashes, at least two of the signature-data blocks of the given signature data pattern are also stored at the partial-match address during set-up of partial-match hardware 242.

As part of the configuration of example partial-match memory device 1130, signature data patterns 510 are passed through partial-match hash hardware 1220. Partial-match hash hardware 1220 may comprise any suitable hardware including processors, memory, data storage, or combination thereof configured so as to implement a partial-match hash equation.

Each of signature data patterns 510 are input into the partial-match hash equation implemented in partial-match hardware 1220. In an embodiment, the partial-match hash equation implemented in partial-match hash hardware 1220 will be different from the pre-processing hash equation implemented in pre-processing hash hardware 820A(820B). This is generally at least because (i) a different size of partial-match memory device 1130 as compared to pre-processing memory device 830A(830B) may require that a different hash equation be used to achieve a desirable distribution of the signature data patterns throughout partial-match memory device 1130 and (ii) whereas a subset of all signature data patterns, such as those signature data patterns having the same length, may be distributed in a given pre-processing memory device 830A (830B), generally all signature data patterns will be distributed in a given partial-match memory device 1130.

The result of the partial-match hash equation, or the partial-match-signature-hash result, indicates a partial-match memory address 1132 in partial-match memory device 1130. Thus, partial-match hash hardware 1220 maps each of the signature data patterns 510 to particular partial-match memory addresses 1132. In other words, partial-match hash hardware 1220 outputs a partial-match-signature-hash result for each of the signature data patterns 510 that is used to map each of the signature data patterns 510 to particular partial-match memory addresses 1132. The partial-match-signature-hash result may be a particular partial-match address itself, or the partial-match-signature-hash result might be modified, interpreted, or otherwise used to identify a particular partial-match address.

In general, the combination of partial-match hash hardware 1220 and partial-match memory device 1130 may be thought of as elements of a partial-match hash machine that is configured to represent all signature data patterns including signature data patterns 510. As will be discussed further below, in an embodiment, such a partial-match hash machine also operates on one or more of all the subject data words that have not been previously ruled out by IPS 112.

Partial-match hardware 242 may include any number of such partial-match hash machines. As can be appreciated, the number of partial-match hash machines included in partial-match hardware 242 will correspond to the number of subject data words that may be examined in parallel while partial-match determination 714 is carried out. As discussed further below, for example, partial-match hardware 242 may comprise four partial-match hash machines, with each partial-match hash machine set up as described with respect to FIG. 12.

Returning to the example shown in FIG. 12, "POOLS" is mapped to one of partial-match addresses 0-3 (burst 000), "HELLO" is mapped to one of partial-match addresses 4-7 (burst 001), "CHASE" is mapped to one of partial-match addresses 8-11 (burst 010), and "MOONS" is mapped to one of partial-match addresses 16-19 (burst 100). Correspondingly, the first two signature-data blocks of each signature data patterns are stored in respective partial-match-data-storage cells 1134. In particular "PO" is stored at burst 000, "HE" is stored at 001, "CH" is stored at 010, and "MO" is stored at 100. Also note that active bit 1112 has been set in each of the data bursts 000, 001, 010, and 100. However, active bit 1112 remains clear in data burst 011 given that no signature data patterns mapped to one of partial-match addresses 12-15. The reader will appreciate that although the signature data patterns are described above as being mapped to particular partial-match addresses, the signature data patterns could just as well be mapped to the corresponding partial-match burst addresses.

Further, the reader will appreciate that although the example above describes the first two signature-data blocks of each signature data pattern being stored in partial-match memory device 1130, any set, combination, or arrangement of signature-data blocks may be stored. In particular the signature-data blocks may be taken from any part of the signature data pattern including the beginning as well as the end or middle. Further, the subject-data blocks taken may, or may not be, adjacent. Further still, any number of signature-data blocks may be taken.

Accordingly, the specific example described herein with respect to partial-match memory devices storing two signature-data blocks is set forth by way of example only. Further note that, in the case that IPS 112 carries out full-match determination 716 subsequent to partial-match determination 714, it may be undesirable to store all of the signature data blocks of signature data patterns in partial-match memory device 1130.

Further still, the reader will appreciate that, as described above with respect to the set-up of pre-processing hardware 240, it may be generally beneficial to distribute the signature data patterns in partial-match memory device 1130 evenly and in such a way that the total number of available signature data patterns represented is a relatively small percentage of the total number of partial-match memory addresses available. With specific respect to partial-match memory device 1130, such considerations may enable a greater percentage of signature patterns to be represented in partial-match-data-storage cells 1134 by two respective signature-data blocks 1116A-1116D, as opposed to being merely represented by overflow bit 1114.

In summary, in an embodiment, partial-match hardware 242 may comprise a number of partial-match hash machines. Each of the partial-match hash machines may be configured to store signature-data blocks from each of the signature data patterns for which network traffic 300 is to be examined. The hash machines may operate on subject data words in parallel. However if there are more subject data words to be examined than there are partial-match hash machines, then the remaining subject data words may be examined in groups, in a serial fashion.

Each partial-match hash machine comprises at least one partial-match memory device, such as partial-match memory device 1130. Partial-match memory device 1130 comprises partial-match memory addresses 1132 that may generally be accessed according to partial-match data bursts 1142 comprising partial-match-data-storage cells 1134 associated with respective groups of partial-match memory addresses 1132. Partial-match memory device 1130 is associated with partial-match hash hardware, such as partial-match hash hardware 1220, that outputs partial-match-signature-hash results used to map signature data patterns to partial-match addresses. The partial-match-signature-hash results are flagged in partial-match memory device 1130, and signature-data blocks are also stored at the respective partial-match address.

The foregoing section generally describes how partial-match hardware 242 is set-up for the purpose of representing signature data patterns. The section that follows describes how partial-match hardware 242 operates to examine subject data words after being set-up.

h. Partial-Match Hardware in Use

Returning to FIG. 6B, in an embodiment, at step 672 IPS 112 identifies a partial-match address for the purpose of examining subject data words. With respect to FIG. 13, subject data words 1310, which are the subset of subject data words 410 comprising those subject data words that have not been ruled out by pre-processing determination 712, are mapped to partial-match memory device 1130 in much the same way as signature data patterns 510 during the set-up of partial-match hardware 242 as described above. In particular, subject data words 1310 are passed through partial-match hardware 1220, in which each of the subject data words 1310 are input into a partial-match hash equation implemented in partial-match hash hardware 1220. Partial-match hash hardware 1220 outputs a partial-match-subject-hash result that indicates a partial-match memory address 1132 in partial-match memory device 1130.

Thus, partial-match hardware 1220 maps each of the subject data words 1310 to particular partial-match memory addresses 1132. In other words, partial-match hash hardware 1220 outputs a partial-match-subject-hash result for each of the subject data words 1310 that is used to map each of the subject data words 1310 to particular partial-match memory addresses 1132. The partial-match-subject-hash result may be a particular partial-match address itself, or the partial-match-subject-hash result might be modified, interpreted, or otherwise used to identify a particular partial-match address.

As discussed above, the combination of partial-match hash hardware 1220 and partial-match memory device 1130 may be thought of as a partial-match hash machine that has been configured for the purpose of examining each of the subject data words 1310 that were not ruled out by pre-processing determination 712. Note that in the embodiment described herein, the partial-match-hash hardware used during set-up and operation of partial-match hardware 242 is the same. However, other embodiments are possible as well, including embodiments in which the partial-match-hash hardware used during set-up and operation of partial-match hardware 242 is different.

Figure 13:
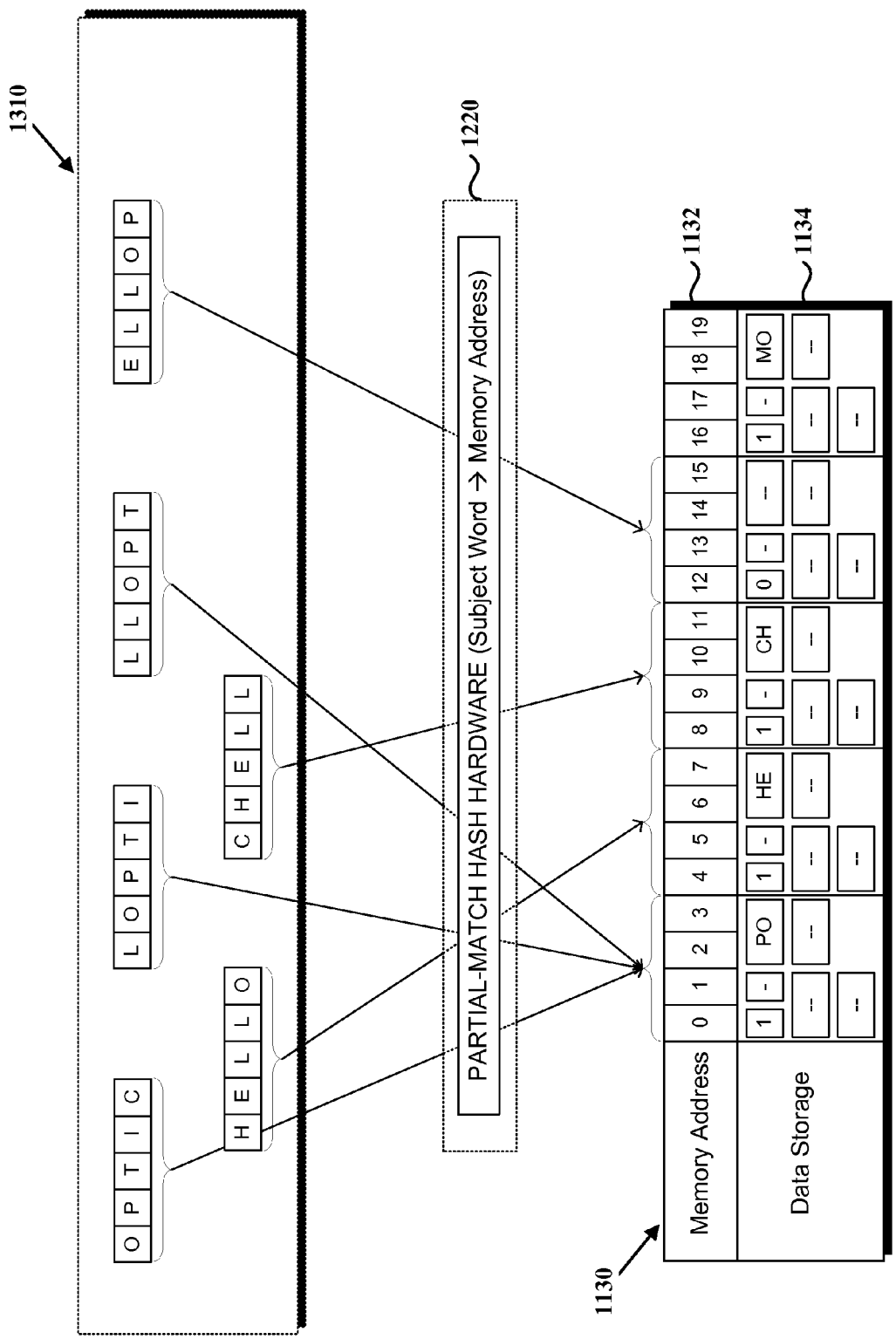
FIG. 13 depicts an example of partial-match hardware and its use, in accordance with at least one embodiment.

In the example shown in FIG. 13, "OPTIC," "LOPTI," and "LLOPT" are mapped to one of partial-match addresses 0-3 (burst 000), "HELLO" is mapped to one of partial-match addresses 4-7 (burst 001), "CHELL" is mapped to one of partial-match addresses 8-11 (burst 010), and "ELLOP" is mapped to one of partial-match addresses 12-15 (burst 011). The reader will appreciate that although the subject data words are described as being mapped to particular partial-match addresses, the subject data words could just as well be mapped to the corresponding partial-match burst addresses.

Returning to FIG. 6B, in an embodiment, as step 674 IPS 112 determines that signature data is stored in partial-match memory device 1130. As will be discussed below, such a determination may generally include matching subject-data blocks and signature-data blocks, or such a determination may include a determination that overflow bit 1114 is set.

As can be seen, only certain of the partial-match addresses to which subject data words 1310 are mapped have a set active bit 1112. In particular, partial-match addresses 12-15 (burst 011), which "ELLOP" mapped to, has a cleared active bit 1112. It is possible to determine that those subject data words 1310 that are mapped to partial-match addresses having a cleared active bit 1112 do not exactly match any signature data patterns. After all, as with respect to pre-processing determination 712, if a given subject data word exactly matches a given signature data pattern, the given subject data word and the given signature data pattern will be mapped to the same partial-match address. In other words, the associated partial-match-subject-hash result and the associated partial-match-signature-hash result, respectively, would be the same.

Further, as can be seen, only certain of the partial-match addresses to which subject data words 1310 are mapped have signature-data blocks stored in associated partial-match-data-storage cells 1134. In particular, partial-match addresses 0-3 (burst 000), which "OPTIC," "LOPTI," and "LLOPT" mapped to, has the signature-data blocks "PO" stored. It is possible to determine that those subject data words 1310 that are mapped to partial-match addresses that do not have signature-data blocks stored that match their respective first two subject-data blocks do not fully match any signature data patterns. After all, if a given subject data word exactly matches a given signature data pattern, the given subject data word and the given signature data pattern will be mapped to the same partial-match address, and the first two signature-data blocks of the signature data pattern will be stored in data storage 1134 during the set-up of partial match hardware 242 as discussed above.

However, it can be seen that each of the subject data words "HELLO" and "CHELL" mapped to a partial-match address that has a set active bit 1112 as well as signature-data blocks that respectively match their first two subject-data blocks. In particular partial-match addresses 4-7 (burst 001), to which "HELLO" mapped, has the two signature-data blocks "HE" stored and partial-match addresses 8-11 (burst 010), to which "CHELL" mapped, has the two signature-data blocks "CH" stored. Thus, it cannot be said for sure that subject data words "HELLO" and "CHELL" do not match a signature data pattern. In other words, subject data words "HELLO" and "CHELL" cannot be ruled out by partial-match determination 714.

On the other hand, partial-match addresses 12-15 (burst 011), to which "ELLOP" mapped, does not have a set active bit 1112. Because active bit 1112 is cleared it can be said for sure that the subject data word "ELLOP" does not match a signature data pattern. Additionally, partial-match addresses 0-3 (burst 000), which "OPTIC," "LOPTI," and "LLOPT" mapped to, has the signature-data blocks "PO" stored. Because the first two subject-data blocks of none of the subject data words "OPTIC," "LOPTI," or "LLOPT" are "PO" it can be said for sure that none of the subject data words "OPTIC," "LOPTI," or "LLOPT" match a signature data pattern.

Note that, despite the fact that the only subject data word of subject data words 1310 that fully matches any of the signature data patterns 510 is "HELLO," "CHELL" has not been ruled out as definitely not matching one of the signature data patterns 510. Thus subject data word "CHELL" has once again given rise to a false-positive indication that it may match one of the signature data patterns. As a result, the two subject data words "HELLO" and "CHELL" must be further examined by IPS 112 to determine if they exactly match one of the signature data patterns 510. On the other hand, because it is clear that the subject data words "OPTIC," "LOPTI," "LLOPT," and "ELLOP" do not match one of the signature data patterns 510, those subject data words will not be further examined by IPS 112.

Further note that, in the case that overflow bit 1114 is set in the partial-match data burst to which a given subject data word maps, it cannot be said for sure that the given subject data word does not match a signature data pattern. After all, the at least one additional signature data pattern not having two signature-data blocks stored in the partial-match data burst may exactly match the given subject data pattern. Accordingly, if the overflow bit is set in the partial-match data burst to which a given subject data word maps, IPS 112 may be configured to make a de facto partial-match determination 714 that a partial-match number of the subject-data blocks respectively match the same partial-match number of the signature-data blocks stored in the partial-match hardware with respect to both value and position. In other words, if the overflow bit is set in the partial-match data burst to which the given subject data word maps, IPS 112 may automatically further examine the subject data word to determine if it exactly matches a signature data pattern.

Further note that, although the above described embodiment involves the use of a single partial-match memory device 1130 with respect to each of the subject data words and signature data patterns, any number of partial-match memory devices may be used as discussed above. As one example a total of four partial-match memory devices may be used, and in such a case, four subject data words may be examined by partial-match hardware 242 in parallel at the same time. As a result, a partial-match-subject-hash result may be generated by the relevant partial-match hash hardware for each of the four subject data words at substantially the same time. Accordingly, IPS 112 may make a partial-match determination that a partial-match number of the subject-data blocks respectively match the same partial-match number of the signature-data blocks stored in the partial-match hardware with respect to both value and position for each of the four subject data words at substantially the same time. Any additional subject data words examined by partial-match hardware 242 would then be examined in groups of four, in a series fashion.

i. Alternative Address-Builder Embodiment

It should be understood that the particular method of carrying out partial-match determination 714 described with respect to FIGS. 12-13 describes one embodiment of partial-match determination 714. Other embodiments are certainly possible as well.

Figure 14:
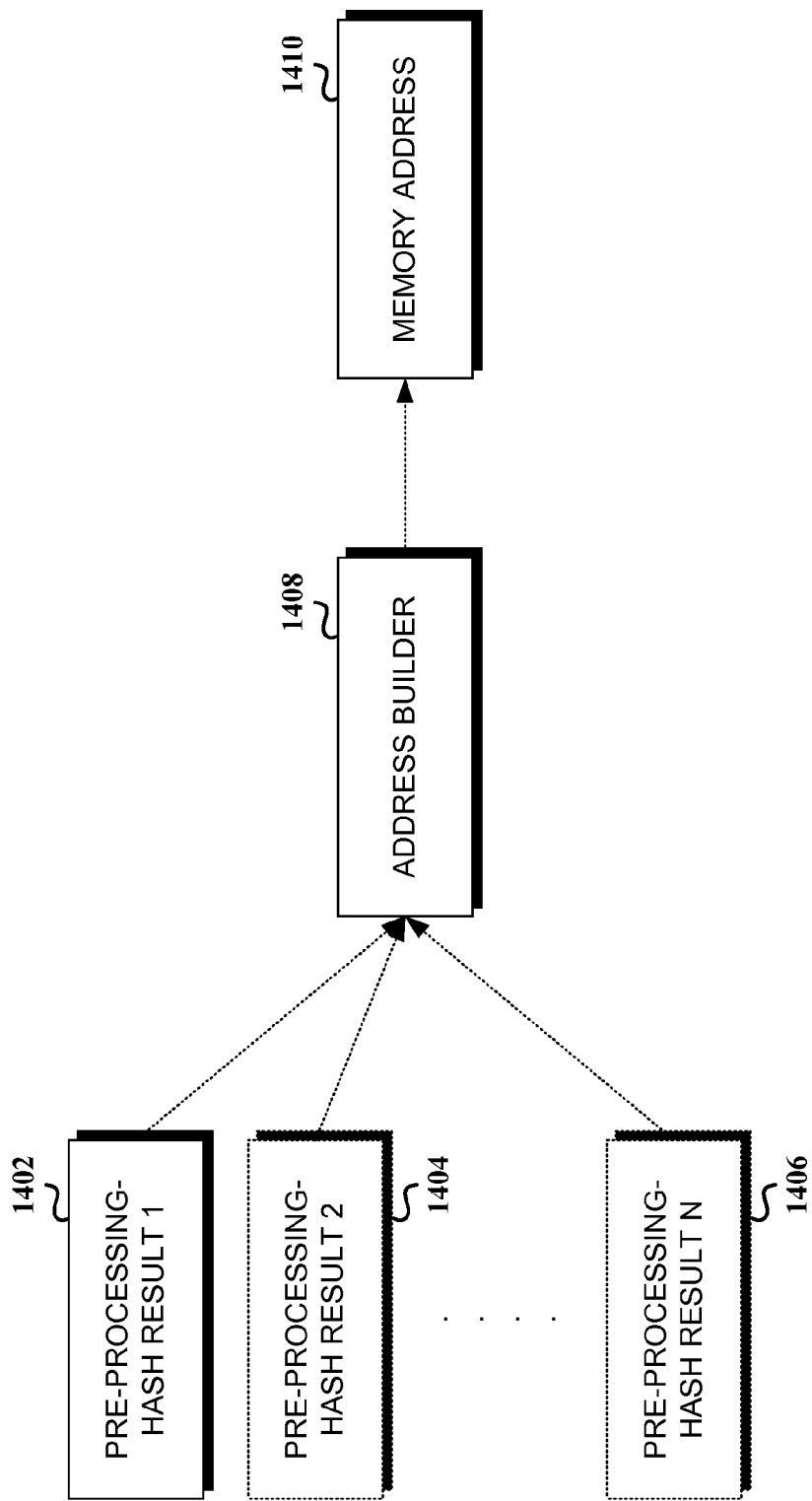
FIG. 14 depicts an example of an address builder, in accordance with at least one embodiment.

One example of an alternative embodiment may involve an alternative method of identifying the partial-match memory address with respect to both the signature data patterns and the subject data words, as generally described with respect to FIG. 14. In particular, FIG. 14 depicts an embodiment in which hash results from pre-processing determination 712 may be used to determine memory addresses during the execution of subsequent determinations such as partial-match determination 714 and full-match determination 716. Even more particularly, the pre-processing-signature-hash results of pre-processing determination 712 may be used to determine corresponding partial-match-signature-hash results and full-match-signature-hash results, and the pre-processing-subject hash results of pre-processing determination 712 may be used to determine corresponding partial-match-subject-hash results and full-match-subject-hash results.

With reference to FIG. 14, and with respect to an example implementation in partial-match hardware 242, pre-processing-hash results 1402, 1404, and 1406, which may correspond respectively to the pre-processing-hash hardware associated with pre-processing memory devices 830A, 830B, and 830C, may each be input into an address builder 1408. Address builder 1408 may be any hardware, software, or combination thereof that is configured to modify, interpret, or otherwise use at least one of pre-processing-hash results 1402, 1404, and 1406 to generate a memory address 1410 that corresponds to one of partial-match memory addresses 1132 in partial-match memory device 1130.

In other words, address builder 1408 may implement an algorithm that maps at least one of the pre-processing-hash results 1402, 1404, and 1406, or some combination thereof, to a partial-match address. As a result, signature data patterns and subject data words may be mapped to partial-match addresses during execution of partial-match determination 714 without the use of partial-match hash hardware such as partial-match hash hardware 1220. Such an approach may advantageously avoid the use of computing resources, such as processing time that would otherwise be required to compute a unique partial-match hash equation. On the other hand, address builder 1408 may itself require significant computing resources. Additionally, it may be considerably more difficult to achieve a desirable distribution of all signature data patterns throughout partial-match hardware 1130 using address builder 1408 as opposed to partial-match hash hardware 1220 that may implement a partial-match hash equation specifically tailored to achieve such a desirable distribution.

j. Make Full-Match Determination

At step 608 in FIG. 6A; and at corresponding step 680 in FIG. 6B, IPS 112 makes full-match determination 716. Full-match determination 716 may be carried out subsequent to partial-match determination 714. Full-match determination 716 may also be carried out subsequent to additional intermediate determinations carried out between partial-match determination 714 and full-match determination 716. In general, IPS 112 may be configured in such a way that full-match determination 716 is the last determination made with respect to determining if a given subject data word exactly matches a given signature data pattern.

Note that full-match determination 716 may be carried out only with respect to those subject data words for which there remains a question as to whether or not the subject data word exactly matches a signature data pattern. In accordance with the example described herein, full match determination 716 may therefore only be carried out with respect to the subject data words "HELLO," and "CHELL." Full-match determination 716 need not be carried out with respect to the additional subject data words "OPTIC," "LOPTI," "LLOPT," "ELLOP," "ICHEL," and "NICHE" because it is clear from pre-processing determination 712 and partial-match determination 714 that those subject data words do not match any of the signature data patterns 510.

In an embodiment, IPS 112 may comprise full-match hardware 244, as shown in FIG. 2. As discussed above, full-match hardware 244 may comprise a memory device such as DRAM. Note that full-match hardware 244 may comprise more than one DRAM memory device.

Figure 15A:
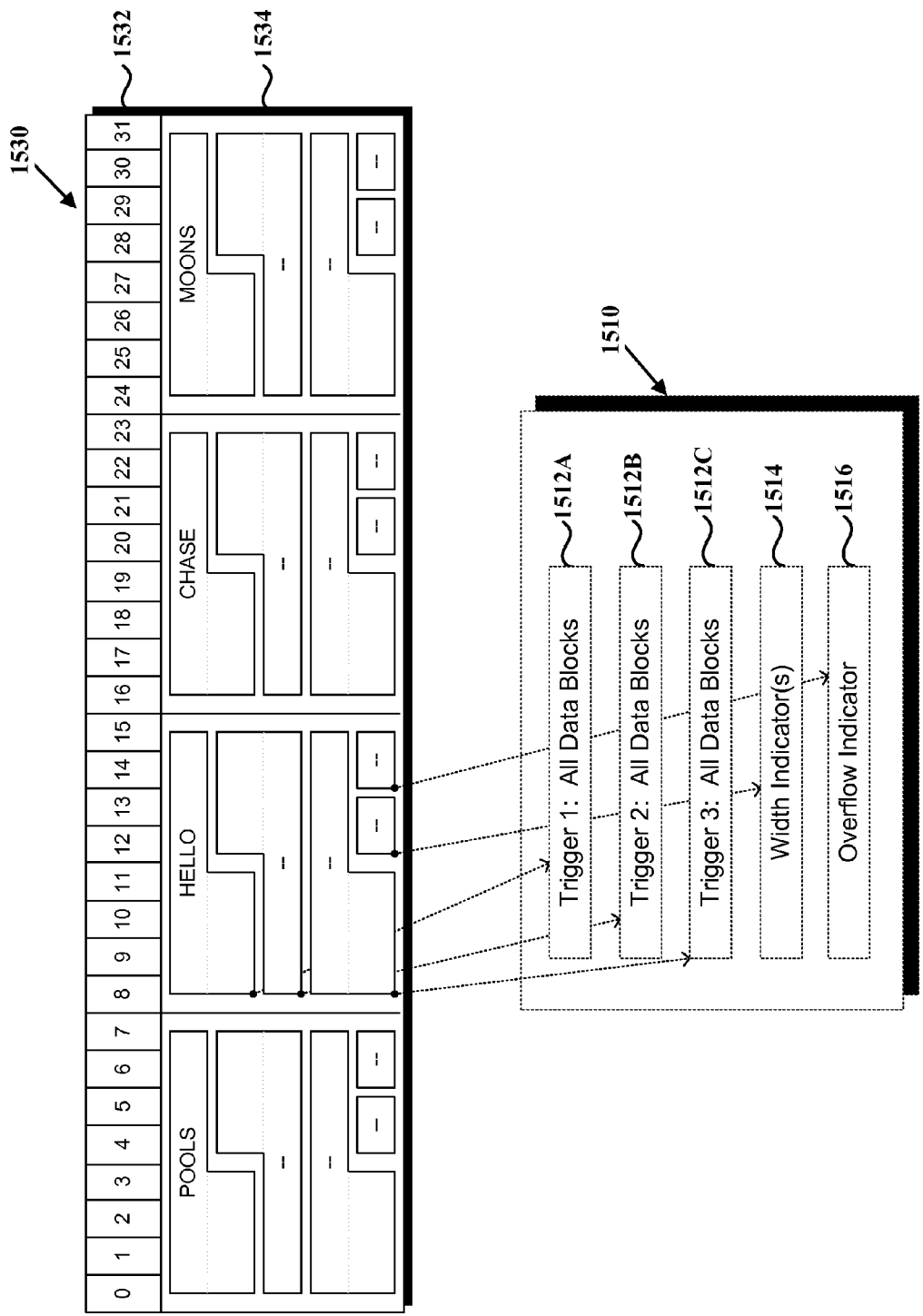

FIG. 15A depicts an example full-match memory device 1530, which generally comprises full-match memory addresses 1532 that correspond to full-match-data-storage cells 1534. For simplicity, the individual full-match memory addresses 1532 of full-match memory device 1530 may be referred to simply as full-match addresses. The full-match-data-storage cells 1534 may or may not have data relating to signature data patterns 510 stored therein. Further, as with pre-processing memory addresses 832A(832B) and partial-match memory addresses 1132, each of the full-match memory addresses 1532 may be represented in binary codes 1540, as shown in FIG. 15B.

Even further, as with partial-match-data-storage cells 1134, full-match-data-storage cells 1534 may be accessed according to groups, or full-match data bursts, of full-match-data-storage cells 1534 comprising a memory block in full-match memory device 1530. As one example, full-match data burst 1510 comprises the data stored at each of full-match memory addresses 8-15. In operation, full-match data burst 1510 may be accessed by reference to just one of the full-match addresses 8-15, such as full-match address 8 (01000). Accordingly the data of full-match-data-storage cells 1534 having one of the full-match addresses 8-15 may be stored, retrieved, or rewritten in association with a single full-match address, such as full-match memory address 8 (01000). As can be seen in FIG. 15B, in an embodiment, full-match memory addresses 0-7 make up a full-match data burst that may be accessed with full-match address 0 (00000), full-match memory addresses 16-23 make up a full-match data burst that may be accessed with full-match address 16 (10000), and full-match memory addresses 24-31 make up a full-match data burst that may be accessed with full-match address 24 (11000).

As shown with respect to full-match burst addresses 1542 also shown in FIG. 15B, full-match memory device 1530 may be configured such that each full-match data burst is accessible by an abridged version of the full binary representation of an associated full-match address. Specifically, because in the example shown, full-match memory addresses 1532 are accessed in bursts comprising groups of 8 full-match memory addresses, the last three bits may be dropped from the 5 bit binary representation of a given full-match memory address associated with a particular full-mach data burst. The reader will appreciate that although in the example described herein full-match burst addresses 1542 are shorter than partial-match burst addresses 1142, this need not necessarily be the case. In fact, in an embodiment in which there are more full-match burst addresses 1542 associated with full-match memory device 1530 than there are partial-match burst addresses 1142 associated with partial-match memory device 1130, it is likely that full-match burst addresses 1542 would be longer.

As is clear with respect to the binary representation 1540 of full-match memory addresses 1532, the first two bits of each full-match memory address in the full-match data burst of full-match memory addresses 0-7 are "00," the first two bits of each full-match memory address in the full-match data burst of full-match memory addresses 8-15 are "01," the first two bits of each full-match memory address in the full-match data burst of full-match memory addresses 16-23 are "10," and the first two bits of each full-match memory address in the full-match data burst of full-match memory addresses 24-31 are "11." Accordingly, in an embodiment, the full-match data burst comprising the full-match memory addresses 0-7 may be accessed by full-match burst address 00, the full-match data burst comprising the full-match memory addresses 8-15 may be accessed by full-match burst address 01, the full-match data burst comprising the full-match memory addresses 16-23 may be accessed by full-match burst address 10, and the full-match data burst comprising the full-match memory addresses 24-31 may be accessed by full-match burst address 11.

Therefore, in the following discussion, a reference to a given full-match address may be understood to refer to a particular full-match memory address or may be understood to refer to a full-match burst address comprising multiple full-match memory addresses. With respect to the particular example discussed herein, a reference to a full-match address generally refers to a particular full-match burst address associated with a given group of eight full-match memory addresses as shown with respect to FIG. 15B.

Returning to FIG. 15A, as shown with respect to full-match data burst 1510, a given full-match data burst may comprise a variety of data relating to signature data patterns 510. For example, in an embodiment full-match data burst 1510 may comprise individual sets of all signature-data blocks 1512A-1512C from up to three different signature data patterns. In other embodiments, all signature-data blocks from more than, or less than, three different signature data patterns may be stored.

Further, full-match data burst 1510 may also comprise a width indicator(s) 1514, that may indicate a length, or total number of signature-data blocks, of the signature data patterns stored in full-match data burst 1510. In the event that full-match data burst 1510 is configured such that signature data patterns of varying lengths are stored in full-match data burst 1510, a separate width indicator may be stored with respect to each signature data pattern. In operation, IPS 112 may determine that a length of a given signature data pattern matches the length of the given subject data word being examined.

Full-match data burst 1510 may also comprise an overflow indicator 1516 that would be set if more than, in this example, three signature data patterns map to full-match data burst 1510 during the set-up of full-match hardware 244, as discussed further below. If no more than three signature data patterns map to full-match data burst 1510, overflow indicator 1516 would remain cleared. Alternatively, overflow indicator may comprise a full-match-overflow address that indicates another full-match data burst at which additional signature patterns that initially mapped to full-match data burst 1510 are stored. Accordingly, in operation, a given subject data word may be examined with respect to the signature data patterns stored in the full-match data burst indicated by the full-match-overflow address.

In general, full-match memory device 1530 may be any suitable memory device that may be configured to carry out the functions described herein. Without limitation, in an embodiment full-match memory device 1530 may be DRAM containing 16,777,216 ($2^{27}$) memory addresses and corresponding data-storage cells. Further, each data-storage cell may be configured to store numerous bits of data, such as 64 bits of data in an embodiment. Accordingly, as in the example shown in FIG. 15A, each data burst may represent 512 bits of data. It is clear, therefore, that full-match memory device 1530 as shown in FIG. 15A is shown by way of example, and for the purposes of explanation, only and that no aspect of the example shown in FIG. 15A should be taken to be limiting.

The following sections generally describe how full-match hardware 244 is set-up for the purpose of representing signature data patterns, as well as how full-match hardware 244 operates to examine subject data words after being set-up.

k. Full-Match Hardware Set Up

Figure 16:
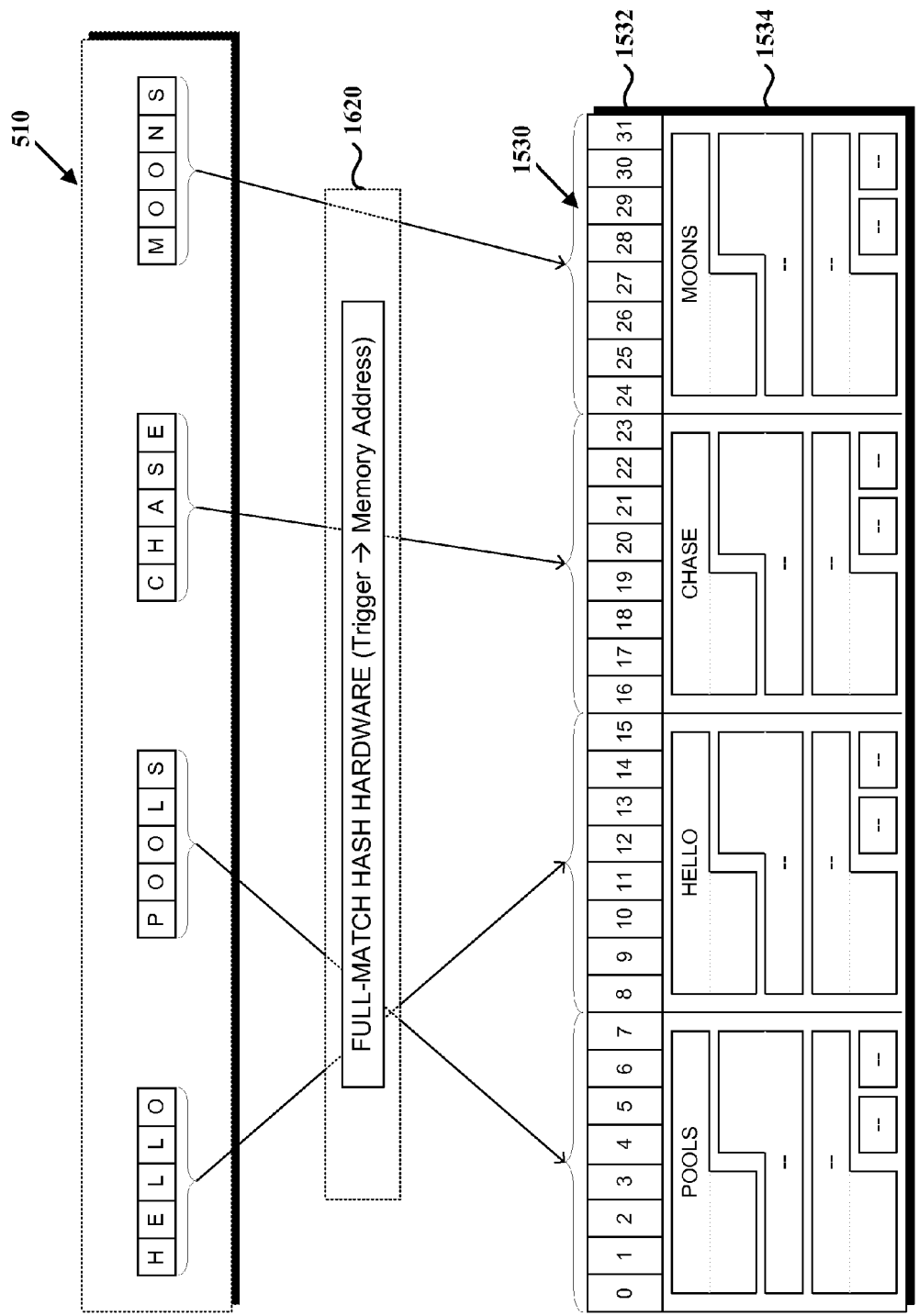
FIG. 16 depicts an example of full-match hardware and configuration thereof, in accordance with at least one embodiment.

FIG. 16 generally depicts how full-match hardware 244, and more particularly full-match memory device 1530, is set-up for the purpose of carrying out full-match determination 716 in an embodiment. In general, similar to partial-match hardware 242, full-match hardware 244 is configured so as to comprise hash tables representing the signature data patterns for which network traffic 300 is to be examined. However, while partial-match determination 714 generally involved determining that two subject-data blocks of a given subject data word respectively match two signature-data blocks of a given signature data pattern, full-match determination 716 further generally involves a determination that all of the subject-data blocks of a given subject data word respectively match all of the signature-data blocks of a given signature data pattern. Accordingly, all of the signature-data blocks of the given signature data patterns are stored at the full-match address during set-up of full-match hardware 244.

As part of the configuration of full-match memory device 1530, signature data patterns 510 are passed through full-match hash hardware 1620. Full-match hash hardware 1620 may comprise any suitable hardware including processors, memory, data storage, or combination thereof configured so as to implement a full-match hash equation.

Each of signature data patterns 510 are input into the full-match hash equation implemented in full-match hash hardware 1620. In an embodiment, the full-match hash equation implemented in full-match hash hardware 1620 will be different from both the pre-processing hash equation implemented in pre-processing hash hardware 820A(820B) as well as the partial-match hash equation implemented in partial-match hash hardware 1220. This is generally at least because a different size of full-match memory device 1530 may require that a different hash equation be used to achieve a desirable distribution of the signature data patterns.

The result of the full-match hash equation, or the full-match-signature-hash result, indicates a full-match memory address 1532 in full-match memory device 1530. Thus, full-match hash hardware 1620 maps each of the signature data patterns 510 to a particular full-match memory address 1532. In other words, full-match hash hardware 1620 outputs a full-match-signature-hash result for each of the signature data patterns 510 that is used to map each of the signature data patterns 510 to particular full-match memory addresses 1532. The full-match-signature-hash result may be a particular full-match address itself, or the full-match-signature-hash result might be modified, interpreted, or otherwise used to identify a particular full-match address.

In general, the combination of full-match hash hardware 1620 and full-match memory device 1530 may be thought of as elements of a full-match hash machine that is configured to represent all signature data patterns including signature data patterns 510. As will be discussed further below, in an embodiment, such a full-match hash machine also operates on one or more of the subject data words that have not been ruled out by IPS 112.

Full-match hardware 244 may comprise any number of such full-match hash machines. As can be appreciated, the number of full-match hash machines included in full-match hardware 244 will equal the number of subject data words that may be examined in parallel while full-match determination 716 is carried out. Given the relative size of DRAM, and also given that a significant number of subject data words may have been ruled out by previous determinations, in an embodiment, full-match hardware 244 may comprise a single full-match hash machine. According to such an embodiment, the subject data words that have not been ruled out by a previous determination would each be examined in a series fashion.

In the example shown in FIG. 16, "POOLS" is mapped to one of full-match addresses 0-7 (burst 00), "HELLO" is mapped to one of full-match addresses 8-15 (burst 01), "CHASE" is mapped to one of full-match addresses 16-23 (burst 10), and "MOONS" is mapped to one of full-match addresses 24-31 (burst 11). Correspondingly, all of the signature-data blocks of each signature data pattern are stored in respective data storage.

The reader will appreciate that, as described above with respect to the set-up of partial-match hardware 242, it may be generally beneficial to distribute the signature data patterns in full-match memory device 1530 evenly and in such a way that the total number of signature data patterns represented is a relatively small percentage of the total number of full-match memory addresses available. With specific respect to full-match memory device 1530, such considerations may enable a greater percentage of signature patterns to be represented in full-match data storage at the full-match address, as opposed to being represented at a full-match-overflow address.

With respect to the full-match-overflow address, in an embodiment the full-match memory device may be configured so as to be divided into a non-overflow block corresponding to all available full-match addresses and an overflow block corresponding to all full-match-overflow addresses. For example, in a full-match memory device having full-match memory addresses 0-99, the non-overflow block may comprise full-match addresses 0-49 and the overflow block may comprise full-match-overflow addresses 50-99. In such a full-match memory device full-match address 0 may correspond to full-match-overflow address 50, full-match address 1 may correspond to full-match-overflow address 51, and so on. It should be understood, however, that a given full-match address might correspond to multiple signature data patterns stored in multiple full-match-overflow addresses, and that a given full-match-overflow address might correspond to multiple signature data patterns stored in multiple full-match addresses.

In the embodiment, for example, if more than three signature data patterns mapped to full-match address 0 during the set-up of the full-match memory device, full-match-overflow address 50 would be stored at full-match address 0 in the overflow indicator. Accordingly, the additional signature data patterns may be stored in the full-match memory device at full-match-overflow address 50 and referenced by IPS 112 as necessary during the examination of a given subject data word. For example, in an embodiment IPS 112 may determine that the full-match-overflow address is stored at the full-match address and responsively reference the signature data patterns stored at the full-match-overflow address.

Also note that although the example described with respect to FIG. 16 generally involves full-match hash hardware 1620 outputting a full-match-signature-hash result used to identify a full-match address 1532 in full-match memory device 1530, other methods of generating the full-match-signature-hash result are possible as well. As one example, the full-match-signature-hash result may be generated according town address builder 1408 embodiment as discussed above with respect to partial-match determination 714. Correspondingly, full-match-subject-hash results may be generated in an analogous fashion when examining subject data words.

Thus, in summary, in an embodiment, full-match hardware 244 may comprise a number of full-match hash machines. Each of the full-match hash machines may be configured to store all of the signature-data blocks from each of the signature data patterns for which network traffic 300 is to be examined. The full-match hash machines may operate on subject data words in parallel, however if a single full-match hash machine is contained in full-match hardware 244, then the subject data words may be examined in a serial fashion.

Each full-match hash machine comprises at least one full-match memory device, such as full-match memory device 1530. Full-match memory device 1530 comprises full-match-data-storage cells 1534 that may generally be accessed according to full-match data bursts 1542 associated with respective groups of full-match memory addresses 1532. Full-match memory device 1530 may be associated with full-match hash hardware, such as full-match hash hardware 1620, that outputs full-match-signature-hash results used to map signature data patterns to full-match addresses. All of the signature-data blocks of a given signature data pattern are stored in association with the respective full-match address.

The foregoing section generally describes how full-match hardware 244 is set-up for the purpose of representing signature data patterns. The section that follows describes how full-match hardware 244 operates to examine subject data words after being set-up.

1. Full-Match Hardware in Use

Figure 17:
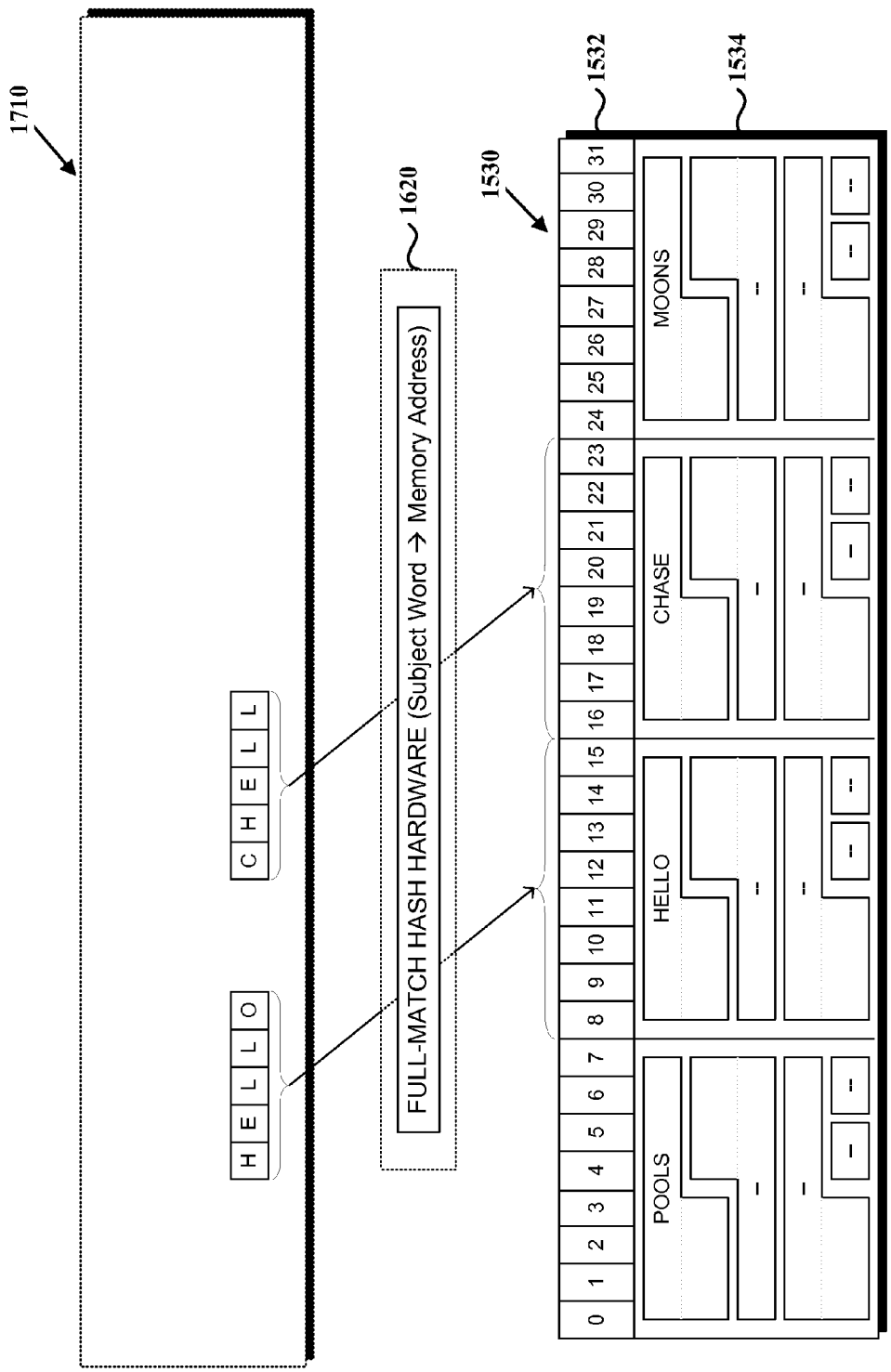
FIG. 17 depicts an example of full-match hardware and its use, in accordance with at least one embodiment.

Turning now to FIG. 17, subject data words 1710, which is the subset of subject data words 410 comprising those subject data words that were not ruled out by pre-processing determination 712 or partial-match determination 714, are mapped to full-match memory device 1530 in much the same way as signature data patterns 510 during the set-up of full-match hardware 244 as described above. In particular, subject data words 1710 are passed through full-match hash hardware 1620, in which each of the subject data words 1710 are input into a full-match hash equation implemented in full-match hash hardware 1620. Full-match hash hardware 1620 outputs a full-match-subject-hash result that indicates a full-match memory address 1532 in full-match memory device 1530. Thus, full-match hash hardware 1620 maps each of the subject data words 1710 to particular full-match memory addresses 1532. In other words, full-match hash hardware 1620 outputs a full-match-subject-hash result for each of the subject data words 1710 that is used to map each of the subject data words 1710 to particular full-match memory addresses 1532. The full-match-subject-hash result may be a particular full-match address itself, or the full-match-subject-hash result might be modified, interpreted, or otherwise used to identify a particular full-match address.

As discussed above, the combination of full-match hash hardware 1620 and full-match memory device 1530 may be thought of as a full-match hash machine that has been configured for the purpose of examining each of the subject data words 1710 that were not ruled out by pre-processing determination 712 or partial-match determination 714. Note that in the embodiment described herein, the full-match-hash hardware used during set-up and operation of full-match hardware 244 is the same. However, other embodiments are possible as well, including embodiments in which the full-match-hash hardware used during set-up and operation of full-match hardware 244 is different.

In the example shown in FIG. 17, "HELLO" is mapped to one of full-match addresses 8-15 (burst 01), and "CHELL" is mapped to one of full-match addresses 16-23 (burst 10).

For those subject data words 1710 that are mapped to full-match addresses that do not have signature-data blocks stored that respectively match each of the subject-data blocks of the subject data word it is possible to determine that those subject data words do not fully match any signature data patterns. After all, if a given subject data word exactly matches a given signature data pattern, the given subject data word and the given signature data pattern will be mapped to the same full-match address, and all of the signature-data blocks of the signature data pattern would have been stored in full-match-data-storage cells 1534 during the set-up of full-match hardware 244 as discussed above.

As can be seen, the signature data pattern "HELLO" is stored in full-match data burst 01, and the signature data pattern "CHASE" is stored in full-match data burst 10. Thus, it can be said for sure that subject data word "HELLO" does match a signature data pattern. On the other hand, because each of the subject-data blocks of "CHELL" do not respectively match the stored signature-data blocks of signature data pattern "CHASE," it can be said for sure that subject data word "CHELL" does not match a signature data pattern.

m. Store Full-Match Indicator

At step 610 in FIG. 6A, and at corresponding step 690 in FIG. 6B, IPS 112 stores a full-match indicator 720. That is, for those subject data words for which IPS 112 recognizes that a signature match 718 has been made, IPS 112 may store full-match indicator 720 for the purpose of recording the fact that the particular subject data word matches a signature data pattern.

In addition to storing the full-match indicator, IPS 112 may carry out a number of additional steps including, but not limited to, quarantining the subject data word, quarantining a collection of data comprising the subject data word, blacklisting a source of the subject data word, sending an alert to a source of the subject data word, sending an alert to an intended recipient of the subject data word, and generating a data-examination report. Such steps may or may not be carried out according to the desired characteristics of IPS 112.

5. Conclusion

Figure 18:
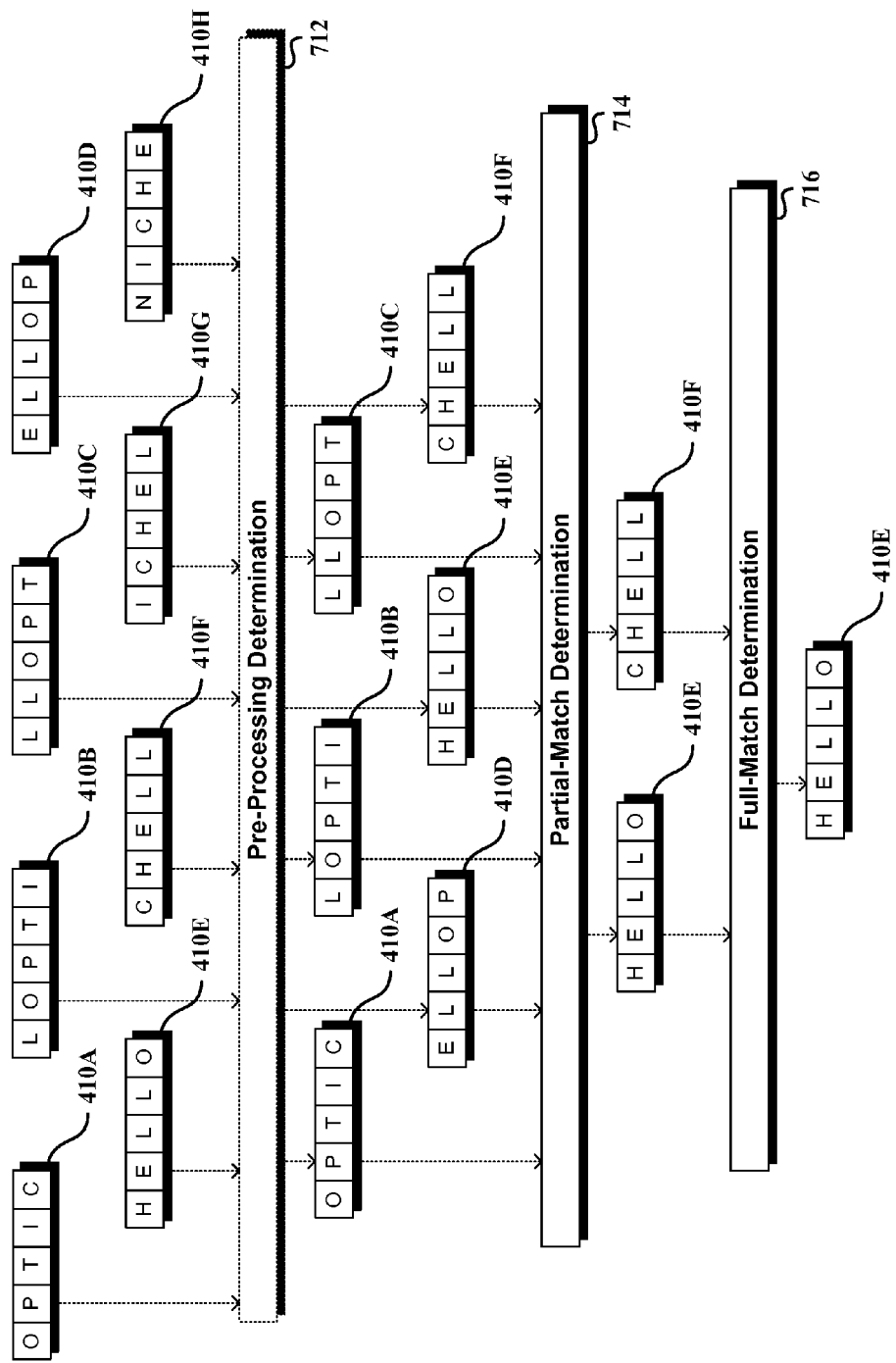
FIG. 18 depicts an overview of an example of an examination of subject data words, in accordance with at least one embodiment.

As shown in FIG. 18, the methods and systems described herein utilize a number of determinations, such as optional pre-processing determination 712, partial-match determination 714, and full-match determination 716, to determine if a given subject data word exactly matches a given signature data pattern. Each determination may rule out some of the examined subject data words and, accordingly, each subsequent determination need only be carried out with respect to those subject data words that have not been previously ruled out. As a result, as can be seen in FIG. 18, the number of subject data words that are examined for an exact match with respect to full-match determination 716 is significantly less than the number of subject data words 410 initially taken from network traffic 300 for examination.

Various examples of embodiments have been described above. Those skilled in the art will understand, however, that changes and modifications may be made to those examples without departing from the scope of the claims.

The invention claimed is:

1. A method of examining a subject data word, the subject data word comprising a plurality of subject-data blocks, and identifying a full match between the subject data word and a signature data pattern, the signature data pattern comprising a plurality of signature-data blocks, wherein each of the subject-data blocks and each of the signature-data blocks has (i) a respective value and (ii) a respective position, the method carried out by an intrusion-prevention system (IPS) comprising at least one processor, at least one network interface, partial-match hardware having at least part of the signature data pattern stored therein, and full-match hardware having the signature data pattern stored therein, the method comprising:

the IPS receiving the subject data word via the at least one network interface;

the IPS making a partial-match determination comprising a determination that a partial-match number of the subject-data blocks respectively match the same partial-match number of the signature-data blocks stored in the partial-match hardware with respect to both value and position, wherein the partial-match number is (i) greater than or equal to two and (ii) less than a total number of the subject-data blocks;

subsequent to making the partial-match determination, the IPS making a full-match determination comprising a determination that all of the subject-data blocks respectively match all of the signature-data blocks stored in the full-match hardware with respect to both value and position; and the IPS storing a full-match indicator, the full-match indicator indicating that the full-match determination has been made.

2. The method of claim 1, wherein each of the subject-data blocks and each of the signature-data blocks is at least one of (i) a fixed number of one or more bits and (ii) a fixed number of one or more bytes.

3. The method of claim 1, wherein receiving the subject data word comprises receiving the subject data word from a public data network.

4. The method of claim 1, wherein the IPS further comprises pre-processing hardware having at least one pre-processing-signature-hash result flagged therein, the method further comprising, prior to making the partial-match determination, the IPS making a pre-processing determination that a pre-processing number of pre-processing-subject-hash results are flagged as being pre-processing-signature-hash results in the pre-processing hardware.

5. The method of claim 4, wherein the pre-processing number is 2 or 4.

6. The method of claim 4, wherein the pre-processing hardware comprises Block random access memory (RAM).

7. The method of claim 4, wherein each pre-processing-signature-hash result and each pre-processing-subject-hash result corresponds to a respective pre-processing address in the pre-processing hardware.

8. The method of claim 7, wherein a pre-processing-signature-hash result being flagged comprises a trigger indicator being set at the corresponding pre-processing address.

9. The method of claim 1, wherein the respective positions of the subject-data blocks matched in the partial-match determination are adjacent.

10. The method of claim 9, wherein the partial-match number is 2.

11. The method of claim 9, wherein the subject-data blocks matched in the partial-match determination comprise a subject-data block having a position that is either (i) at the beginning of the subject-data word or (ii) at the end of the subject-data word.

12. The method of claim 9, wherein the subject-data blocks matched in the partial-match determination comprise a subject-data block having a position that is neither (i) at the beginning of the subject-data word or (ii) at the end of the subject-data word.

13. The method of claim 11, wherein the partial-match number is 2.

14. The method of claim 1, wherein the partial-match number is 2.

15. The method of claim 1, wherein the partial-match hardware comprises static random access memory (SRAM).

16. The method of claim 1, wherein the signature-data blocks stored in the partial-match hardware are stored in a memory block that begins at a partial-match address in the partial-match hardware.

17. The method of claim 16, wherein making the partial-match determination further comprises using at least part of the subject data word to determine a partial-match-subject-hash result corresponding to the partial-match address.

18. The method of claim 16, wherein making the partial-match determination further comprises identifying the partial-match address based at least in part on at least one pre-processing-subject-hash result.

19. The method of claim 1, wherein the full-match hardware comprises dynamic random access memory (DRAM).

20. The method of claim 1, wherein the signature-data blocks stored in the full-match hardware are stored in a memory block that begins at a full-match address in the full-match hardware.

21. The method of claim 20, wherein making the full-match determination further comprises using at least part of the subject data word to determine a full-match-subject-hash result corresponding to the full-match address.

22. The method of claim 20, wherein making the full-match determination further comprises identifying the full-match address based at least in part on at least one pre-processing-subject-hash result.

23. The method of claim 1, wherein the subject data word is one of a plurality of subject data words that the IPS examines in accordance with a given clock cycle for the presence of a matching word in a trigger set that includes the signature data word, and wherein a total number of subject data words in the plurality of subject data words is equal to a product of (i) a number of subject-data blocks received in accordance with the given clock cycle and (ii) a number of different lengths of subject data words that the IPS examines in accordance with the given clock cycle.

24. The method of claim 23, wherein the total number of subject data words in the plurality of subject data words is 136, wherein the number of subject-data blocks received in accordance with the given clock cycle is 8, and wherein the number of different lengths of subject data words that the IPS examines in accordance with the given clock cycle is 17.

25. The method of claim 24, wherein, in accordance with the given clock cycle, the IPS examines data words ranging in length in integer increments from 4 subject-data blocks to 20 subject-data blocks, inclusive.

26. The method of claim 23 wherein the total number of subject data words in the plurality of subject data words is 72, wherein the number of subject-data blocks received in accordance with the given clock cycle is 8, and wherein the number of different lengths of subject data words that the IPS examines in accordance with the given clock cycle is 9.

27. The method of claim 26, wherein in accordance with the given clock cycle, the IPS examines data words ranging in length in integer increments from 4 subject-data blocks to 12 subject-data blocks, inclusive.

28. The method of claim 23, wherein the subject data word comprises (i) at least one subject-data block received in accordance with the given clock cycle and (ii) at least one subject-data block received during a clock cycle occurring prior to the given clock cycle.

29. The method of claim 1, further comprising, subsequent to making the full-match determination, the IPS carrying out at least one of the following: (i) quarantining the subject data word, (ii) quarantining a collection of data comprising the subject data word, (iii) blacklisting a source of the subject data word, (iv) sending an alert to a source of the subject data word, (v) sending an alert to an intended recipient of the subject data word, and (vi) generating a data-examination report.

30. An intrusion-prevention system (IPS) for examining a subject data word, the subject data word comprising a plurality of subject-data blocks, and for identifying a full match between the subject data word and a signature data pattern, the signature data pattern comprising a plurality of signature-data blocks, wherein each of the subject-data blocks and each of the signature-data blocks has (i) a respective value and (ii) a respective position, the IPS comprising:

at least one network interface;
at least one processor;
partial-match hardware having at least part of the signature data pattern stored therein;
full-match hardware having the signature data pattern stored therein; and
data storage containing instructions executable by the at least one processor for causing the IPS to carry out a set of functions, the set of functions comprising:
receiving the subject data word via the at least one network interface;
making a partial-match determination comprising a determination that a partial-match number of the subject-data blocks respectively match the same partial-match number of the signature-data blocks stored in the partial-match hardware with respect to both value and position, wherein the partial-match number is (i) greater than or equal to two and (ii) less than a total number of the subject-data blocks;
subsequent to making the partial-match determination, making a full-match determination comprising a determination that all of the subject-data blocks respectively match all of the signature-data blocks stored in the full-match hardware with respect to both value and position; and
storing a full-match indicator, the full-match indicator indicating that the full-match determination has been made.

31. The IPS of claim 30, wherein the partial-match hardware comprises static random access memory (SRAM).

32. The IPS of claim 30, wherein the full-match hardware comprises dynamic random access memory (DRAM).

33. The IPS of claim 30, wherein an operating speed that is characteristic of the partial-match hardware is greater than an operating speed that is characteristic of the full-match hardware.

34. The IPS of claim 30, further comprising pre-processing hardware having at least one pre-processing-signature-hash result flagged therein, wherein the set of functions further comprises, prior to making the partial-match determination, making a pre-processing determination comprising a determination that a pre-processing number of pre-processing-subject-hash results are flagged as being pre-processing-signature-hash results in the pre-processing hardware.

35. The IPS of claim 34, wherein the pre-processing hardware comprises Block random access memory (Block RAM).

36. The IPS of claim 34, wherein an operating speed that is characteristic of the pre-processing hardware is greater than an operating speed that is characteristic of the partial-match hardware, and further wherein the operating speed that is characteristic of the partial-match hardware is greater than an operating speed that is characteristic of the full-match hardware.

37. The IPS of claim 30, embodied in a single network device.

38. The IPS of claim 30, distributed across multiple network devices.

39. A method of examining a subject data word, the subject data word comprising a plurality of subject-data blocks, and identifying a full match between the subject data word and a signature data pattern, the signature data pattern comprising a plurality of signature-data blocks, wherein each of the subject-data blocks and each of the signature-data blocks has (i) a respective value and (ii) a respective position, the method carried out by an intrusion prevention system (IPS) comprising at least one processor, at least one network interface, partial-match hardware having at least part of the signature data pattern stored therein, and full-match hardware having the signature data pattern stored therein, the method comprising:

the IPS receiving the subject data word via the at least one network interface;
the IPS making a partial-match determination comprising:
an identification of a partial-match address based at least in part on at least part of the subject data word, and
a determination that at least one of the following is stored in the partial-match hardware in association with the partial-match address: (i) a set overflow indicator and (ii) a partial-match number of the signature-data blocks that respectively match the same partial-match number of the subject-data blocks with respect to both value and position, wherein the partial-match number is (i) greater than or equal to two and (ii) less than a total number of the subject-data blocks;
subsequent to making the partial-match determination, the IPS making a full-match determination comprising:
an identification of a full-match address based at least in part on at least part of the subject data word, and
a determination that the signature data pattern is stored in the full-match hardware in association with the full-match address; and
the IPS storing a full-match indicator, the full-match indicator indicating that the full-match determination has been made.

40. The method of claim 39, wherein the determination that at least one of (i) a set overflow indicator and (ii) the partial-match number of the signature data blocks is stored in the partial-match hardware in association with the partial-match address comprises a determination that at least one of (i) a set overflow indicator and (ii) the partial-match number of the signature data blocks is stored in association with a memory block that begins at the partial-match address.

41. The method of claim 40, wherein there is not a set overflow indicator stored in the partial-match hardware in the memory block that begins at the partial-match address, and wherein the partial-match determination comprises a determination that stored in the partial-match hardware in association with the partial-match address is the partial-match number of the signature-data blocks that respectively match the same partial-match number of the subject-data blocks with respect to both value and position.

42. The method of claim 40, wherein there is a set overflow indicator stored in the partial-match hardware in the memory block that begins at the partial-match address, and wherein the partial-match determination comprises a determination that that indicator is stored in the partial-match hardware in the memory block that begins at the partial-match address.

43. The method of claim 40, wherein at least the partial-match number of signature-data blocks from each of at least one additional signature data pattern other than the signature data pattern are stored in the memory block that begins at the partial-match address.

44. The method of claim 40, wherein there is a set overflow indicator stored in the partial-match hardware in the memory block that begins at the partial-match address, and wherein at least the partial-match number of signature-data blocks from each of a given positive integer number of one or more additional signature data patterns other than the signature data pattern are also stored in the memory block that begins at the partial-match address, and wherein the memory block that begins at the partial-match address does not have the signature data pattern stored therein.

45. The method of claim 44, wherein the given positive integer number is four.

46. The method of claim 39, wherein the signature data pattern is stored in a memory block that begins at the full-match address.

47. The method of claim 39, wherein the signature data pattern is stored in a memory block that begins at a full-match-overflow address that is stored in a memory block that begins at the full-match address.

48. The method of claim 47, wherein the full-match determination further comprises a determination that the full-match-overflow address is stored in the memory block that begins at the full-match address.

49. The method of claim 47, wherein at least one additional signature data pattern other than the signature data pattern is also stored in the memory block that begins at the full-match address.

50. The method of claim 49, wherein the at least one additional signature data pattern comprises at least three additional signature data patterns.

51. The method of claim 39, wherein the full-match determination further comprises a determination that a length indicator that is stored in the full-match hardware in association with the signature data pattern is equal to a length of the subject data word, the length indicator reflecting a length of the signature data pattern.

52. An intrusion-prevention system (IPS) for examining a subject data word, the subject data word comprising a plurality of subject-data blocks, and for identifying a full match between the subject data word and a signature data pattern, the signature data pattern comprising a plurality of signature-data blocks, wherein each of the subject-data blocks and each of the signature-data blocks has (i) a respective value and (ii) a respective position, the IPS comprising:

at least one network interface;

at least one processor;

partial-match hardware having at least part of the signature data pattern stored therein;

full-match hardware having the signature data pattern stored therein; and data storage containing instructions executable by the at least one processor for causing the IPS to carry out a set of functions, the set of functions comprising:

receiving the subject data word via the at least one network interface;

making a partial-match determination comprising:

an identification of a partial-match address based at least in part on at least part of the subject data word, and a determination that at least one of the following is stored in the partial-match hardware in association with the partial-match address: (i) a set overflow indicator and (ii) a partial-match number of the signature-data blocks that respectively match the same partial-match number of the subject-data blocks with respect to both value and position, wherein the partial-match number is (i) greater than or equal to two and (ii) less than a total number of the subject-data blocks;

subsequent to making the partial-match determination, making a full-match determination comprising:

an identification of a full-match address based at least in part on at least part of the subject data word; and a determination that the signature data pattern is stored in the full-match hardware in association with the full-match address; and storing a full-match indicator, the full-match indicator indicating that the full-match determination has been made.

53. The IPS of claim 52, wherein the partial-match hardware comprises static random access memory (SRAM).

54. The IPS of claim 52, wherein the full-match hardware comprises dynamic random access memory (DRAM).

55. The IPS of claim 52, wherein an operating speed that is characteristic of the partial-match hardware is greater than an operating speed that is characteristic of the full-match hardware.

56. The IPS of claim 52, further comprising pre-processing hardware having at least one pre-processing-signature-hash result flagged therein, wherein the set of functions further comprises, prior to making the partial-match determination, making a pre-processing determination comprising a determination that a pre-processing number of pre-processing-subject-hash results are flagged as being pre-processing-signature-hash results in the pre-processing hardware.

57. The IPS of claim 56, wherein the pre-processing hardware comprises Block random access memory (Block RAM).

58. The IPS of claim 56, wherein an operating speed that is characteristic of the pre-processing hardware is greater than an operating speed that is characteristic of the partial-match hardware, and further wherein the operating speed that is characteristic of the partial-match hardware is greater than an operating speed that is characteristic of the full-match hardware.

59. The IPS of claim 52, embodied in a single network device.

60. The IPS of claim 52, distributed across multiple network devices.

* * * * *

UNITED STATES PATENT AND TRADEMARK OFFICE
CERTIFICATE OF CORRECTION

PATENT NO. : 8,458,796 B2
APPLICATION NO. : 13/043287
DATED : June 4, 2013
INVENTOR(S) : Ronald S. Stites et al.

Page 1 of 1

It is certified that error appears in the above-identified patent and that said Letters Patent is hereby corrected as shown below:

In the Claims:

In column 38, line 8, in Claim 26, delete "claim 23" and insert -- claim 23, --, therefor.

In column 38, line 14, in Claim 27, delete "wherein" and insert -- wherein, --, therefor.

Signed and Sealed this
Thirteenth Day of August, 2013

Teresa Stanek Rea
*Acting Director of the United States Patent and Trademark Office*